US010440005B2

(12) United States Patent
Kessler et al.

(10) Patent No.: US 10,440,005 B2
(45) Date of Patent: Oct. 8, 2019

(54) CERTIFICATION MANAGEMENT SYSTEM

(71) Applicant: Accenture Global Services Limited, Dublin (IE)

(72) Inventors: John Kessler, Fincastle, VA (US); Monica A Larosa, Algonquin, IL (US); Ashok P Vira, Mumbai (IN); Abdulquader A Kinariwala, Mumbai (IN); Siddhartha S. Dhamankar, Mumbai (IN); Gordon Trujillo, Brighton, CO (US)

(73) Assignee: Accenture Global Services Limited, Dublin (IE)

( * ) Notice: Subject to any disclaimer, the term of this patent is extended or adjusted under 35 U.S.C. 154(b) by 64 days.

(21) Appl. No.: 14/752,084

(22) Filed: Jun. 26, 2015

(65) Prior Publication Data
US 2016/0381004 A1 Dec. 29, 2016

(51) Int. Cl.
*G06F 21/60* (2013.01)
*H04L 29/06* (2006.01)
*G06Q 10/06* (2012.01)
*G09B 5/00* (2006.01)

(52) U.S. Cl.
CPC ......... *H04L 63/0823* (2013.01); *G06Q 10/06* (2013.01); *G09B 5/00* (2013.01); *H04L 63/0876* (2013.01)

(58) Field of Classification Search
CPC ... H04L 63/0823; H04L 63/0876; G09B 3/00; G09B 19/00; G06F 17/00
See application file for complete search history.

(56) References Cited

U.S. PATENT DOCUMENTS

| 6,157,808 | A  | * | 12/2000 | Hollingsworth | G09B 7/02 434/219 |
| 7,024,154 | B1 | * | 4/2006 | Koepper | G09B 5/00 434/118 |
| 8,015,600 | B2 | * | 9/2011 | Sinn | G06Q 10/06 713/156 |
| 8,554,584 | B2 | * | 10/2013 | Hargroder | G06Q 10/10 705/4 |

(Continued)

FOREIGN PATENT DOCUMENTS

WO      2007145619 A1     12/2007

OTHER PUBLICATIONS

Search Report and Written Opinion for European Application No. 16 176 304.0, completed Oct. 12, 2016.

*Primary Examiner* — Wasika Nipa
(74) *Attorney, Agent, or Firm* — Brinks Gilson & Lione

(57) ABSTRACT

A certification management system helps an organization develop and maintain a repository of current certification status of employees. The system may integrate multiple learning management systems and other enterprise level systems across the organization. The system facilitates identifying and enrolling targeted employees for any number and type of certification programs. The system may also implement and support reconfiguring certification programs, for example, during training, and enforcing recertification requirements according to maturing business needs. The system provides automated workflows that facilitate a formal, structured approach to the development and recognition of specific specialized skills at scale by infusing more consistency, rigor, and objectivity.

20 Claims, 37 Drawing Sheets

(56) References Cited

U.S. PATENT DOCUMENTS

| | | | |
|---|---|---|---|
| 8,666,300 B2* | 3/2014 | Haimowitz | G09B 7/04 |
| | | | 434/350 |
| 2004/0002888 A1* | 1/2004 | Draper, Jr. | G06Q 10/06311 |
| | | | 705/7.13 |
| 2012/0089432 A1* | 4/2012 | Podgurny | G06Q 10/06311 |
| | | | 705/7.13 |
| 2012/0216243 A1* | 8/2012 | Gill | G06F 21/55 |
| | | | 726/1 |
| 2012/0232933 A1 | 9/2012 | Russ | |
| 2014/0242565 A1 | 8/2014 | Abts | |
| 2016/0034908 A1* | 2/2016 | McClain | G06Q 30/018 |
| | | | 705/317 |

\* cited by examiner

CERTIFICATION MANAGEMENT SYSTEM

TECHNICAL FIELD

This disclosure relates to system architecture that provides certification management.

BACKGROUND

Rapid advances in computer and communication technologies have resulted in data networks that reach virtually every part of the planet. Industries routinely require employees, service providers, and other individuals with specializations, to competently complete specific work projects or to comply with regulations, as just two examples. Therefore, service providers face increasing demands to certify their employees. However, it is quite difficult to build targeted/critical competencies at scale, particularly given the situation with prior certification programs. Technical improvements in system architectures will facilitate supporting the growing complexity and advanced administration of maturing certification capability and will also be flexible and responsive to business needs.

DETAILED DESCRIPTION

Figure 1:
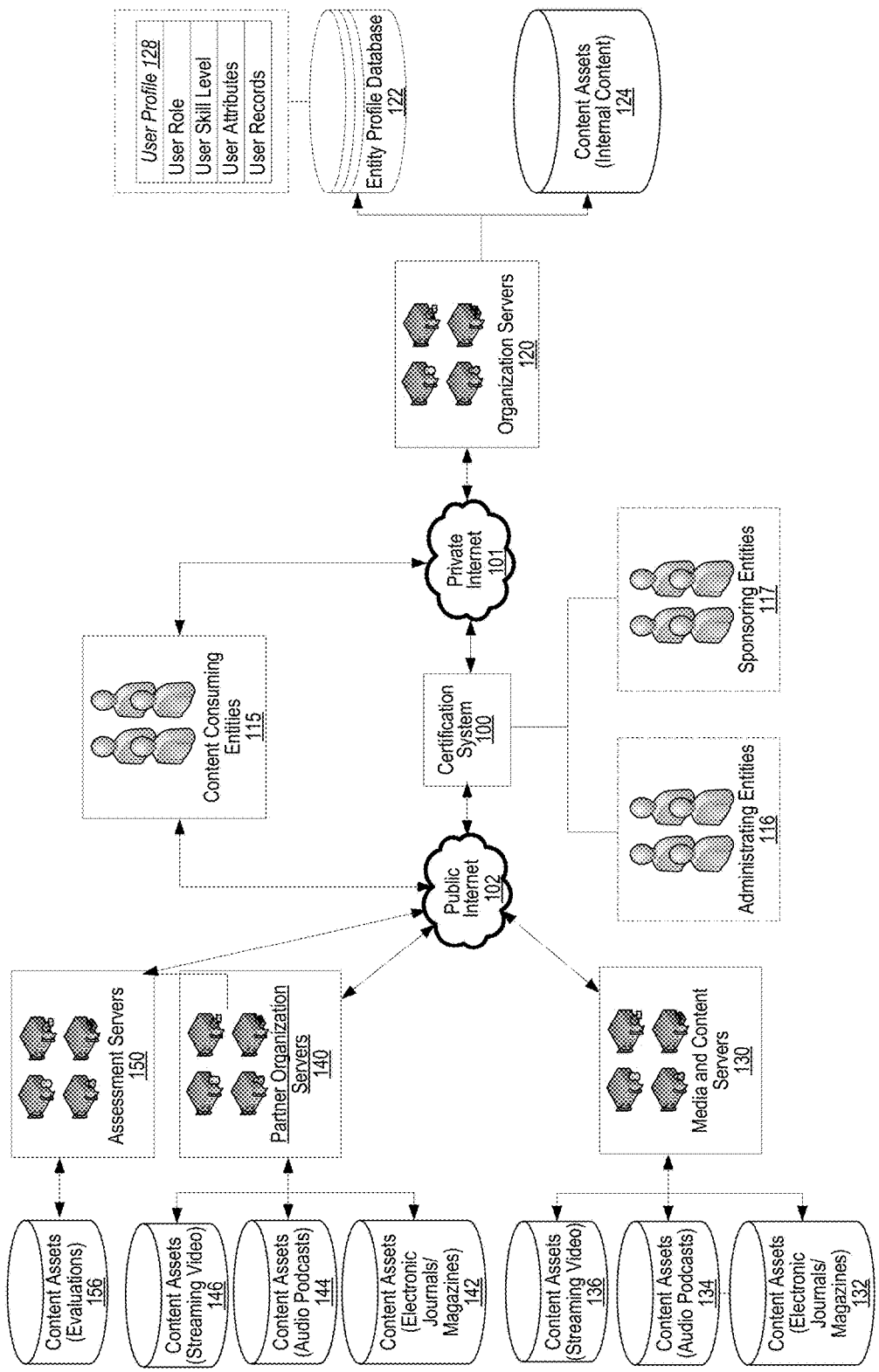
FIG. 1 illustrates a high-level view of an example environment in which a certification management system operates.

The disclosure below concerns the structure and operation of a certification management system ("system"). Specific examples and details are addressed further below starting with the discussion of FIG. 1. An introduction is given over the next several paragraphs.

Introduction

The system may include a communication interface configured to communicate with an entity profile database including information for a content consuming entity. The system also includes a content database including substantive content assets and entity certification circuitry in communication with the communication interface. The entity certification circuitry may create a content certification for the content consuming entity, the content certification including a certification set of substantive content assets selected from the content database. The system may also mark the content consuming entity as enrolled in the content certification, and create an association between the content consuming entity and the certification set of the substantive content assets. The system may retrieve status of completion of the certification set of substantive content assets by the content consuming entity. The system may maintain a portal for the content consuming entity, the portal including a status indicator of the content certification in which the content consuming entity is enrolled.

The system implements employee certification. The employee certification may include creating a certification program including a first content module. The certification program may be associated with preselected demographic information and a nomination from a sponsor. The sponsor may nominate an employee for the certification program based on the employee's qualifications and demographic information. The employee certification also includes identifying an employee profile that matches the preselected demographic information and the nomination, the employee profile retrieved from an employee database. The employee certification also includes enrolling an employee matching the employee profile in the certification program by updating the corresponding employee profile in the employee database. For the employee certification, the system may also periodically update completion status of the certification program for the employee by retrieving completion status of the first content module of the certification program for the employee, where the completion status of the first content module is retrieved from a content database. The employee certification may also revise the certification program by adding a second content module. The employee certification may also include updating the completion status of the certification program for the employee by retrieving and aggregating completion status of the first content module and the second content module for the employee, where the completion status of the first content module and the second content module are retrieved from the content database. Employee certification may also include sending a notification message through a communication interface to the employee, and the notification message may indicate a completion status of the certification program based on the aggregation of the completion status of the first content module and the second content module.

Any system functionality may be implemented as a storage medium that stores instructions executable by a processor. The medium may be a non-transitory computer storage medium, and may be a medium other than a transitory signal. The medium stores instructions that when executed by the processor create a certification program. The certification program may include certification components, completion criteria, and demographic criteria. The non-transitory computer storage medium may also include instructions to identify target employees that match the demographic criteria of the certification program by comparison of the demographic criteria with employee profiles in an employee database. The non-transitory computer storage medium may also include instructions to receive a nomination from a sponsoring employee associated with the certification program, the nomination approves enrollment an employee in the certification program, where the nominated employee is from the target employees. The non-transitory computer storage medium also includes instructions to enroll the employee in the certification program. The non-transitory computer storage medium may also include instructions to direct the employee to the certification components according to a completion order specified by the completion criteria of the certification program. The non-transitory computer storage medium may also include instructions to receive completion status of the certification components from respective learning management systems. The non-transitory computer storage medium may also include instructions to determine completion status of the certification program based on the completion status of the certification components and the completion criteria. The non-transitory computer storage medium may also include instructions to update the employee profile of the enrolled employee according to the completion status of the certification program. The non-transitory computer storage medium may also include instructions to identify a change in the certification program. The non-transitory computer storage medium may also include instructions to determine an updated completion status of the certification program based on the changed certification program. The non-transitory computer storage medium may also include instructions to update the employee profile of the enrolled employee according to the updated completion status.

The certification management system described below helps an organization to implement a certification management process that supports maturing business needs, provides a holistic employee experience, and simplifies administrative experience. The system architecture provides a tool, a method, and a system, that is flexible and responsive to the business. The certification management system may be cloud based so that various entities may access the system from almost anywhere and almost anytime. Further, the certification management system may be separated from a learning management system, an assessment system, and other organization systems. The separation facilitates integrating and leveraging capabilities of the multiple systems. The certification management system provides automated workflows to provide a formal, structured approach to support the development and recognition of specific specialized skills at scale by infusing more consistency, rigor, and objectivity.

A certification may be a combination of prescribed training, work experience, and a very robust and objective assessment strategy, used to ensure skill building at specific proficiencies. The certification management system may facilitate an organization to build an employee workforce that has credential critical occupational and specialty skills. A certified workforce may be a key differentiator in industries where certification is evidence of industry expertise that clients count on.

The certification management system may facilitate administrators to maintain a certification throughout a lifecycle of the certification, which may involve phases such as creation, modification, recertification, cancellation, and expiration, among other phases. The certification management system may further simplify enrollment of entities, such as employees by identifying target audience for the certification. The certification management system may also facilitate entities within the organization to sponsor, or select, an employee for specific certification. Once enrolled, the employee may track and certification progress via a portal that the certification management system maintains. The employee may also receive notifications from the certification management system. The certification management system may integrate with several systems within the organization and keep employee data up to date, such as proficiency level, certification levels, and other demographic information that may be useful to identify potential team members for a project from among employees.

The 'certification' as described throughout the present document may include training modules, evaluations, assessments, interviews, work-experience, supervisor approvals, peer approvals, and a combination thereof. The certification may be modular so that the certification may be reconfigured dynamically while one or more employees are enrolled in the certification. The certification management system may facilitate creating the certification as well as reconfiguring the certification, and furthermore, maintaining completion status of the employees that may be enrolled in the reconfigured certification.

SPECIFIC EXAMPLES

FIG. 1 illustrates a high-level view of a certification management system 100. The certification management system 100 may communicate with various networks including the private network 101 and the public Internet 102. The certification management system 100 may be accessed by users of different types, such as content consuming entities 115, administrating entities 116, and sponsoring entities 117. The private network 101, for example, may represent the network infrastructure associated with an organization operating the certification management system 100. The content consuming entities 115, administrating entities 116, and sponsoring entities 117 may be employees or contractors of the organization. The users of the certification management system 100 may also include users who are not employees or contractors of the organization. The private network 101 may connect the certification management system 100 to the organization servers 120, allowing the certification management system 100 to access data and related data services that the organization servers 120 may provide. The certification management system 100 may also communicate over the public Internet 102, which allows the certification management system 100 to communicate with external information sources, including the example servers and databases 120, 130, 140, and 150 identified in FIG. 1.

The certification management system 100 may facilitate creation, configuration, and maintenance of a certification or a certification family. A certification may also be referred to as a content certification. For example, the administrating entities 116 may administrate the certification or certification family via the certification management system 100. The certification management system 100 may further facilitate the sponsoring entities 117 to sponsor or nominate one or more content consuming entities to enroll in the certification and/or certification family. Further yet, the content consuming entities, via the certification management system 100, may enroll in and complete the certification and or certification family. A content consuming entity 115 may be a user of the certification management system 100. The content consuming entity 115 may be an employee or contractor of the organization. The content consuming entity 115 may also be referred to as a user, a learner, a target learner, or an employee.

The private network 101 may provide access to content within the network infrastructure of the organization. For instance, the organization servers 120 may provide the certification management system 100 with access to the entity profile database 122 and content assets 124.

The entity profile database 122 may contain demographic information of the users of the certification management system 100, such as the content consuming entities 115. The entity profile database 122 may further contain, or access additional databases such as a human resources database, an employee database (not shown), or an external information servers, such as servers maintained by LinkedIn, Facebook, or other service providers. The entity profile database 122 may provide a profile 128 for a user of the certification management system 100. The profile 128 may also be referred to as an entity profile, an employee profile, or a user profile. For example, the profile 128 of a user may include the user's role within the organization and the user's proficiency level with respect to a particular user skill. The profile 128 may also include user attributes and user records. For example, the user records may include data related to the user's employment history, such as previous positions, roles, or jobs performed by the user. The user attributes may include information regarding the user's career objectives, including target job positions and potential growth paths, or any other characteristic. The demographic information of the user may further include geographic location, age, academic training, projects worked on, and other such information about the user. The certification management system 100 may use the information when creating a certification. Alternatively or in addition, the certification management system 100 may identify target entities for a certification based on the demographic information.

The private network 101 may further facilitate the certification management system 100 to access the content assets 124. A content asset from the content assets 124 may be a certification component, such as a learning activity, an exam, a work-experience, an interview, or any other activity, completion of which, provides an acknowledgement of a user's skill, or proficiency level. A content asset may also be referred to as a substantive content asset or a content module. For example, the content asset may be audio content, video content, presentation, article, slide deck, evaluation, survey, workshop, flash cards, or any other learning activity. The content assets 124 may be internal to the organization, for example, created or maintained within the organization. For example, the content assets 124 may include internal content developed by the organization, for example, instructional videos, presentations, publications, evaluations, or a combination thereof. For example, the organization may have developed the content assets 124 in conjunction with occupational training provided by the organization.

Alternatively or in addition, the content assets 124 may be references to the location of corresponding content asset. For example, a content asset from the content assets 124 may be a hyperlink or some other identification data, link, or pointer providing reference to a corresponding content asset. The identification data may direct a device that accesses the content assets 124 to the location of corresponding content assets, which may be stored remotely or locally. For example, the corresponding content assets may reside on local data storage within the organization or on remote servers, for example, media and content servers 130. By identifying the corresponding content assets by reference, the certification management system 100 may be able to take advantage of other servers storing and hosting the underlying corresponding content assets.

The media and content servers 130 may facilitate the certification management system 100 to access the content assets 132-136 that our external to the organization. The certification management system 100, for example, may access the media and content servers 130 through the public Internet 102. The media and content servers 130 may provide the content assets 132, which may be articles, such as from journals, whitepapers, magazines, or other sources. The content assets 134 may be live or recorded audio content, such as a podcast, an audiobook, a live broadcast, a radio-show, a webinar, a lecture, or any other audio content. The content assets 136 may be a live or recorded video content, such as a live interactive webinar, a video lecture, a presentation, or any other type of video content. The content assets 132-136 may be streamed from the content and media servers 130. Alternatively or in addition, the content assets 132-136 may be downloaded by a content consuming entity 115 for offline access. The certification management system 100 may use the content assets 132-136 as certification components. The media and content servers 130 may be content servers such as sites like Vimeo, YouTube, iTunes, IEEE, ACM, PubMed, or other sources of content assets. Alternatively or in addition, the content servers may be distant learning portals.

Alternatively or in addition, the content consuming entity 115 may access content assets 142-146 from the partner servers 140. The partner servers may provide access to content assets 142-146, which may be articles, audio content, and video content respectively. The content assets 142-146 may be accessible similar to the content assets 132-136. The partner servers 140, and thus the content assets 142-146 may be tailor made for the content consuming entities 115 from the organization according to instructions or approval of the organization, unlike independently sourced content assets 132-136 available through the content and media servers 130. The certification management system 100 may use the content assets 142-146 as certification components.

The content consuming entity 115 may also access the assessment servers 150. The assessment servers 150 facilitate the certification management system 100 to provide the content consuming entity 115 with an assessment or an evaluation. The content consuming entity 115 may access evaluations, through the public Internet 102. The certification management system 100 may also access evaluations, through the public Internet 102. The assessment servers may be sites such as distant learning portals such as universities, certification boards, and the like. The evaluation content asset 109 may be a certification exam, a questionnaire, a survey, or any other form of assessment of skill level of the content consuming entity 115. The certification management system 100 may use the content assets 156 as certification components.

Although the content and media servers 130, the partner servers 140, and the assessment servers 150 are depicted separately in FIG. 1, one or more of them could be part of a single server. For example, the content and media servers 130 may also include assessment content assets, such as the content assets 156. Alternatively or in addition, the content and media servers 130 may be the partner media servers 140. Thus, the certification management system 100 may use a combination of the content assets provided by the servers 120, 130, 140, or 150 as certification components. The servers may be collectively or individually referred to as a content database. In an example, the servers 130-150 may be part of a learning management system, or a separate certification management system that may include certification modules, or certification programs of its own. The certification management system 100 may use the modules from the learning management system as content assets during creation of a certification or a certification family accessible via the certification management system 100.

Figure 2:
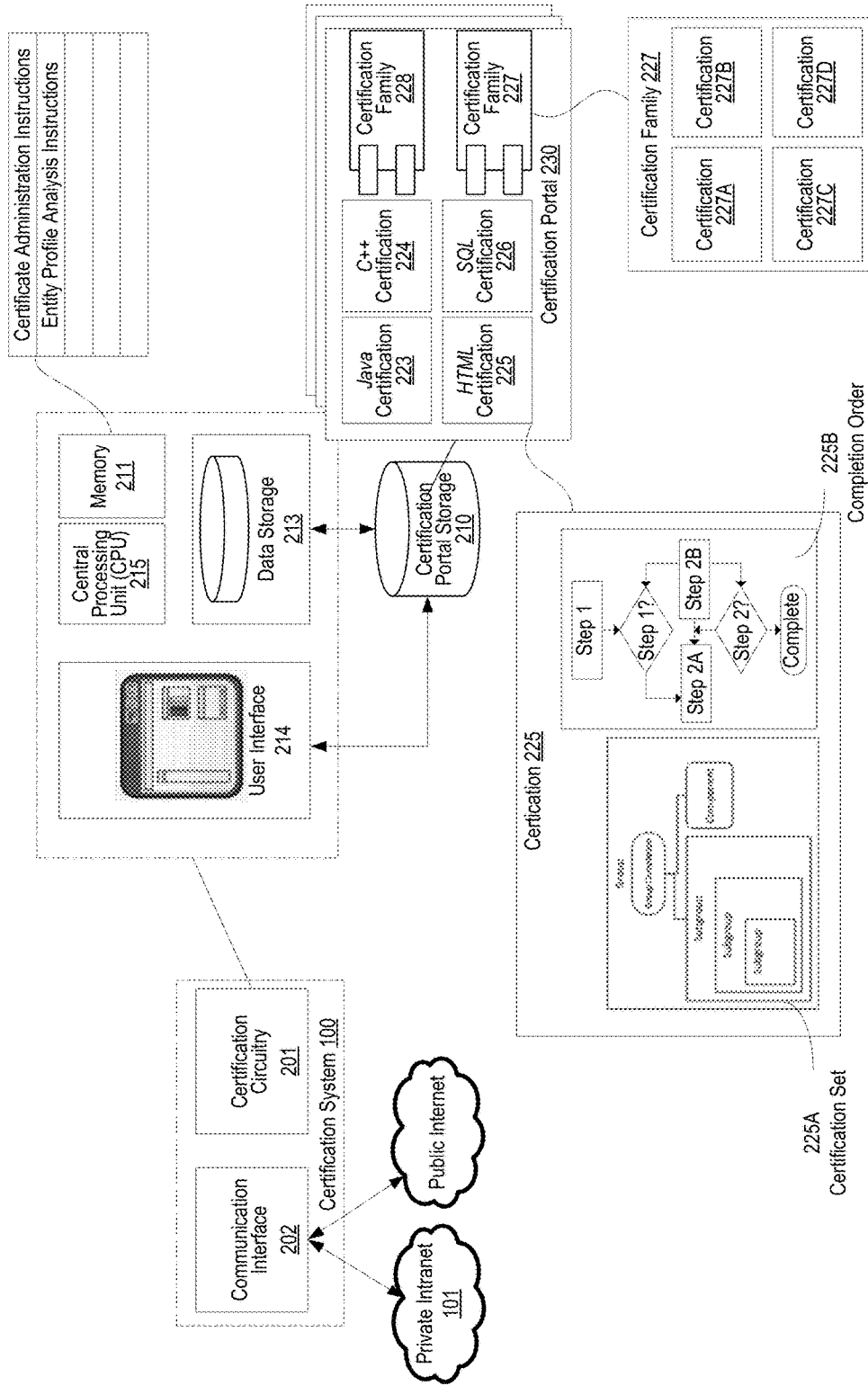
FIG. 2 illustrates a more detailed view of an example certification management system.

FIG. 2 illustrates additional details regarding the certification management system 100. As seen in FIG. 2, the certification management system 100 further comprises a communication interface 202 and certification circuitry 201.

The communication interface 202 may be circuitry, such as processor, memory, integrated circuits, antennas, resistors, capacitors, and any other hardware components. The communication interface 202 may include wires, buses, or any other wired or wireless communication interface. The communication interface 202 may also include software. For example, the communication interface 202 may include instructions or data that may be stored on memory. The instructions may control operations of the communication interface 202. The instructions may be computer executable. The data may include parameters and preset conditions associated with the communication interface 202. The communication interface 202 may include one or more interfaces, such as a local area network (LAN) interface, universal serial bus (USB) connector, serial data port, parallel data port, or any other type of wired or wireless interface used to send or receive data.

The communication interface 202 of the certification management system 100 may facilitate the certification management system 100 to communicate with the content consuming entities 115, the entity profile database 122, the content assets 124, the certification portal storage 210, and other components within or outside the organization. For example, the content consuming entity 115 may access the certification portal 230 using the communication interface 202.

For example, as illustrated in FIG. 2, the certification circuitry 201 of the certification management system 100 may include a central processing unit (CPU) 215, a memory 211, and a data storage 213. The certification circuitry may also include a user interface 214. The CPU 215 may be one or more devices operable to execute logic. The logic may include computer executable instructions stored in the memory 211 or elsewhere that when executed by the CPU 215, cause the CPU 215 to perform the features described below. The CPU 215 may be in communication with the memory 211, the data storage 213, and the user interface 214.

The memory 211 may store control instructions executable by the CPU 215. The memory 211 may contain other data such as images, videos, documents, spreadsheets, audio files, and other data that may be associated with operation of the certification circuitry 201. For example, the memory 211 may contain computer executable instructions to analyze the data in the entity profile database 122. The certification circuitry 201 may use the memory 211 as temporary storage of data. Alternatively or in addition, the certification circuitry 201 may use the memory 211 as permanent storage.

The data storage 213 may store control instructions executable by the CPU 215. The data storage 213 may contain other data such as images, videos, documents, spreadsheets, audio files, and other data that may be associated with operation of the certification circuitry 201. For example, the data storage 213 may include the certification portal storage 210. The certification portal storage 210, for example and without limitation, may be a part of the data storage 213 or it may be a separate storage device associated with the organization servers 120. The certification portal storage 210 may contain data that the certification circuitry 201 uses for a certification portal, data such as configuration of a certification, data used to render a certification, data used to render a certification portal.

For example, the certification portal storage 210 may store data associated with a certification portal 230. The certification portal 230 may be associated with the content consuming entity 115. The certification portal 230 may be a web portal accessible via the communication interface 202. The certification circuitry 201 may create and maintain the certification portal 230. The certification circuitry 201 may create a certification portal for each of the content consuming entities 115.

The user interface 214 may include a display, a speaker, a vibration controller, a microphone for, e.g., voice recognition, touchscreen, or any other component. The user interface 214 communicates with the CPU 215 to, e.g., send and receive data (e.g., screen images) and obtain input (e.g., keyboard, mouse, and touchscreen input) to facilitate the certification processing described herein.

Figure 3:
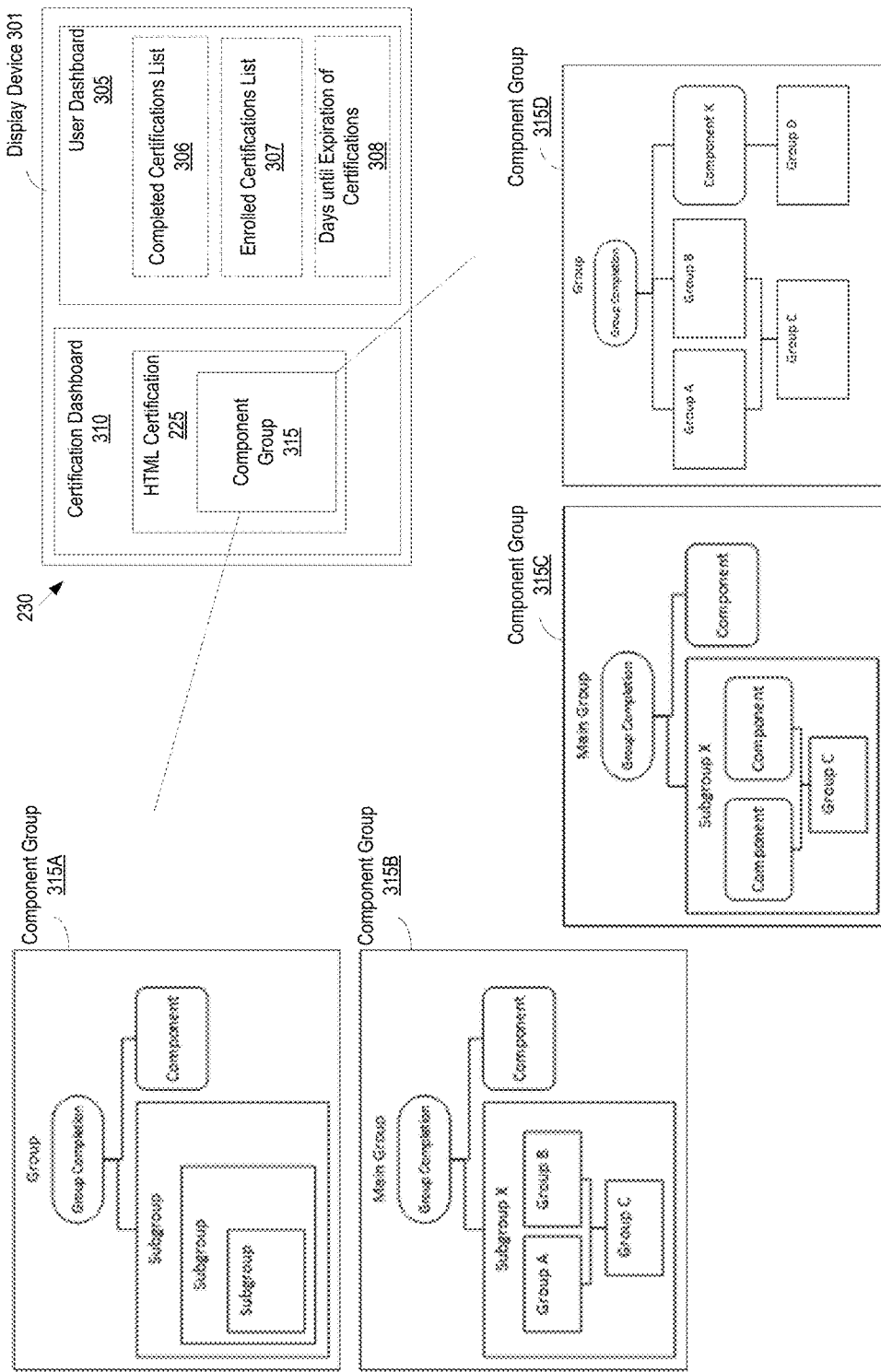
FIG. 3 depicts an exemplary certification portal.

The user interface 214 may display the certification portal 230. FIG. 3 illustrates the certification portal 230 displayed on the user interface 214 on the display device 301. The certification portal 230 may include a user dashboard 305, and a certification dashboard 310. In other examples, the certification portal 230 may include fewer or more display elements than those listed above.

The user interface 214 may adapt according to the display device 301 used to render the certification portal 230. For example, the user interface 214 may render the certification portal 230 in a first manner if the content consuming entity 115 uses a desktop computer to access the certification portal 230, and in a second manner if the content consuming entity 115 uses a mobile device, such as a smartphone to access the certification portal 230.

The certification dashboard 310 may present the content consuming entity 115 with one or more certifications 223-226 and one or more certification families 227-228 that the certification portal 230 contains. The content consuming entity 115 may be enrolled in or may be eligible, or sponsored to enroll in the certifications 223-226 and/or the certification families 227-228. The examples throughout this document may describe operation associated with the certification 225. Similar operations are possible with the certification family 227; such operations are not described separately to avoid duplication.

A certification family, such as the certification family 227 may be a collection of related certifications 227A-227D, defined for particular skill. The certification family 227 may be a grouping of the certifications 227A-227D. The certification family 227 may also be referred to as a certification program. For example, the certifications 227A-227D may all be associated with a particular field of study. For example, the certification family 227 may be a data visualization certification family and accordingly, the certifications 227A-

227D may be associated with developing proficiency in data visualization. Alternatively or in addition, the certifications 227A-227D may develop proficiency in more than one field of study. For example, the certification family 227 may be associated with a project. The project may demand a certain level of proficiency in, for example, thermodynamics, as well as in software programming. Accordingly, the certifications 227A-227D may develop proficiency in both thermodynamics and software programming. The certification family 227 may include fewer or more certifications than those illustrated in FIG. 2. In addition, the certification portal storage 210 may include fewer or more certifications than illustrated in FIG. 2. The certifications 227A-227D may be from the certifications 223-226 or different certifications included in the certification portal storage 210.

A certification, such as a certification 225 may be a formal program that acknowledges a specific set of skills or proficiency level. The proficiency level associated with the certification 225 may be based on completion of the certification 225. The completion of the certification 225 may depend on satisfying a completion criterion of the certification 225. The completion criterion may include accessing and completing one or more content assets associated with the certification 225. Completion of the certification may entail meeting the completion criteria of the certification. The completion criteria may be configured at the time the certification was created. Alternatively or in addition, the completion criteria may be modified after the certification is created.

For example, the certification 225 may be associated with a certification set 225A of content assets. The certification set 225A may include one or more content assets, such as the internal content assets 124, or the content assets available via the media and content servers 130, the partner servers 140, or the assessment servers 150. For example, the certification set 225A may include a learning component and an assessment component. The learning component may be one or more content assets, such as a video content asset 136 and an audio content asset 134. The assessment component may be one or more assessment content assets 156. The assessment component may evaluate whether the content consuming entity 115 enrolled in the certification 225 completed the learning component. The assessment component, for example, may include a test, an examination, a survey, an interview, a supervisor approval, or any other type of assessment. The certification 225, for example, may be deemed completed if the content consuming entity 115 completes a threshold number of content assets from the learning component or obtains a threshold score in the assessment component. Other criteria to determine completion of the certification 225 may be possible.

In another example, the certification 225 may be associated with a predetermined order 225B of completion of the content assets in the certification set 225A. Continuing the earlier example, the predetermined order 225B may specify a particular order of completion of the learning components. In addition or alternatively, the predetermined order 225B may restrict the content consuming entity 115 from accessing the assessment component until the learning component is completed in the predetermined order. Various other predetermined orders may be possible. The certification 225 may be deemed complete if the content consuming entity 115 completes the content assets in the certification set 225A according to the predetermined order 225B.

Alternatively or in addition, the certification 225 may consist of a component group 315 that includes both, the certification set 225A and the completion order 225B. The component group 315 may be composed of a collection of components and subgroups that follow a blending logic. In an example, a components group may be nested to a depth of 5 levels (main group+5 subgroups). For example, as illustrated in FIG. 3, the component group 315 of the certification 225 may be one of component groups 315A-315D, or a combination thereof. The completion of the component group 315 may be dependent on completion of all the constituents of the component group 315. For example, in the component group 315D, the constituent group D must be completed for Component X to be deemed completed. Also, Group C must be completed for Group A and/or Group B to be completed. The whole component group 315D may be deemed complete when Group A, Group B, and Component X are complete. The component group 315D may have one or more pre-requisite groups. The content consuming entity 115 may not be able to register into a dependent group unless all pre-requisite groups are completed. Thus, the example component group 315D, the content consuming entity may not be able to register or begin Group A or Group B until Group C is completed.

Figure 7:
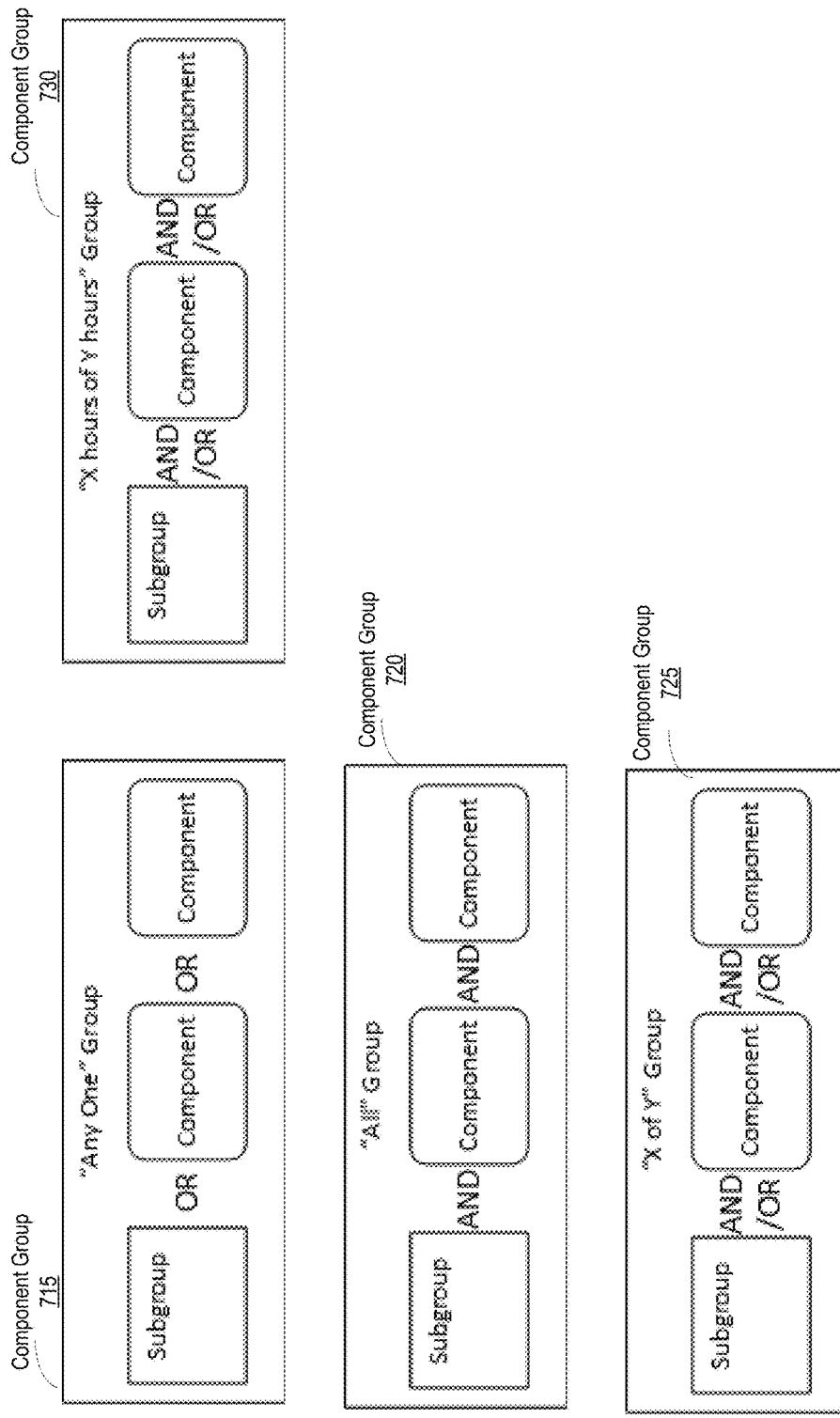
FIG. 7 illustrates example logic types for components and subgroups of a certification.

The components and subgroups within the component group 315 may be governed by a logic type. However, the component group 315 may not have subgroups and components that follow a mixed logic. FIG. 7 illustrates example logic types for the components and subgroups of the component groups 715, 720, 725, and 730 of the certification 225. For example, in a component group 715 completion of any one component or subgroup with the component group 715 may qualify as completion of the parent group, such as the component group 715. In the component group 720, completion of all components or subgroups within the component group 720 may qualify the component group 720 as complete. In the component group 725, completion of X number of components or subgroups of the Y number of components in the component group 725 may qualify the component group 725 as complete.

In another example, in the component group 730, completion may be based on a number of hours of the subcomponents completed. For example, completion of components or subgroups totaling X hours of the total Y hours of components/subgroups in the component group 730 may qualify the component group 730 as complete. The content consuming entity 115 may not complete all the components inside a subgroup as the hours of completed components may count towards the total X hours required for completion. For instance, consider that the component group 730 requires 16 out of 32 hours for completion, and that the component group 730 has 3 nested, 1 Subgroup with two 8 hour trainings and two components of 8 hour trainings each. In this case, the component group 730 may be considered complete if the content consuming entity 115 attempts only one 8 hours training from the subgroup, leaving the subgroup status incomplete, and attempts one 8 hours training component. Several other combinations and rules for identifying or qualifying completion of the component group 315 are possible, and the above are just a few of the possible examples.

The certification set 225A may include different types of content assets such as audio, video, articles, training modules, evaluations, and any other type of content asset that may be accessed from the servers 120-150. The certification 225 may, thus provide a formal, structured path of learning activities followed by exams, experiences, or interviews, which provides an official acknowledgement of an employee's skills proficiency. For example, the certification 225 may be an Application Designer Certification, an Application Tester Certification, or an Application Test Designer Certification, among other possible certifications.

The user dashboard 305 may present the content consuming entity 115 with information associated with the certifications that the content consuming entity 115 may be enrolled in. For example, the user dashboard 305 may include a list of completed certifications 306, a list of enrolled certifications 307, and days until expiration of certifications that the content consuming entity 115 has completed. The user dashboard 305 may also include a status indicator representative of a completion status of a certification that the content consuming entity may be enrolled in. In other examples, the user dashboard 305 may provide fewer or more information.

In an example, the certification management system 100 may determine a grade name for the certification 225 based on one or more components within the certification 225. For example, the certification 225 may be deemed a 'generalist' level based on an assessment component of the certification 225, while another example certification may be deemed a 'master' certification based on a deeper assessment component.

The administrating entities 116 may create and configure the certification 225. The administrating entities 116 may also create and configure the certification family 227. An administrating entity 116 may be a user of the certification management system 100. The administrating entity 116 may be an employee or contractor of the organization. The administrating entity may also be referred to as an administrative entity, a configuration administrator, a program administrator, or simply an administrator. The administrating entity 116 may enroll the content consuming entity 115 in the certification 225. The administrating entity 116 may also enroll the content consuming entity 115 in the certification family 227. Alternatively or in addition, the administrating entity 116 may forward a notification, or message to the content consuming entity 115 to enroll in the certification 225 or the certification family 227. The administrating entity 116 may forward the enrollment message or may enroll the content consuming entity 115 in the certification 225 when a sponsoring entity 117 of the sponsoring entities 117 sponsors the content consuming entity 115.

The sponsoring entity 117 may be an employee of the organization. The sponsoring entity 117 may sponsor the content consuming entity 115 to enroll in a particular certification or a certification family. The sponsoring entity 117 may sponsor the content consuming entity 115 based on the demographic information of the content consuming entity 115. For example, the sponsoring entity 117 may be a project manager who is seeking an employee at a particular geographic location with a specific level of certification. If none of the employees at that particular geographic location has the specific level of certification, the project manager may sponsor an employee at the particular geographic location to enroll in or undertake the certification 225 and/or the certification family 227. Upon completion of the certification 225 and/or the certification family 227, the employee may be available to work on the project for the project manager.

The certification portal storage 210 may store associations between the content consuming entities 115, the administrating entities 116, the sponsoring entities 117, certifications 223-226 and other data throughout various stages of a life-cycle of the certification 225.

Figure 4:
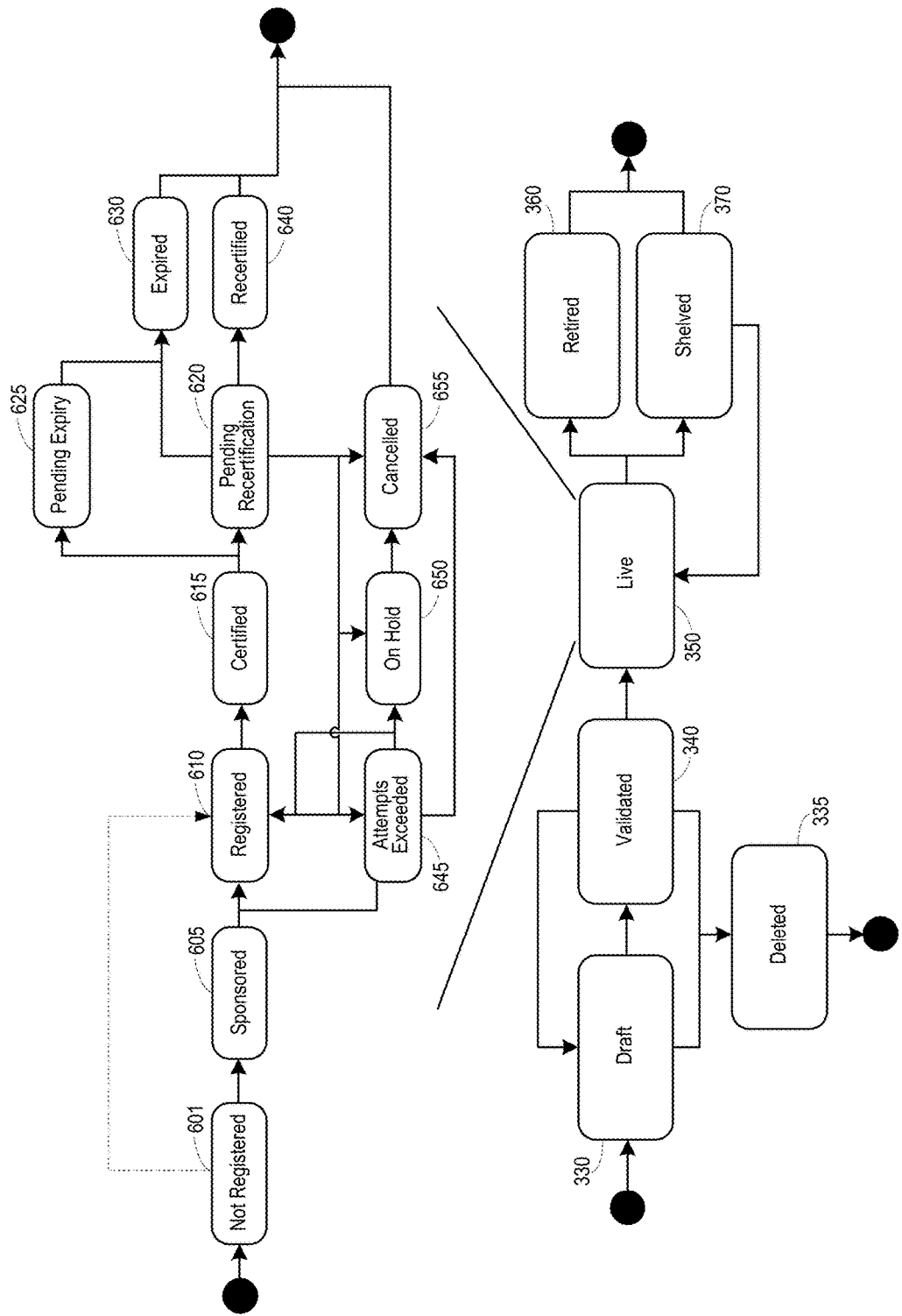
FIG. 4 illustrates example stages in a life-cycle of a certification or a certification family.

FIG. 4 illustrates stages in a life-cycle of the certification 225 and/or the certification family 227. The stages are described with respect to the certification 225; however, the certification family 227 may be similarly revised throughout its life-cycle. The administrating entity 116, via the certification circuitry 201 may create and revise the certification 225. Such revisions result in a change of the stage of the certification 225.

For example, the administrating entity 116, in the draft stage, may create or configure the certification 225 (330). The administrating entity 116 may validate the created certification 225, such as in a sandbox (340). The certification 225 may not be accessible by the content consuming entity 115 until the certification is validated and deployed. The administrating entity 116 may revise the certification 225 based on an outcome of the validation. The certification 225 may be changed back to the draft stage (330). Alternatively or in addition, the administrating entity 116 may delete the created certification 225, for example if the validation fails (335). The certification 225 may be deleted only if the certification 225 is in the Draft or Validated state. Deleting the certification family 227 may delete all its constituent certifications 227a-227f.

Once the certification 225 is validated, the administrating entity 116 may deploy, activate, or release the certification 225. The certification 225 is said to be 'live' at this stage (350). In this stage, the certification 225 may be accessible by the content consuming entity 115. The content consuming entity 115 may interact with the certification 225 that is live, such as to enroll in the certification 225, to complete the certification 225, or other types of interactions.

The administrating entity 116 may deactivate the certification 225. The content consuming entity 115 may not be able to access the deactivated certification 225. For example, the administrating entity 116 may retire the certification 225 (360). Retiring the certification family 227 or the certification 225 may occur when the certification family 227 (including all its constituent certificates) or the certification 225 is deemed permanently closed or deactivated; without the possibility of reopening or recertification. Completion of in-progress certification 225 by the content consuming entity 115 may not be allowed. The certification family 227 and/or the certification 225 may be deemed retired as of a retiring date specified by the administrating entity 116 at time of configuration.

Alternatively or in addition, the administrating entity 116 may shelve the certification 225 (370). Shelving the certification family 227 or the certification 225 may disable new enrollment, however in-progress content consuming entity 115 may be allowed to pursue completion of the certification family 227 or the certification 225. Alternatively or in addition, the certification 225 may be shelved in case the content consuming entity 115 that meets demographic information requirements for the certification 225 is unavailable to enroll in the certification 225. A shelved certification 225 may be reactivated at a later date. For example, upon completion of the certification 225 by the content consuming entity 115, the certification 225 may be shelved until another content consuming entity is identified and sponsored for the certification 225. Unlike a shelved certification, a retired certification may not be reactivated. For example, the certification 225 may be retired because the associated contents may be outdated. In an example, the certification 225 may only be retired if it is in Live or Shelved state. In another example, the certification 225 may be shelved only if it is in the live state. Other factors may cause the shelving or retirement of the certification 225. The certification family 227 may have similar life-cycle stages as described for the certification 225.

Figure 5:
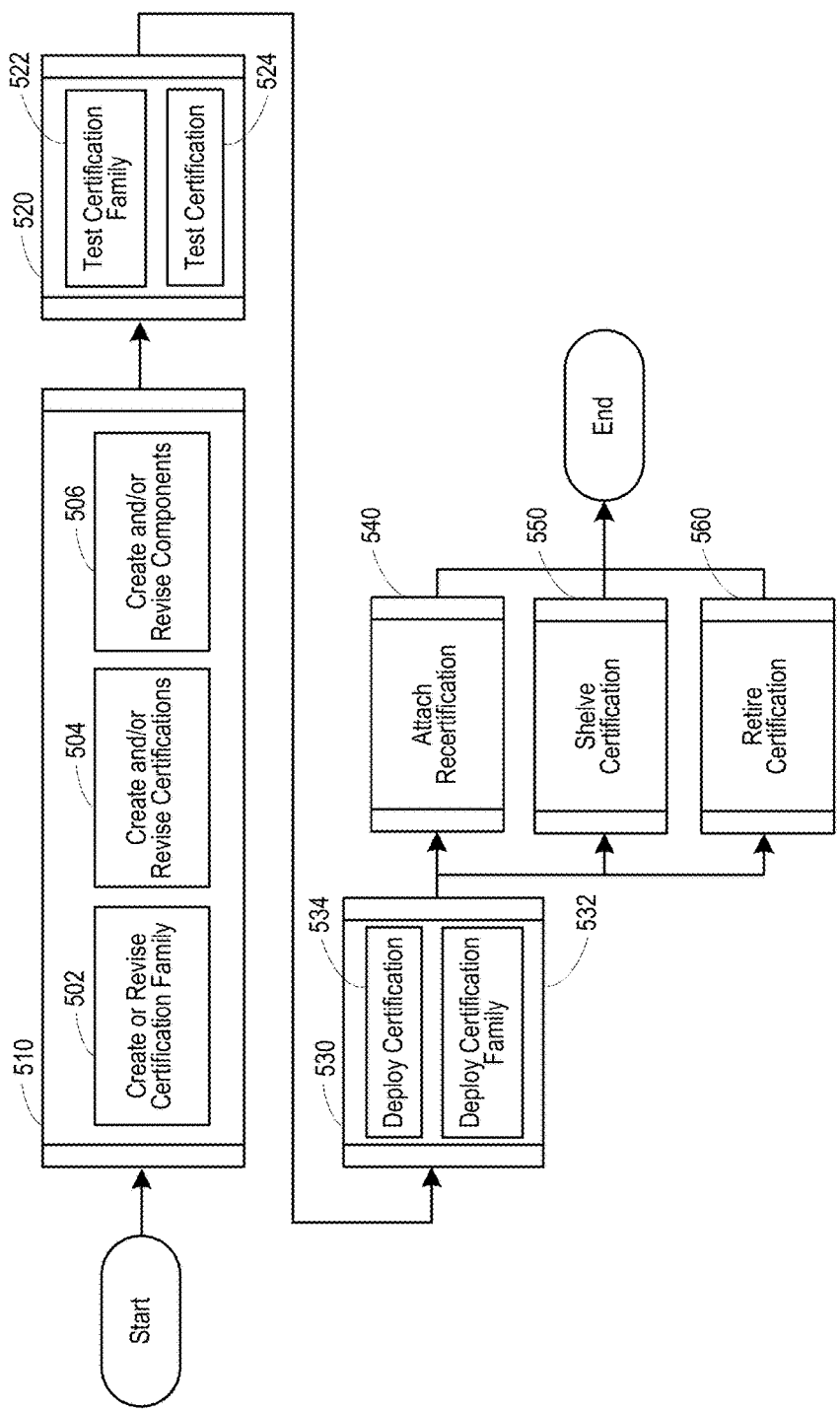
FIG. 5 illustrates logic that a certification management system may implement during the life-cycle of a certification or a certification family.

FIG. 5 illustrates logic that a certification management system 100 may implement during the life-cycle of the certification 225 and/or certification family 227. The administrating entity 116 may create the certification family 227, the certification 225, or the certification components (510).

The administrating entity 116 may create the certification family 227 (502). Alternatively or in addition, the administrating entity 116 may create the certification 225 (504). The creation of the certification family 227 and/or the certification 225 may entail assigning a corresponding completion criteria. The certification family 227 and/or certification 225 may be assigned a respective expiration date. When creating the certification family 227, existing certifications may be added as part of the certification family 227 (502). For example, the certifications that have already been created and stored by the certification circuitry 201 maybe aggregated into the certification family 227. Alternatively or in addition, a new certification may be created and assigned to the certification family 227, if existing certifications are not relevant (502).

When creating the certification 225, existing content assets may be added as part of the component group 315 (504). For example, the administrating entity 116 may aggregate the certification set 225A using the content assets 124, 132-136, 142-146, and 156. Alternatively or in addition, links to selected content assets may be aggregated in the certification set 225A. In an example, if relevant content assets are not available, new content assets may be created for the certification set 225A (506). For example, the content assets 124 internal to the organization may be created and stored on the organization servers 120. The certification 225 may be assigned the predetermined completion order 225B.

The administrating entity 116 may instruct the certification management system 100 to perform the above operations via the user interface 214. For example, the certification circuitry 201 may create and configure the certification family 227 and/or the certification 225. The certification circuitry may access the selected content assets and the other components of the certification management system 100 via the communication interface 202. Thus, the administrating entity 116 may create or modify the certification family 227, the certification 225, and/or the component group 315. The administrating entity may specify or modify attributes of the certification family 227, the certification 225, and/or the component group 315.

The certification family may have attributes, such as the attributes listed in Table 1.

TABLE 1

| Certification Family Attributes | |
|---|---|
| Attribute Name | Attribute Description |
| Name | Name of the certification program that is visible only to the Configuration Administrator or Program Administrator |
| Description | A detailed description for the certification that is visible only to the Configuration Administrator and Program Administrator |
| Rich content | Rich content maintained by the configuration Administrator that is visible to the target Learners (value proposition) |
| Program Sponsors | List of program sponsor enterprise ids that has sponsored this certification |
| Industry Groups | List of industry groups that are applicable to this certification |
| Account Groups | List of account groups that are applicable to this certification |
| Operating Groups | List of operating groups that are applicable for this certification |
| Career Tracks | List of career tracks that are applicable for this certification |
| Talent Segments | List of talent segments that are applicable for this certification |
| Cost Centers | List of cost centers that are applicable for this certification |
| Specialties | List of specialties that are applicable for this certification |

The certification 225 may have attributes, such as the attributes in Table 2.

TABLE 2

| Certification Attributes | | |
|---|---|---|
| Attribute Name | Attribute Description | Sample Values |
| Name | The Name of the certification that is visible only to the Configuration Administrator and Program Administrator | |
| Description | A detailed description for the certification that is visible only to the Configuration Administrator and Program Administrator | |
| Rich content | Rich content maintained by the configuration Administrator that is visible to the target Learners (value proposition) | |
| Language(s) | | English (United States) |
| Vendor | | XYZ |
| Certification Rating | 5 start feedback rating. Out of scope for Phase 1 | |
| Tuition | Support Alpha numeric characters | $100 |
| Program | List of program sponsor enterprise ids | |

TABLE 2-continued

Certification Attributes

| Attribute Name | Attribute Description | Sample Values |
| --- | --- | --- |
| Sponsors | that has sponsored this certification | |
| Capability Development Manager | Individual defined for each certification. Whenever learners reattempt certification workflow due to exceeded component attempts, approval from CD manager will be needed. | |
| Industry Groups | List of industry groups that are applicable to this certification | |
| Account Groups | List of account groups that are applicable to this certification | |
| Operating Groups | List of operating groups that are applicable for this certification | |
| Cost Centers | List of cost centers that are applicable for this certification | |
| Target Audience Type | Attribute Driven - target audience determined by configured eligibility attributes<br>Individually Specified - target audience individually selected by administrator. | Attribute Driven<br>Individually Specified |
| Define Target Audience | Specifying Target Audience Group | |
| Grade Count | Number of Grades - minimum 0 (when not applicable) and maximum 5 | |
| Grade Names | Names of each grade | |
| Grade Based on | Select component on which the grade will be based on. | |
| Grade Type | Manual or Automatic. Grade type can be automatic only when it's based on assessment component. | |
| Grade rules | Grade rules to be defined when grade calculation is automatic and will be based on assessment score %. | |
| Nomination Type | | Learner Nominated<br>Sponsor Nominated<br>Admin Nominated |
| Certified Learner Grade | The certification grade at which Certified Learner is eligible to Nominate Learner. | |
| Sponsor Selection Type | Learner Selected Sponsor<br>Admin Selected Sponsor<br>No Sponsor Approval | |
| Sponsor Logic | AND logic to enforce approval for all selected sponsors<br>OR logic to enforce approval by any one of the selected sponsors | AND<br>OR |
| List of Sponsors | List of employees that can play the sponsor role for this certification if specified by the Admin | |
| Sponsor Selection rules | | |
| Maximum Sponsors | The maximum number of sponsors that can be selected for this certification (e.g.: Min 0 and Max 3 allowed) | 3 |
| Sponsor Rejections Allowed | Number of rejections allowed by the sponsor. If rejections exceed this number the Learner is immediately disqualified. | 2 |
| Expiry Duration | Number of days after certification completion the certificate will expire | |
| Recertification Lead Duration | Number of days before the expiry date the Learner can register for re-certification | |
| Grace Period Duration | Number of days after the expiry date the Learner can register for re-certification | |
| Recertification Period | Number of days after registration the Learner is required to complete recertification | |
| Retire Date | The date when the certification will retire | |
| Attempts | Number of times failures or disqualifications allowed for the certification | |

TABLE 2-continued

Certification Attributes

| Attribute Name | Attribute Description | Sample Values |
| --- | --- | --- |
| Attempt Delay | Number of days between 0 and 365 starting the cancellation or disqualification date that the learner is not allowed to register again. | |
| List of Configuration Administrators | The list of configuration administrators that have permission to configure the certification | |
| List of Program Administrators | The list of program administrators that have permission to manage roster. | |
| Learner allowed to self-cancel registration | System must ALLOW for Candidate to self-cancel or PREVENT candidates from self-cancelling their registration based on this configuration | |
| From Email Name | Configure from name which should be displayed in the emails sent for the certification. | |
| Prior completion threshold | In case learner has completed training, prior to registering in the certification, the system must facilitate admin to set a time period where that completion is counted towards the certification. Prior completion threshold will be set at the certification level. This logic will be only applicable to groups where double counting of credits is prevented. | 12 months |
| Notification Switch | On, Off. Determines whether notifications will be sent for this certification. This switch overrides all component level switches. | |

The component group 315 of the certification 225 may have attributes such as those in table 3.

TABLE 3

Component Group Attributes

| Attribute Name | Attribute Description | Sample Values |
| --- | --- | --- |
| Name | | |
| Logic Type | | "Any One"/OR Logic "All"/AND Logic X of Y Logic X hours or Y hours Logic |
| List Pre-requisite Groups | All groups that are pre-requisites for this group | |
| List of Pre-requisite Components | All components that are pre-requisites for this group | |
| Prevent/Allow Double counting | In Prevent double-counting, system will NOT give credit to a learner more than one time for a single training in multiple certifications. In allow double counting credit for the training will be always given. Prevent double counting will be mostly used for electives groups. | |

The administrating entity 116 may add, remove, or modify components within the component group 315. The components are the content assets within the component group 315 that represent an activity to be completed in order to progress in the certification 225. The components encapsulate status, tracking, and reference information for different types of activities. The components may be grouped together into categories. For example, the components may be categorized into six types of components—1) Training Component; 2) Assessment Component; 3) Experience Component; 4) Interview Component; 5) Evaluation Component; and 6) Certification Component. In other examples, fewer, more, or different categories may be possible.

The categorization may be based on attributes of the components. For example, Table 4-Table 10 list example attributes of the example categories above. The component group 315 may include another certification as a component of the certification 225.

TABLE 4

Training Component Attributes

| Attribute Name | Attribute Description | Sample Values |
|---|---|---|
| Name | Name of the training as it should appear to the Learner | |
| List Pre-requisite Groups | All groups that are pre-requisites for this group | |
| List of Pre-requisite Components | All components that are pre-requisites for this group | |
| Training Vendor Name | Name of the application that will be delivering the training | ABC |
| Training code | The reference code of the in the vendor application | <ABC Training code> |

TABLE 4-continued

Training Component Attributes

| Attribute Name | Attribute Description | Sample Values |
|---|---|---|
| Vendor Training Name | Name of the training as specified by the Vendor. This value should be visible to the Learner if the Name value is not present. | |
| URL | Deep URL to the training in the Vendor application | |
| Notification Switch | On, Off. Determines whether notifications will be sent for this component. | |

TABLE 5

Assessment Component Attributes

| Attribute Name | Attribute Description | Sample Values |
|---|---|---|
| Name | Name of the assessment as it should appear to the Learner | |
| List Pre-requisite Groups | All groups that are pre-requisites for this group | |
| List of Pre-requisite Components | All components that are pre-requisites for this group | |
| Attempts | Number of times failures allowed for the assessment | |
| Attempt Delay | Number of days of delay between 2 attempts Can be set between 0 and 365 days. | |
| Assessment Vendor Name | Name of the vendor that will be delivering the assessment | VendorX |
| Assessment Code | The reference code of the in the vendor application | <VendorX Unique Assessment ID> |
| URL | Multiple VendorX url to be set per assessment component. System to randomly launch url for learners. System shouldn't use the same url again for learner in case of reattempt unless all urls are used for the learner. | |
| Pass cut score % | Define minimum score % required to pass the assessment component | |
| Notification Switch | On, Off. Determines whether notifications will be sent for this component. | |

TABLE 6

Evaluation Component Attributes

| Attribute Name | Attribute Description | Sample Values |
|---|---|---|
| Name | | |
| List Pre-requisite Groups | All groups that are pre-requisites for this group | |
| List of Pre-requisite Components | All components that are pre-requisites for this group | |
| Evaluation Vendor Name | Name of the vendor that will be delivering the evaluation | XYZ Vendor |
| Evaluation Code | The reference code of the in the vendor application | <XYZ Vendor Unique Assessment ID> |
| URL | XYZ Vendor URL to be launched for Evaluation | |
| Notification Switch | On, Off. Determines whether notifications will be sent for this component. | |

TABLE 7

Experience Component Attributes

| Attribute Name | Attribute Description | Sample Values |
|---|---|---|
| Name | Name of the experience component as it should appear for the Learner | |
| Experience Vendor Name | Name of the vendor that will be capturing the experience | Experience Management System (Complex) Exp B (Simple) |
| List Pre-requisite Groups | All groups that are pre-requisites for this group | |
| List of Pre-requisite Components | All components that are pre-requisites for this group | |
| Notification Switch | On, Off. Determines whether notifications will be sent for this component. | |

TABLE 8

Simple Experience Capture Module

| Attribute Name | Attribute Description | Sample Values |
|---|---|---|
| Experience Approval Needed | Yes/No | |
| Experience Approver | Any one of the following role can be the approver if approval is required: Supervisor, Career Counselor, Training Approver, HR, or a specific individual or Enterprise group. | |
| Person days/months | Define person days/months of experience which learner should document and get approved for marking the experience component as complete. When person days/months requirement is not needed, admin can configure the required number of days/months to 'ZERO' | 12 months of experience |
| Experience Capture Form Template | Templates of the experience capture form that will be presented to the learner to capture experience. | |
| Notification Switch | On, Off. Determines whether notifications will be sent for this component. | |

TABLE 9

Interview Component Attributes

| Attribute Name | Attribute Description | Sample Values |
|---|---|---|
| Name | Name of the Interview component as it should appear for the Learner | |
| Interview Vendor Name | Name of the vendor that will be capturing the interview | Interview Management System |
| List Pre-requisite Groups | All groups that are pre-requisites for this group | |
| List of Pre-requisite Components | All components that are pre-requisites for this group | |
| Attempts | Number of times failures allowed for the interview | |
| Attempt Delay | Number of days of delay between 2 attempts. Can be set between 0 and 365 days. | |
| Notification Switch | On, Off. Determines whether notifications will be sent for this component. | |

TABLE 10

Certification Component Attributes

| Attribute Name | Attribute Description | Sample Values |
|---|---|---|
| Name | Name of the Certification as it should appear to the Learner | |
| Certification Vendor Name | Name of the certification vendor that will deliver the certification | ABC <External> |
| Certification Code | Unique identified for the certification | |
| Vendor Certification Name | Name of the certification as specified by the Vendor. This value should be visible to the Learner if the Name value is not present. | |
| URL | Deep link that points to the certification | |
| List Pre-requisite Groups | All groups that are pre-requisites for this group | |
| List of Pre-requisite Components | All components that are pre-requisites for this group | |
| Notification Switch | On, Off. Determines whether notifications will be sent for this component. | |

Once the certification 225 and/or the certification family 227 with respective constituents is created and or revised, the administrating entity 116 may test the certification family 227 and/or the certification 225 prior to deployment (520). For example, the certification circuitry 201 may initially deploy the certification 225, upon creation, in a sandbox environment. For example, the certification circuitry 201 may identify changes that may result upon deployment of the certification 225. The administrating entity 116 may ensure that the deployment would change the correct records and test other factors of the certification, such as the correctness of the predetermined completion order 225B. If a test fails, the administrating entity 116 may make changes to the certification 225. In an example, the certification circuitry 201 may analyze the entity profile database 122 to identify one or more content consuming entities 115 that may be affected by changes to the certification 225. The administrating entity 116 may simulate being one of the content consuming entity affected and browse the certification portal 230 of the affected content consuming entity. The administrating entity 116, by browsing the certification portal 230 as the affected content consuming entity in the sandbox, may identify shortcomings of the changes to the certification 225. Accordingly, the administrating entity 116 may revise the changes to the certification 225 prior to deployment.

Once the administrating entity 116 is satisfied with the certification 225, the administrating entity 116 may deploy the certification 225 (530). Once deployed, the related records throughout the organization, such as the records in the entity profile database 122, or any other system in the organization may be updated according to the configuration of the certification 225. The administrating entity 116 may test and deploy the certification family 227 similarly (530).

The administrating entity 116 may associate, or attach a recertification to the certification 225 and/or the certification family (540). The administrating entity 116 may create and configure the recertification in the same manner as the certification 225, as described throughout this document. The administrating entity 116 may shelve the certification 225 (550). Alternatively or in addition, the administrating entity 116 may retire the certification 225 (560).

Similarly, the administrating entity 116 may shelve or retire the certification family 227. Shelving the certification family 227 may shelve the constituent certifications 227a-227f of the certification family 227. Retirement of the certification family 227 may retire the constituent certifications 227a-227f. Alternatively or in addition, the certification family 227 may be shelved (or retired) only if each of the certifications 227a-227f are shelved (or retired).

Figure 6:
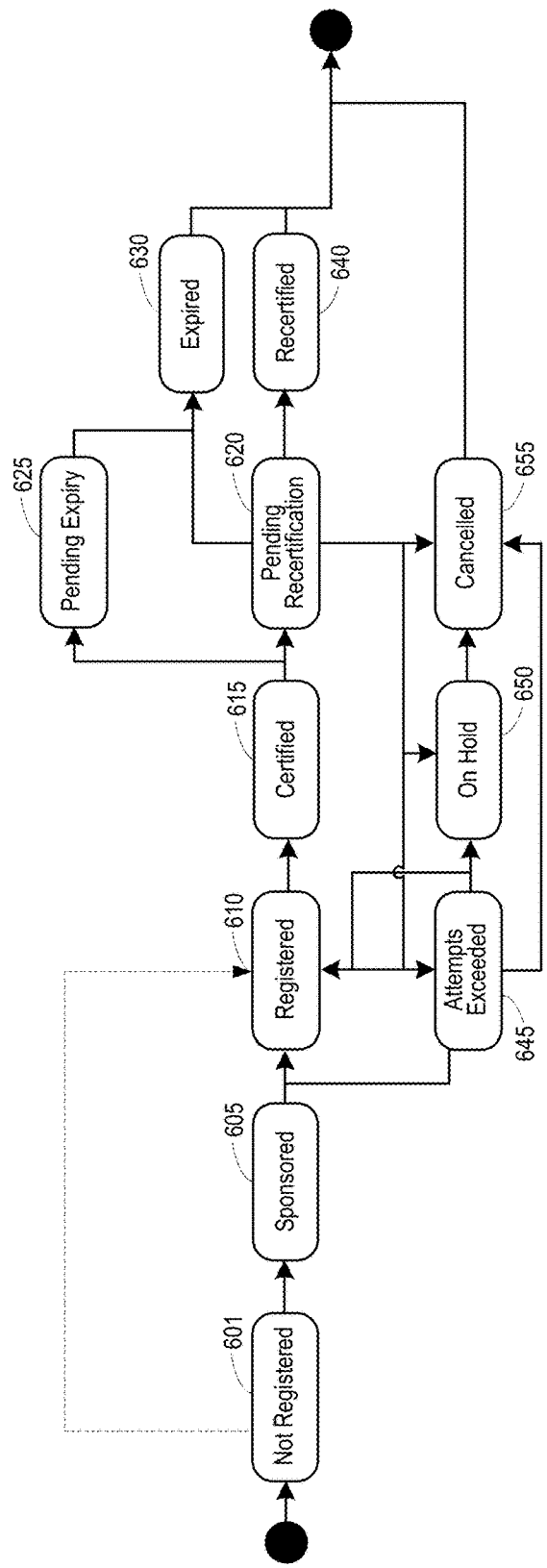
FIG. 6 illustrates example stages of a certification or a certification family once it is in the live state.

FIG. 6 illustrates stages of the certification 225 and/or the certification family 227 once it is in the live state and as the content consuming entity 115 interacts with the certification 225 via the certification portal 230. For example, the certification 225, when deployed is not registered by the content consuming entity 115 (601). A sponsoring entity 117 may sponsor the content consuming entity 115 for the certification 225. The certification 225 may be marked as sponsored (605). The sponsored content consuming entity 115 may enroll or register for the certification 225. The certification 225 may be marked as registered (610). In another example, the content consuming entity 115 may register without being sponsored. (610). The content consuming entity 115 may complete the certification 225. The certification 225, at this stage, may be marked as completed or certified (615). The certification 225 may also be marked as pending a recertification (620). The certification 225 may have an expiry date, after which the certification 225 may be deemed as expired. The expiry date may be based on the skill or proficiency associated with the certification 225. The skill or proficiency may be demonstrated by completing one or more recertification.

A recertification may be a certification or a certification family. The recertification may be the same as the certification 225. Alternatively or in addition, the recertification may be a different certification or certification family. The administrating entity 116 may configure the recertification associated with the certification 225, similar to the configuration of the certification 225. For example, the content consuming entity 115 may have to enroll in the recertification according to demographic criteria for the certification 225. The recertification may be configured at the same time as the certification is configured. In other examples, the recertification may be configured at a different time. The content consuming entity 115 may receive a notification informing about expiration of the certification 225 as the expiration date nears. For example, the certification circuitry 201 may send the notification one month in advance of the expiry date. The certification circuitry 201 may send repeated notifications, such as two weeks in advance, and again one week prior to the expiry date. The content consuming entity 115 may configure timing and frequency of the notification via the certification portal 230, such as via the user dashboard 305.

Alternatively or in addition, the certification 225 may be marked as waiting for expiry, or pending expiry (625). For example, the certification 225 may be of a type that may not be recertified. The certification 225 ineligible for recertification, may be marked as expired at the specified expiry date (630). If the certification 225 is eligible for recertification, however if the content consuming entity 115 fails to complete the recertification by the expiry date, the certification 225 may be marked as expired on the expiry date (630). Instead, if the content consuming entity 115 completes the recertification by the expiry date, the certification 225 may be marked as recertified (640).

The content consuming entity 115 may have a limited number of attempts, or a limited time to complete the certification 225 and/or a subsequent recertification. If the content consuming entity 115 fails to complete the certification 225 in the predetermined number of attempts or within the preset time, the certification 225 may be marked as such, for example as failed, or attempts exceed (645). The content consuming entity 115 may be facilitated to save progress in the certification 225 by placing the certification 225 on hold (650). For example, if the content consuming entity 115 may not complete the certification within the preset time, the content consuming entity 115 may place the certification 225 on hold and resume the certification 225 at a later date. Alternatively or in addition, the content consuming entity 115 may withdraw from the certification 225, in which case the certification 225 may be marked as cancelled (655).

Figure 36:
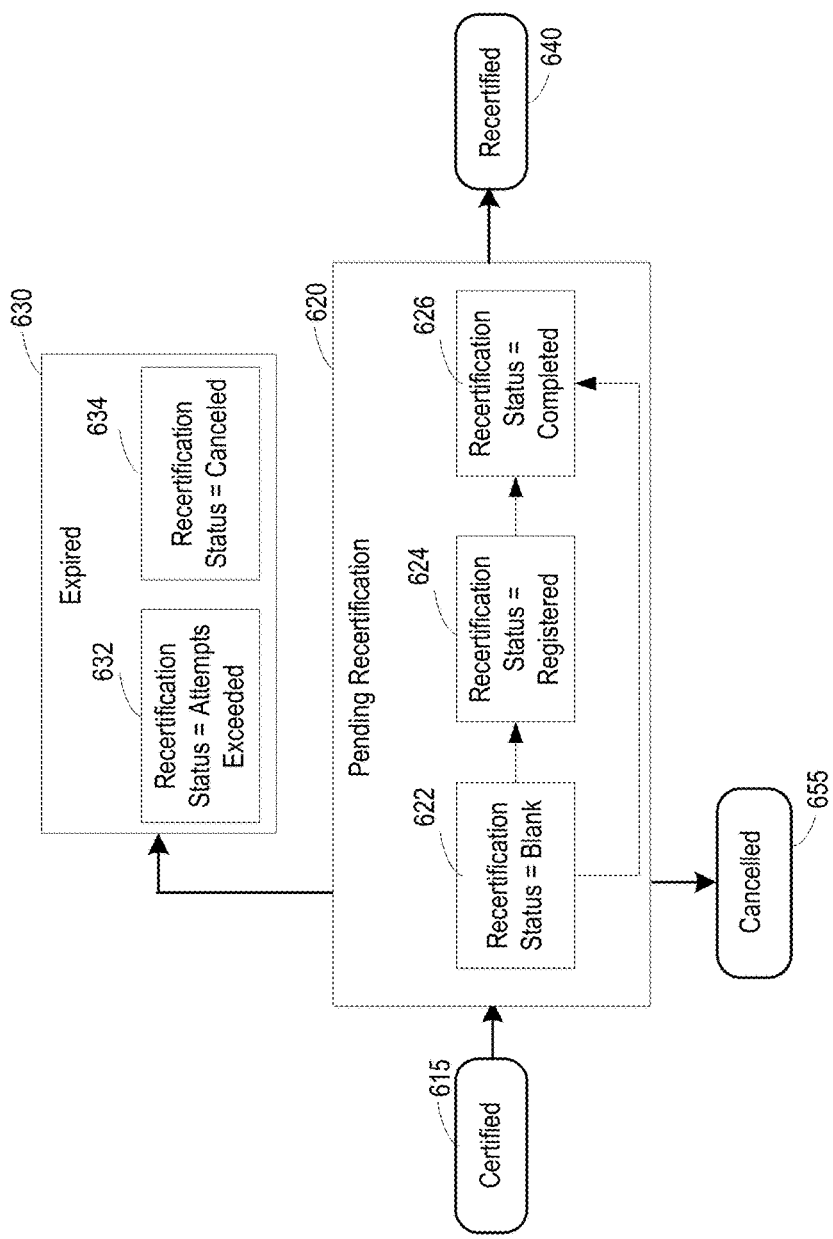
FIG. 36 illustrates example stages of a certification or a certification family during a recertification.

FIG. 36 illustrates example stages of a certification or a certification family during a recertification. For example, after the certification 225 is in the certified state (615), the certification 225 in the pending recertification state (620) a recertification status may be appended to the certification 225. For example, the recertification status may be blank (622). Such a recertification status may be indicative that a recertification program for the certification 225 has not yet been initiated. In an example, an administrator may still be designing a recertification program for the certification 225. Alternatively, the certification 225 may not have a recertification requirement associated with it. The recertification status may also be marked as registered. (624), when the content consuming entity 115 registers for the recertification program for the certification 225. The recertification status may also be marked as completed (626) when the content consuming entity 115 completes the recertification program. The certification 225, from any status of the recertification, may be marked expired (630), recertified (640), or canceled (655), if the content consuming entity 115 completes (or does not complete) activities for transition to the respective state. If the certification is marked expired due to the content consuming entity's 115 failure to complete the recertification, the recertification status may indicate why the content consuming entity 115 failed to complete the recertification. For example, the recertification status may be marked as canceled (634) or attempts exceeded (632). The status of the recertification may be marked according to a recertification workflow.

Figure 37:
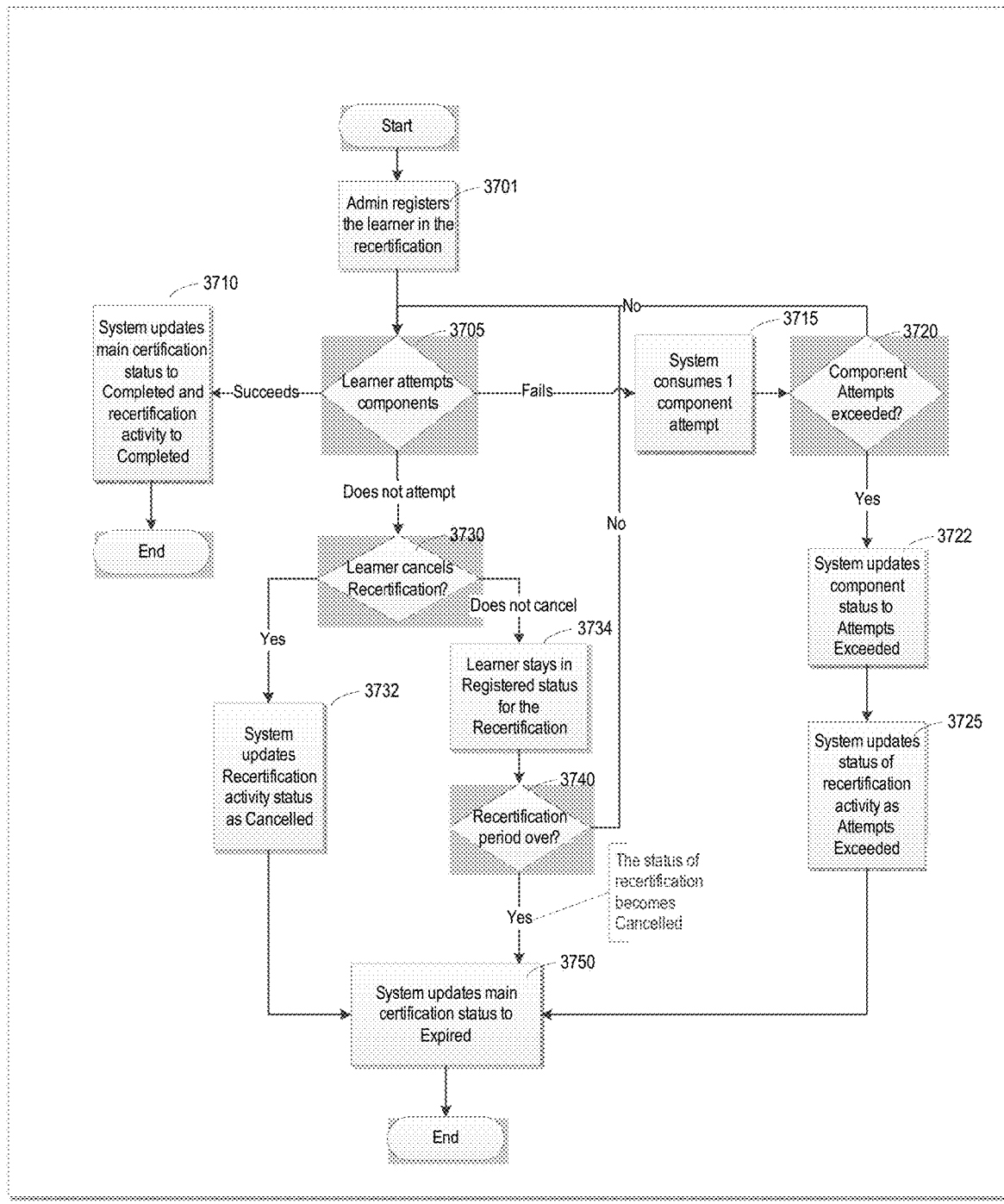
FIG. 37 illustrates example workflow of a certification management system may use for enrolling a content consuming entity in a recertification.

FIG. 37 illustrates example workflow of a certification management system may use for enrolling a content consuming entity in a recertification. An administrating entity 116 may register the content consuming entity 115 in the recertification. (3701). The content consuming entity 115 may attempt the components of the recertification. (3705). Based on the results of the attempts, the system may mark the certification 225 and the recertification. For example, if the content consuming entity 115 successfully completes the components of the recertification within a prescribed time limit, the certification management system 200 may mark the recertification completed. (3710). Alternatively, if the content consuming entity 115 in an attempt to complete the components, fails to meet predetermined criteria, the certification management system 200 may determine if the content consuming entity 115 is allowed further attempts to completed the recertification. (3715, 3720). If additional attempts are allowed, the certification management system 200 facilitates the content consuming entity 115 to try and complete the recertification components. (3705). In case a predetermined number of attempts to complete the recertification is exceeded, the certification management system 200 may mark the recertification as attempts exceeded (632) and the certification 225 as expired. (3720, 3725, 3750). In an example, the certification management system 200 may mark a component that the content consuming entity 115 may have exceeded attempts on. (3722).

In an alternative case, if the content consuming entity 115 fails to attempt the recertification within a predetermined time, the certification management system 200 may determine if the content consuming entity 115 canceled the recertification. (3730). If the content consuming entity 115 canceled the recertification, the certification management system 200 may mark the recertification as canceled (634), and the certification 225 as expired. (3732, 3750). If the content consuming entity 115 has not canceled the recertification, the certification management system 200 may maintain the recertification in the registered (624) state. (3734). The certification management system 200 may maintain the registered (624) state until expiry of the predetermined period for completing the recertification. (3740). Once the expiration date passes, the certification management system 200 may change the status of the recertification to canceled (634), and change the status of the certification 225 to expired. (3750).

The content consuming entity 115 may progress the certification 225 through the stages by interacting with the certification 225 via the certification portal 230. However the content consuming entity 115 may only interact with the certification 225 after the certification 225 is created and configured by the administrating entity 116. Furthermore, the content consuming entity 115 may interact with the certification 225 after the administrating entity 116 associates the content consuming entity 115 with the certification. The administrating entity 116 may associate the content consuming entity 115 with the certification after the sponsoring entity 117 sponsors the content consuming entity 115.

Reconfiguration

The certification management system 100 may facilitate dynamic reconfiguration of the certification 225 and/or the certification family 227. For example, in step 520 the administrating entity 116 may revise the certification family 227, the certification 225, and/or the component group 315. Changes to the certification family 227 while the certification family 227 and its constituent certifications are in Draft or Validated state may be accepted and saved without triggering a migration process. However, changes to the certification family 227 while the status of the certification family 227 is in Live state may trigger the migration process. Similarly, changes to the certification and/or component group 315 that are live may trigger the migration process.

For example, consider an example dynamic reconfiguration of the certification 225. Assume that the certification 225 was deployed, the sponsoring entity 117 sponsored, or nominated one or more of the content consuming entities 115 for the certification 225. The enrolled content consuming entities may have completed the certification 225 at different stages respectively. For example, a first content consuming entity may have completed the certification 225, while a second content consuming entity may have partially completed the components, while a third content consuming entity may have yet to start.

The certification circuitry 201 may analyze the revision of the certification 225. Based on the revision, the certification circuitry 201 may update the certification completion status of the enrolled content consuming entities. The certification circuitry 201 may send notifications according to the analysis to the enrolled content consuming entities. The certification circuitry 201 may additionally or alternatively update the entity profile database 122 according to the affected certification completion status. The enrolled content consuming entities may be referred to as learners.

The certification circuitry 201 may analyze a revision to determine if an individual component or a group without dependent groups is added to the certification. In such a case, the certification circuitry 201 may mandate enrolled learners to complete the added component/group if there are other components pending. However, if only a program evaluation is pending, then the certification circuitry 201 may not mandate completion of the newly added component/group by the learners.

Alternatively, if an individual component or group without a dependent group is modified, the certification circuitry 201 may reopen the modified component or group if already completed by the learners if there are other components pending along with the program evaluation. If only the program evaluation is pending, then the certification circuitry 201 may not mandate completion of the modified component or group by the learners.

In another example, if an individual component or group is added and is made a prerequisite of other components or groups, the certification circuitry 201 may mandate learners to complete the added component or group if the dependent components or groups are not completed (not started/in-progress) by the learner. If dependent components or groups are already completed by learners, then the certification circuitry 201 may not mandate completion of the newly added group.

If an individual component or group which has dependent components or groups is modified (modified component/group is a prerequisite of other components/groups), the certification circuitry 201 mandate learners to complete the component or group if the dependent components or groups are not completed (not started/in-progress) by learners. If dependent components or groups are already completed by learners, then the certification circuitry 201 may not mandate completion of the modified group.

Figure 8:
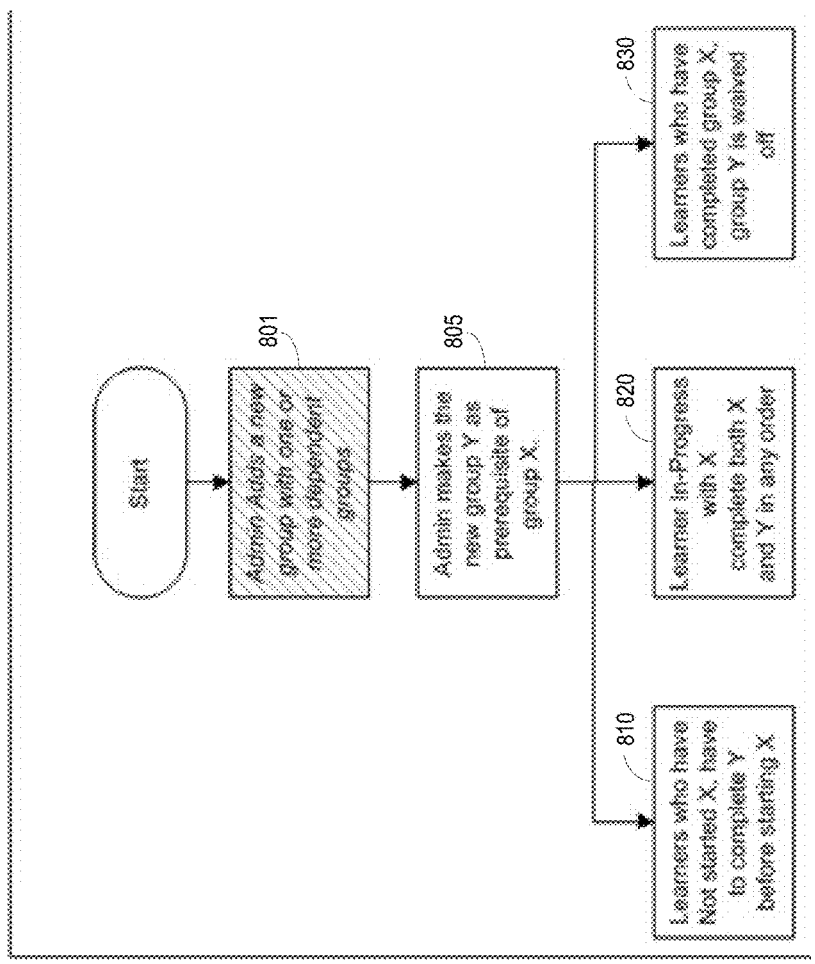
FIG. 8 illustrates an example where a new component group with one or more dependent groups is added to a certification.

FIG. 8 illustrates an example where a new component group with one or more dependent groups is added to the certification 225. Assume that the certification 225 is live and has a component group X which contains two trainings using 'Or' logic. The new component group Y may have 3 trainings using 'And' logic and the new group Y is configured as a prerequisite of the component group X (801). The certification circuitry 201 may add the new group Y to the certification 225 and make group Y a prerequisite of group X (805). The certification circuitry 201 may analyze these changes. For the learners who have not started the group X, the certification circuitry 201 may mandate Learners to first complete group Y before starting with group X (810). These learners may have to complete both group Y and group X. For the Learners who are in progress of completing the group X, the certification circuitry 201 may mandate learners to also complete group Y for certification to be marked as complete (820). These learners may have to complete both group Y and group X. For the Learners who have already completed the dependent group X, the certification circuitry 201 may waive off group Y since dependent group X is already complete (830). These learners won't be required to complete group Y.

Figure 9:
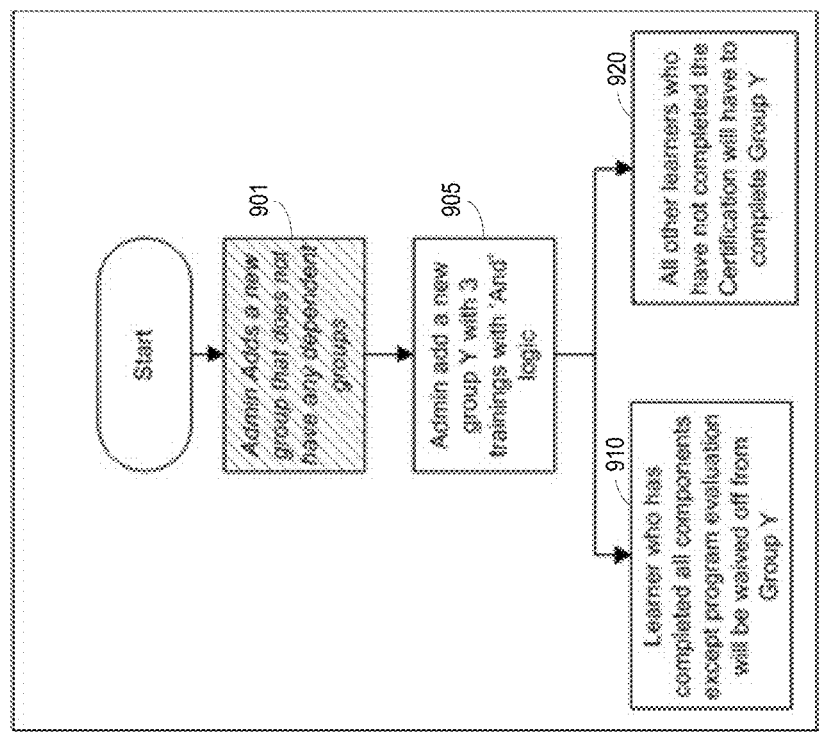
FIG. 9 illustrates an example where a new group that does not have any dependent groups is added to a certification.

FIG. 9 illustrates an example where a new group that does not have any dependent groups is added to the certification 225. Assume that the certification 225 is live with a similar configuration as earlier. In this case, the administrating entity 116 may add the new group Y which has 3 trainings using 'And' logic (901) The certification circuitry 201 may add the new group Y to the certification 225 (905). The certification circuitry 201 may mandate all the learners who have not completed the certification 225 to complete the new group Y (910). For learners who have completed all the groups/components in the certification 225 except the program evaluation component, the certification circuitry 201 may waive the newly added group Y (920). These learners won't be required to complete the group Y.

Figure 10:
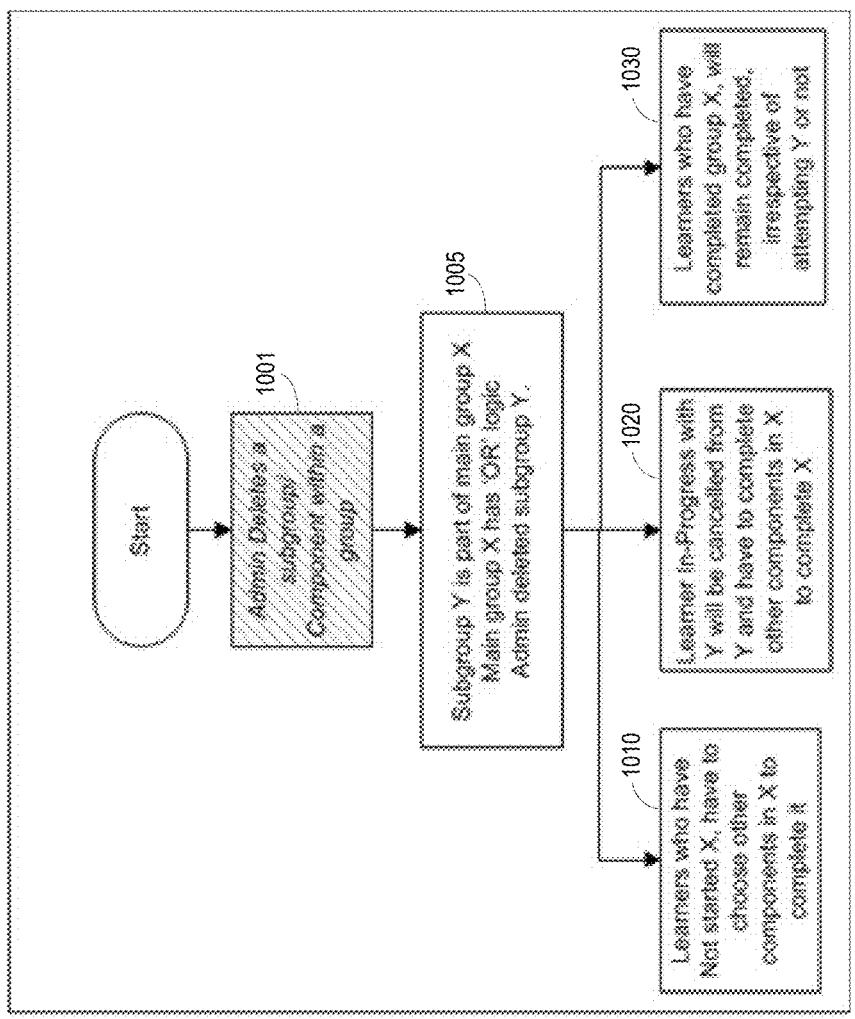
FIG. 10 illustrates an example where a subgroup/component within a component group of a certification is deleted.

FIG. 10 illustrates an example where the administrating entity 116 deletes a subgroup/component within the component group 315 of the certification 225 that uses 'Or'/'X of Y'/'Accumulate X Hours' logic. Assume that the certification 225 is live and that the subgroup Y is part of the parent component group X within the certification 225. Further, assume the component group X uses 'OR' logic. At this stage, the administrating entity 116 revises the certification 225 by deleting the subgroup Y via the certification circuitry 201 (1001). The certification circuitry 201 may identify that the group X has other child components that can be used for fulfilling the completion criterion of the group X (1005). The certification circuitry 201 may determine that for the Learners who have not started the group X there will be no impact and these learners may have to select other components in the group to complete group X (1010). For the Learners who are in progress of completing the subgroup Y in the group X, the certification circuitry 201 may cancel learners from the subgroup Y, remove subgroup Y from group X, and further mandate the learners to complete other components in the group X in order to satisfy completion criteria of the group X (1020). For the learners who have already completed the group X by either completing group Y or any other component in group X, the certification circuitry 201 may keep the learners completed in the group X (1030). Learners may not complete other components in group X to complete the group X. For scenarios for groups that use 'X out of Y', and 'accumulate X hours' logic, the respective completion criteria needs to be followed for the deleted subgroup/component, in the same order as above. This same workflow may also be applied whether or not the group X has dependent groups for example, whether or not Group X is a prerequisite of any other component/group(s).

Figure 11:
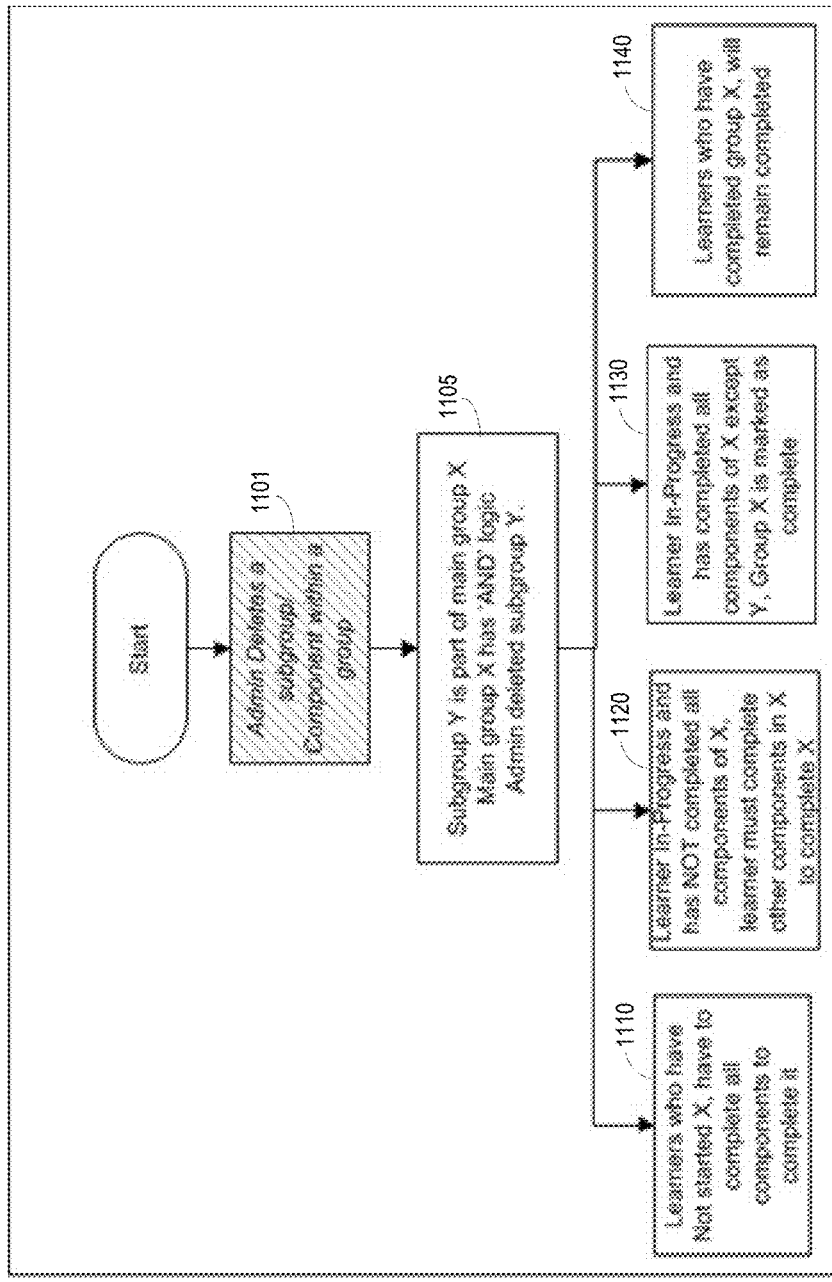
FIG. 11 illustrates another example where a subgroup/component within a component group of a certification is deleted.

FIG. 11 illustrates an example where the administrating entity 116 deletes a subgroup/component within the component group 315 of the certification 225 that uses 'And' logic. Here, assume that the subgroup Y is part of the group X, which is the parent component group 315. Also, in this case, the parent group X uses 'AND' logic. The administrating entity 116 deletes the subgroup Y from the group X, via the certification circuitry 201 (1101). The Learners who have not started the group X may have to complete other components in the group X to complete group X (1110). Learners, who have in progress status for group X and have not completed all other components in that group, may have to complete other components of group X before the certification circuitry 201 may mark the group X as complete (1120). For the Learners who have in progress status for group X and have completed all other components except group Y, the certification circuitry 201 may mark the group X as complete (1130). For the Learners who have already completed group X, the certification circuitry 201 may pertain learners completion for group X (1140). The same workflow may be applicable whether or not Group X has dependent groups, for example, whether or not Group X is a prerequisite of any other component/group(s).

Several other example scenarios of certification reconfiguration are possible. Some of the possible examples and steps taken by the certification circuitry 201 in these cases are illustrated in FIGS. 16-35.

Thus, the certification management system 100 may allow configuration and reconfiguration of the certification 225 and or certification family 227. In case the reconfiguration is performed while the content consuming entities are in the middle of training, the certification management system 100 may identify the impact on the respective content consuming entities and update the respective certification portals 230 accordingly. In some cases, different content consuming entities may be impacted differently, such as the several scenarios discussed throughout this document. In an organization with several thousands of employees, the certification management system 100 may provide a systematic and cost efficient technical solution to the technical problem of updating several thousand records of the employees. In some cases, revisions to the certification 225 or the certification family 227 may cause changes for all learners enrolled in the certification 225, irrespective of respective completion status. Such changes may include, changes to certification family name, changes to certification name, addition of a new certification to the certification family 227, renaming grade names, changing the component name, changing the order of components, adding a component category, removing a component category, changes to printable certificate template.

Roster Management

The certification management system 100 may facilitate the administrating entity 116 to register the content consuming entity 115 for the certification 225 or the certification family 227.

Figure 12:
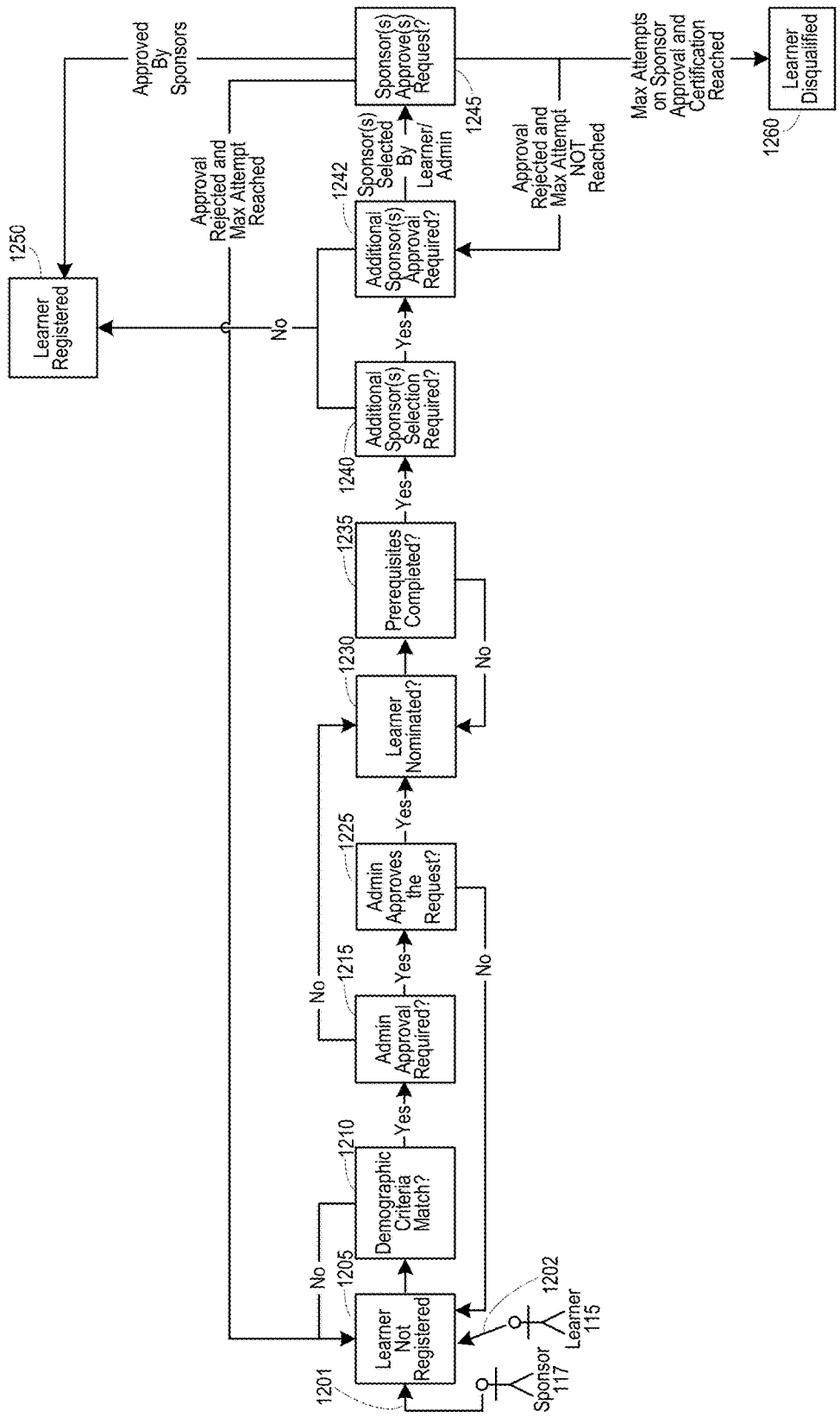
FIG. 12 illustrates an example workflow for enrolling a content consuming entity in a certification or certification family.

FIG. 12 illustrates an example workflow for enrolling the content consuming entity 115 in the certification 225 and/or the certification family 227. The workflow may initiate in response to an enrollment request from the sponsoring entity 117 or the content consuming entity 115 (1201, 1202). FIG. 12 depicts the certification circuitry 201 marking a state of the corresponding profile of the content consuming entity 115 (learner). For example, the learner may be in one of the following states—not registered (1205), nominated (1230), registered (1250), and disqualified (1260). The content consuming entity 115 may initially be in the not registered state prior to sending the enrollment request. The content consuming entity 115 may have to satisfy certain predetermined conditions to be nominated for the certification 225. Once nominated, the content consuming entity 115 may have to satisfy further conditions prior to being enrolled in the certification 225. The certification circuitry 201 may analyze the entity profile of the content consuming entity 115 as well as the attributes of the certification 225 among other information in order to determine if the content consuming entity 115 is eligible to enroll for the certification 225. There may be fewer or more states in other examples.

The content consuming entity 115 may send the enrollment request in response to a nomination, or an sponsorship from the sponsoring entity 117 (1202). Alternatively or in addition, the sponsoring entity 117 may send the enrollment request on behalf of the content consuming entity (1201). The example is described for the certification 225, however similar steps may be followed for the certification family 227. The content consuming entity 115 may identify the certification 225 to enroll in via the certification management system 100. For example, the content consuming entity 115 may search the available certifications via the certification portal 230. The content consuming entity 115 may request registration in the certification 225. The certification circuitry 201 may query the entity profile database 122 and analyze whether the demographic information of the content consuming entity 115 satisfies the criteria for the certification 225 (1210). The criteria may include geographical unit, country, metro city, career track, talent segment, capability, specialty or skill, industry, industry detail, career level, months at level (MAL), tenure at organization, should be certified in xxxxx program/tier, master client (master clients are the client entity where the Learner charges most of their time), client (minority time charged by the Learner is tagged as client), people hierarchy values, experienced hires, or any combination thereof.

If the demographic information criteria is not met, the enrollment request from the content consuming entity 115 may be denied. If the demographic criteria are satisfied, the certification circuitry 201 may determine if the administrating entity 116 has to approve the enrollment request from the content consuming entity 115 (1215). The content consuming entity 115 may be deemed nominated if an approval by the administrating entity 116 is not required (1225, 1230). Instead, if the approval is required and if the administrating entity 116 denies the enrollment request the content consuming entity 115 is not registered (1225, 1205). If the administrating entity 116 approves the enrollment request, the content consuming entity 115 may be nominated for the certification 225 (1225, 1230).

Once nominated, the certification circuitry 201 may determine whether the content consuming entity 115 has completed the prerequisites associated with the certification 225 (1235). The enrollment request may be denied if the prerequisites have not been completed and the content consuming entity 115 may still be deemed as nominated (1230). The content consuming entity 115 may complete the prerequisites and try again. The prerequisites may include another certification, a training, an assessment, an interview, a sponsor approval, or any other condition.

If the prerequisites are satisfied, the certification circuitry 201 may determine if the certification 225 demands that the content consuming entity 115 select an additional sponsor (1240). The content consuming entity 115 may select the additional sponsor that satisfies one or more rules based on sponsor selection criteria. For example, the rules may be based on demographic information of the sponsoring entities. The demographic information of the sponsoring entities may be available via the entity profile database 122. The sponsor selection criteria may include criteria such as those listed in Table 11.

TABLE 11

Sponsor Selection Criteria

Sponsor should be from the same geographic unit - yes/no
Sponsor should be from the same country - yes/no
Sponsor should be from the same city - yes/no
Sponsor should be different than supervisor - yes/no
Sponsor should be different than career counselor - yes/no
Sponsor should be certified in the program that s/he's nominating candidate
Sponsor certified in xxxxxx certification program
sponsor should have not already sponsored more than xx candidates
Geographical Unit
Country
Metro City
Career Track
Talent Segment
Capability, Specialty, or Skill
Industry
Industry Detail
Career Level
Months at Level (MAL)
Tenure at organization
Master Client TABLE 11-continued Sponsor Selection Criteria Client
People Hierarchy Values
Sponsor should be from the same project/client/master client - Yes/No.

If the additional sponsor is selected according to the sponsor selection criteria, the certification circuitry 201 may determine if the selected additional sponsor has to approve the enrollment request from the content consuming entity 115 (1240, 1242). If the approval is not required, the content consuming entity 115 may be enrolled, or registered in the certification 225 (1242, 1250). If the approval is required, the certification circuitry 201 may determine if the additional sponsor approves the enrollment request (1242, 1245). The certification circuitry 201 may notify the additional sponsor that the enrollment request is awaiting approval.

If the additional sponsor approves the enrollment request, the content consuming entity 115 may be registered (1245, 1250). Instead, if the additional sponsor denies the enrollment request from the content consuming entity 115, the content consuming entity 115 may not be registered, however the content consuming entity 115 may stay in the nominated state (1245, 1242). The content consuming entity 115 may resend the enrollment request for approval from the additional sponsor. The content consuming entity 115 may choose a different additional sponsor upon denial of the approval. In another example, the selection of the additional sponsor may not be changed. However, there may be a maximum number of attempts that the content consuming entity 115 may request approval from the additional sponsor. If the enrollment request is denied for a predetermined maximum number of times, the content consuming entity 115 may be disqualified from enrolling in the certification 225 (1245, 1260).

Figure 13:
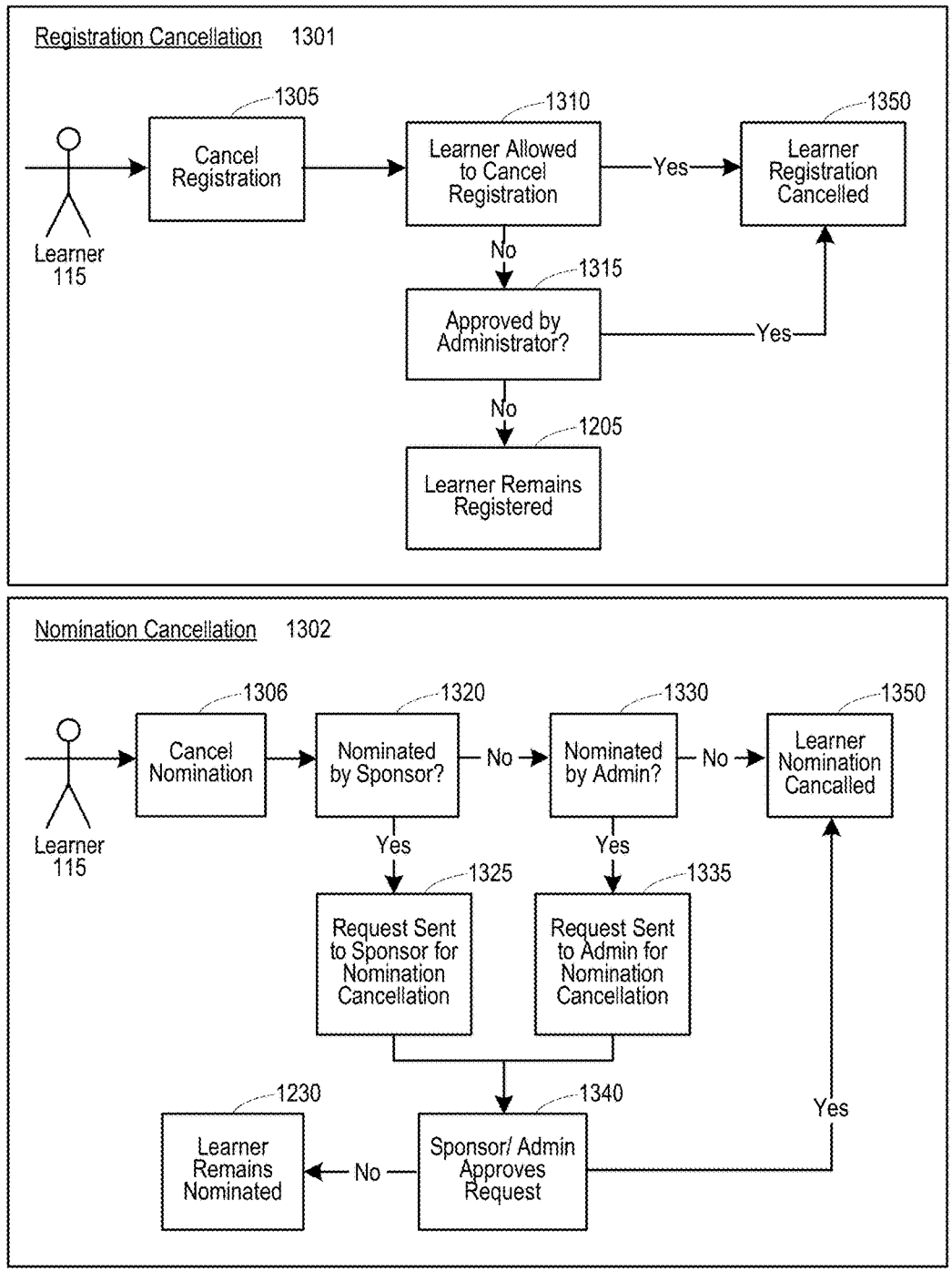
FIG. 13 illustrates example workflow a certification management system may use to withdraw registration or nomination of a content consuming entity in a certification or certification family.

Once enrolled in the certification 225 and/or the certification 227, the content consuming entity 115 may cancel, or withdraw the enrollment. FIG. 13 illustrates example workflow the certification management system 100 may use to withdraw the registration. For example, in a workflow 1301, the content consuming entity 115 may request cancellation (1305). The certification circuitry may determine if the content consuming entity 115 is facilitated to withdraw from the certification (1310). The certification circuitry 201 may make the determination based on the attributes of the certification 225. If the content consuming entity 115 can withdraw, the certification circuitry 201 may mark the profile of the content consuming entity 115 accordingly, for example, the content consuming entity 115 may be in the 'registration cancelled' state (1350). Instead, if the content consuming entity 115 is not allowed to withdraw, the certification circuitry 201 may send an approval request to the administrating entity 116 (1315). If the administrating entity 116 approves the cancellation request, the certification circuitry may cancel the registration (1315, 1350). Instead, f the administrating entity 116 denies the cancellation request, the content consuming entity 115 stays in the registered state, and the corresponding entity profile reflects the registration status accordingly (1205). When the content consuming entity 115 withdraws from the certification 225, the certification circuitry 201 may retain completion statuses of the components of the certification 225.

In another example, in a workflow 1302, the content consuming entity 115 may request cancellation of a nomination from the administrating entity 116 and/or the sponsoring entity 117 (1306). The certification circuitry 201 may determine if the content consuming entity 115 enrolled in the certification 225 based on a nomination from either the sponsoring entity 117 or the administrating entity 116 (1320, 1330). If either did not nominate the content consuming entity 115, the nomination of the content consuming entity 115 may be cancelled per the cancellation request (1320, 1330, 1350). Instead, if the content consuming entity 115 was nominated by the sponsoring entity 117, the certification circuitry 201 may send an approval request to the sponsoring entity 117 (1325). Alternatively or in addition, if the content consuming entity 115 was nominated by the administrating entity 116, the certification circuitry 201 may send an approval request to the administrating entity 116 (1335). If the administrating entity 116 and/or the sponsoring entity 117 approve the cancellation request, the nomination of the content consuming entity 115 may be cancelled (1340, 1350). However, if the administrating entity 116 and/or the sponsoring entity 117 deny the cancellation request, the content consuming entity 115 may remain nominated (1230).

Thus, the certification management system 100 may facilitate the content consuming entity 115, such as an employee, of the organization to enroll in the certification 225 on his/her own accord. Alternatively or in addition, the certification management system 100 may facilitate the sponsoring entity 117, such as a team-leader or a project manager to identify a specific employee based on demographic information for enrollment in the certification 225. This may facilitate the sponsoring entity 117 to hand pick team members with determined demographic information and sponsor them for the certification 225. Further, the certification management system 100 may seek approval from two or more sponsoring entities to enroll the content consuming entity 115 in the certification 225.

Recertification

Figure 14:
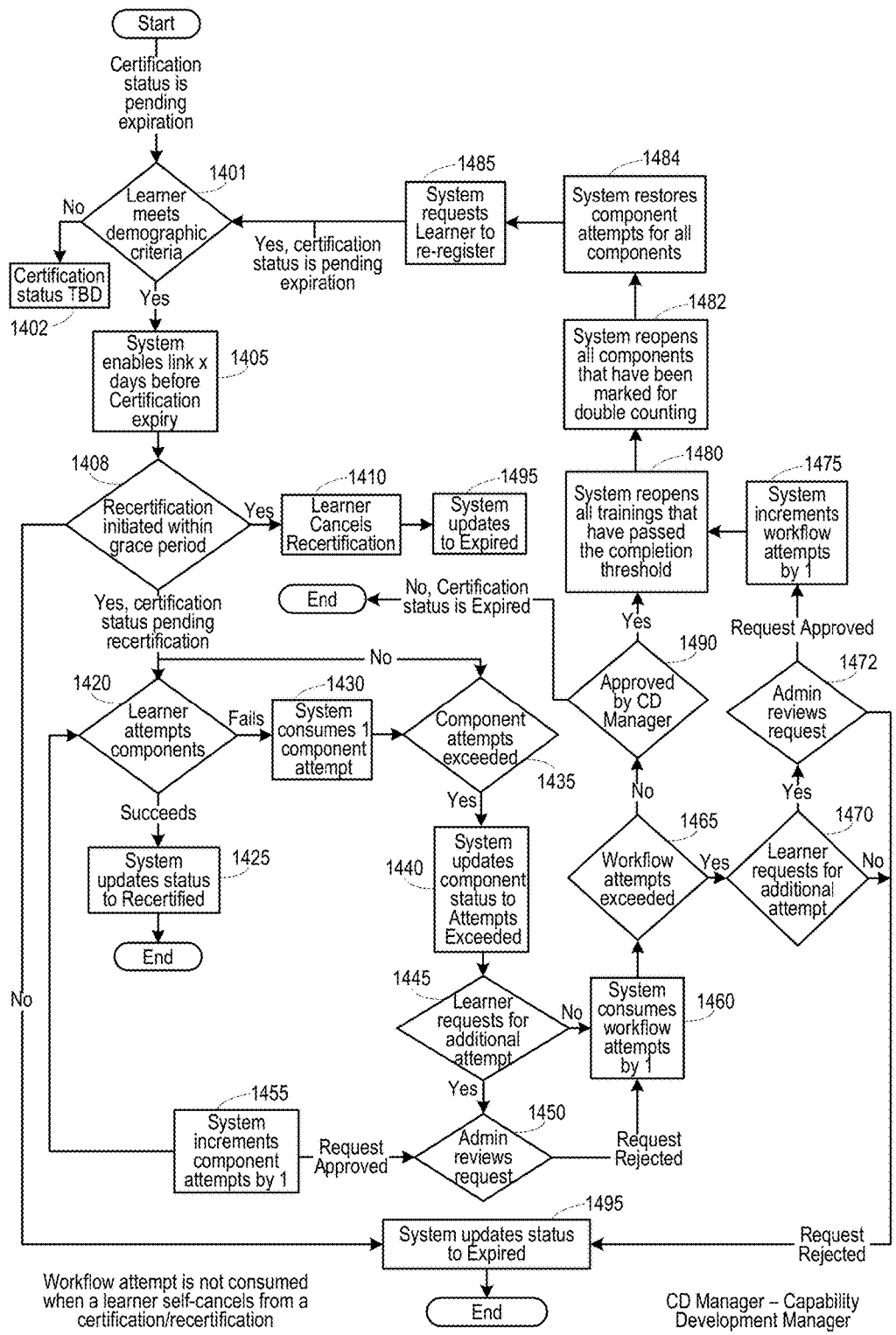
FIG. 14 illustrates an example workflow of a certification management system may use to track and store a certification expiry or recertification status of the certification.

The certification management system 100 may facilitate maintaining expiration and recertification status of the certification 225 and/or the certification family 227. FIG. 14 illustrates an example workflow of the certification management system 100 to track and store the certification expiry and recertification status of the certification 225. Similar steps are applicable for the certification family 227. The administrating entity 116 may link recertification related attributes to the certification 225 as part of configuring the certification 225.

As described throughout this document, the certification management system 100 may update the respective entity profiles of the content consuming entities enrolled in the certification 225 in response to such a revision. In this regard, the certification management system 100 may update the respective entity profiles based on current completion status of each of the entity profiles. In this regard, the certification management system 100 may track the completion status of the certification 225 throughout the life-cycle of the certification 225. For example, the certification management system 100 may keep track of a number of certification attempts by the content consuming entity 115. One certification attempt may be counted when the content consuming entity 115 registers for the certification 225 and exceeds assessment or interview component completion or sponsor approval attempts. Thus, if the content consuming entity 115 fails to successfully complete the certification 225, the corresponding certification attempt count may be incremented by one. The certification management system 100 may track of individual component attempts for the components within the certification 225. The certification attempt count may be applicable until the certification 225 has not been completed for the first time. The certification attempt count may be reset upon successful completion.

In addition, the certification management system 100 may keep track of the expiry of the certification 225 and the time left for the expiration. The certification 225 may be deemed out of date as of the expiry date specified by the administrating entity 116. The certification management system 100 may deem the certification 225 as 'pending expiration' when the expiry date is nearing expiry. The certification management system 100 may identify the certification 225 is nearing expiry based on a predetermined duration of time being more than the time until expiration of the certification 225.

The workflow illustrated in FIG. 14 may be initiated automatically by the certification management system 100 in response to identifying the certification 225 is pending expiration. If the content consuming entity 115 has completed the certification 225 the certification management system 100 may expire the certification 225 at the expiration date and the content consuming entity 115 may be required to complete components of the certification 225 to get re-certified. Alternatively or in addition, the content consuming entity 115 may be required to complete a different set of components to get re-certified.

Upon identification of the pending expiry, the certification management system 100 may determine whether the content consuming entity 115 meets the demographic information criteria for the certification 225 (1401). In an example, the content consuming entity 115 may no longer meet the demographic criteria. In such case, the certification status may be set for further investigation (1402). For example, the administrating entity 116 and/or sponsoring entity 117 may have to edit or override the certification attributes or other parameters to facilitate the content consuming entity 115 to recertify. Alternatively, the content consuming entity 115 may no longer be able to recertify and the certification 225 may be set as expired for the content consuming entity 115. The certification management system 100 may update status throughout the organization accordingly.

The certification management system 100 may send a notification to the content consuming entity 115 a predetermined duration of time prior to expiration (1405). The administrating entity 116 may set the predetermined duration, such as X days. Further, the administrating entity 116 may set a grace period for the certification 225. The grace period may be duration, such as a number of days. The content consuming entity 115 may register for recertification prior to expiry of the certification 225. Alternatively or in addition, the content consuming entity 115 may register for recertification within the grace period post expiry. In an example, the grace period may end on date of expiry effectively providing no grace days. The process to register for the recertification may be similar to registration process for the certification 225, as described elsewhere in this document. The notification may inform the content consuming entity 115 that the certification 225 expires on the expiry date and that re-certification should be initiated within the allowed period. The notification may be an email, a text message, a telephone call, or any other type of notification.

On the expiry date, the certification management system 100 may send a notification informing the content consuming entity 115 that the certification 225 has expired. The certification management system 100 may send reminder notification to the content consuming entity 115 to initiate recertification as per a predetermined frequency. The administrating entity 116 and/or the content consuming entity 115 may set the predetermined frequency via the user interface 214. The content consuming entity 115 may send the request for registration for the recertification within the allowed period, for example, before expiration or within the grace period.

The certification management system 100 may determine whether a request to register for recertification is received within the allowed period (1408). If the registration request is not received within the allowed period, the certification management system 100 may send a notification informing the content consuming entity 115 that re-certification was not initiated within the grace period and that re-certification cannot be initiated now. The certification management system 100 may set the certification status to expired (1408, 1495).

Alternatively, after registering within the allowed period, the content consuming entity 115 may cancel the registration, similar to canceling registration of the certification 225 (1410). The certification management system 100 may update the certification status of the certification 225 as expired. The certification management system 100 may accordingly update the user dashboard 305, the certification portal 230, the certification portal storage 210, and facilitates publishing of the change in status to other systems in the organization. In an example, the certification management system 100 may not update the certification status to expired until the grace period has expired. The content consuming entity 115 may re-register for the recertification within the grace period.

Alternatively, the content consuming entity 115 may register for the recertification and proceed to complete the components of the recertification (1420). If the content consuming entity 115 completes the components successfully, the certification status may be set to recertified (1425). The certification management system 100 may automatically update various organization systems to reflect the updated status. For example, the user dashboard 305, the entity profile database 122, and any other system, such as a human resource database, may be updated. The certification management system 100 may record date of recertification and use that for future recertification of the certification 225.

Instead, if the content consuming entity 115 fails to complete the components successfully, the certification management system 100 may update the components attempt (1430). The certification management system 100 may determine if the number of components attempt exceeds a predetermined maximum number of attempts (1435). The content consuming entity 115 may re-attempt to complete the components if the predetermined maximum number of attempts is not exceeded (1435, 1420). However, if the predetermined maximum number of attempts is exceeded, the certification management system 100 may update the status of the certification accordingly (1440). The content consuming entity 115 may request an additional attempt to complete the components (1445). If the administrating entity 116 approves the request, the certification management system 100 adjusts the predetermined maximum number of attempts, and the content consuming entity 115 may re-attempt to complete the components (1450, 1455, 1420).

Instead, if the administrating entity 116 denies the request, the certification management system 100 increments a recertification attempt count. The certification circuitry 201 may count one recertification attempt when the content consuming entity 115 registers for the recertification but exceeds assessment or interview component completion attempts (1460). The recertification count may be different than the certification count associated with the certification 225. The content consuming entity 115 may be allowed to use another recertification attempt (if another attempt is available) before the recertification period is over, subject to the waiting period between the multiple attempts on the workflow (1490). For example, the administrating entity 116 may set an approved number of recertification attempts. The certification management system 100 may ensure that the predetermined number of recertification attempts is not exceeded (1465).

Further, upon registration, the content consuming entity 115 may have a limited time, referred to as recertification period, to complete the recertification. A number of days post registration to complete re-certification may be referred to as the recertification period. The administrating entity 116 may set the recertification period. If the recertification is not complete within the approved recertification period the certification status may be updated to expired (1490, 1495).

However if reattempting to recertify is within the bounds approved by the administrating entity 116, the certification management system 100 may reopen the components of the recertification (1480). The certification management system 100 may also reopen components that may have been marked for double counting (1482). For example, if the content consuming entity 115 has completed a component, such as a training, prior to registering in the certification 225, the certification management system 100 may count the time spent on the completion of the component towards the certification 225. The certification management system 100 may take into account completion of only those components, which are completed within a predetermined time period. For example, setting the period to 12 months means that a learner who has completed a training 9 months ago may get credit, but someone who completed it 18 months ago may need to redo the training or select another training to get credit. Prior completion threshold may be set as an attribute of the certification 225. The certification management system 100 may limit the double counting to selected components. For example, the certification 225 may constitute another component or component group of trainings where double counting is allowed without a prior completion threshold limit. Thus, as long as long as the another constituent component is identified as complete, the corresponding credit may be counted towards completion of the certification 225.

Further, the certification management system 100 may reset the counts for the components attempt (1484). The certification management system 100 may then request the content consuming entity 115 to re-register for the recertification (1485). For example, the certification management system 100 may send a notification to the content consuming entity 115 to this effect.

Alternatively, if the certification management system 100 identifies that the number of recertification attempts have exceeded the predetermined number of recertification attempts allowed, the certification management system 100 determines whether the content consuming entity 115 has requested an additional attempt (1470). If the additional attempt is not requested, the certification 225 may be updated as expired (1495). Instead, if the additional attempt request is received, the certification management system 100 may determine if the request has been approved, such as by the administrating entity 116 (1472). If the administrating entity 116 denies the additional attempt request, the certification management system 100 may update the certification status to expired (1472, 1495). However, if the administrating entity 116 approves the additional attempt request, the certification management system 100 may reconfigure the certification 225 for the additional attempt. The reconfiguration may involve steps 1480, 1482, 1484, and 1485, described elsewhere in this document.

Thus, the certification management system 100 may track duration of the certification 225 and chain recertifications one after another to facilitate the content consuming entity 115 to continue maintaining the certified status. The certification management system 100 may further facilitate the recertification to include custom components, different than those in the certification 225 itself. The certification management system 100 thus provides a technical solution to the technical problem of updating the certification status close to or upon expiration of the certification 225.

Further, the certification management system 100, by maintaining the recertification status as part of the certification 225, avoids creating extra certification record for each recertification. This further improves cost efficiencies provided by the certification management system 100 may.

Integration

The certification management system 100 may facilitate the organization to integrate multiple learning management systems, such as legacy systems, to provide flexible and cost efficient certification management. Thus, the certification management system 100 may provide a technical solution to the technical problem of integrating several silos of information. For example, in FIG. 1, the servers 130 and 140 may be separate learning management systems. The learning management systems may include their own certification and completion tracking. The certification management system 100 may facilitate the administrating entity 116 to use the certification from the learning management system as a component in the certification 225. The certification management system 100 may communicate information with the learning management systems to determine the completion status of the component. For example, the learning management system may perform assessments and accordingly track completion of the component. The certification management system 100 may transfer such information from the learning management system, for example via a predetermined information exchange protocol. The information exchange may be via an industry standard protocol, a proprietary protocol, or a combination thereof. For example, Enterprise Business Integration (EBI) protocol, or web-services may be used for the data exchange.

In another example, the certification management system 100 may compose the certification 225 with a training component, a work-experience component, a supervisor approval component, and an evaluation component. The different components of the certification 225 may each be on separate systems. The certification management system 100 may be in communication with the separate systems to identify completion status of each component. The certification management system 100 may update the completion status of the certification 225 based on the status of each component. The certification management system 100 may provide the completion status to the enrolled content consuming entity 115 via the certification portal 230. The certification management system 100 may also maintain the updated status of the certification in the corresponding entity profile in the entity profile database 122.

During the integration, the certification management system 100 may ensure that the content consuming entity 115 does not receive credit more than one time for a single training in multiple certifications. Thus, the certification management system 100 may prevent double counting. For example, consider that the content consuming entity 115 is enrolled in two certifications and both have same training, such as a component. On completion of the training, the content consuming entity 115 only gets credit in one of the two certification programs. For example, the certification to which learner was first registered into may get the credit for the completed training. The administrating entity 116 may select property of whether double counting will be allowed or prevented for all the groups created within the certification 225. The certification management system 100 may prevent double counting for electives groups.

The certification management system 100 may facilitate identifying targeted audience for the certification 225. For example, the certification circuitry 201 may compare demographic information criteria of the certification 225 with the demographic information of the content consuming entity 115 in the corresponding entity profile from the entity profile database. The certification circuitry 201 may identify the content consuming entity 115 as a targeted audience based on the comparison. The certification circuitry 201 may send a notification to the content consuming entity 115 providing information about the certification 225. Additionally or alternatively, the certification circuitry 201 may send a notification to the sponsoring entity 117 and/or the administrating entity 116 associated with the certification 225 with information of the identified content consuming entity 115. In response, the sponsoring entity 117 and/or the administrating entity 116 may nominate the content consuming entity 115.

The certification management system 100 may further update the entity profile database 122 based on the data exchanged with the several systems, such as the learning management systems. For example, the certification status may be updated across several enterprise systems. The update may be automatic or in response to instruction from the administrating entity 116. Thus, the certification management system 100 may integrate with several enterprise level systems and provide uniform information about certification status of the employees throughout the organization.

The components in the certification 225 may be individual activities that the content consuming entity 115 performs/completes in order to complete the certification 225. The certification 225 may have more than one component type of the same type, for example two experience components; five training components, two exam components, and any other type such as sponsor approval, tenure, experience, trainings, interviews, assessments, program evaluation, certification. Further, the components may be modules or learning components from one or more learning management systems. For example, the certification 225 may include a training component from a first learning management system, and an assessment component from a second learning management system.

Figure 15:
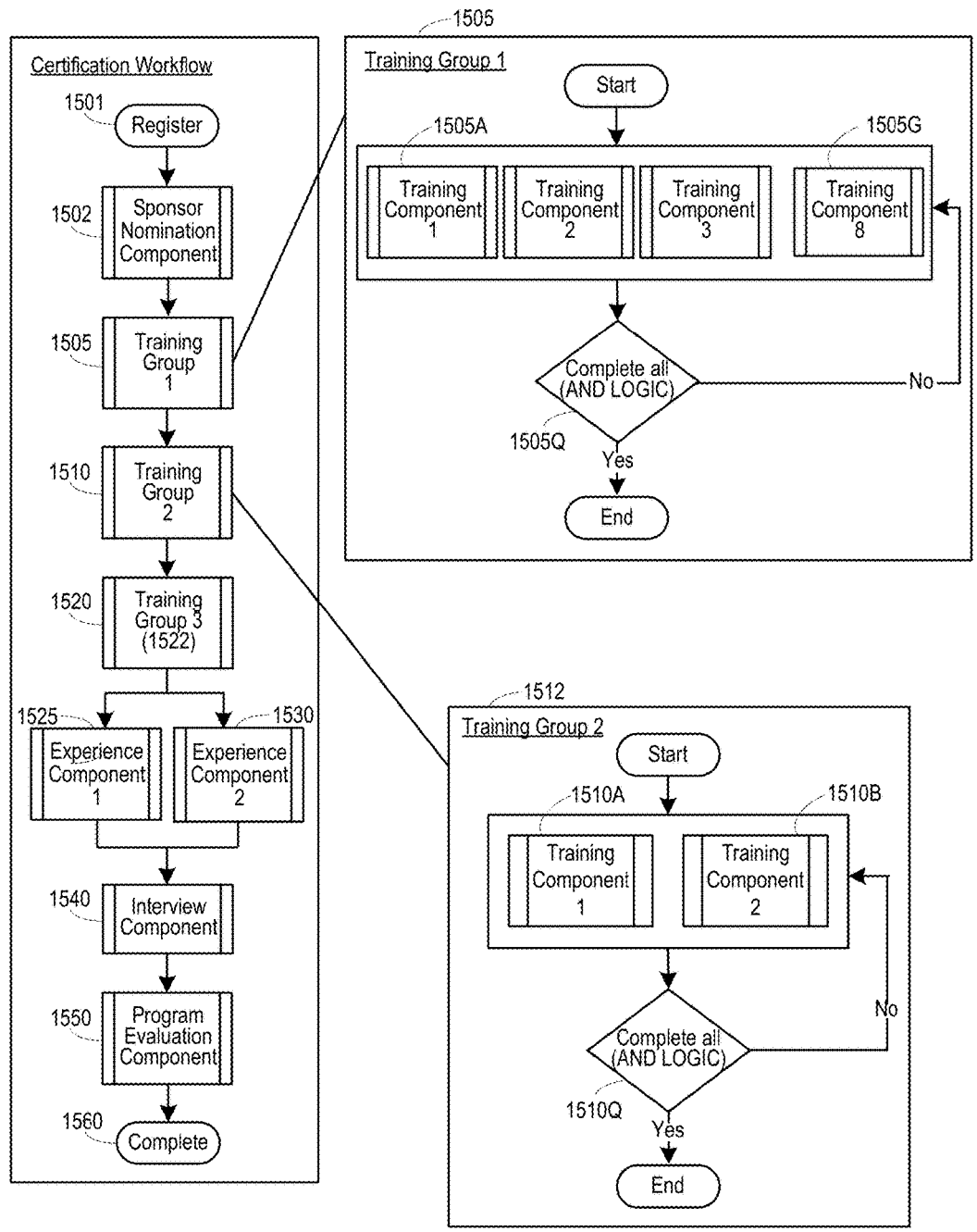
FIG. 15 illustrates an example workflow for a certification.
Figure 16:
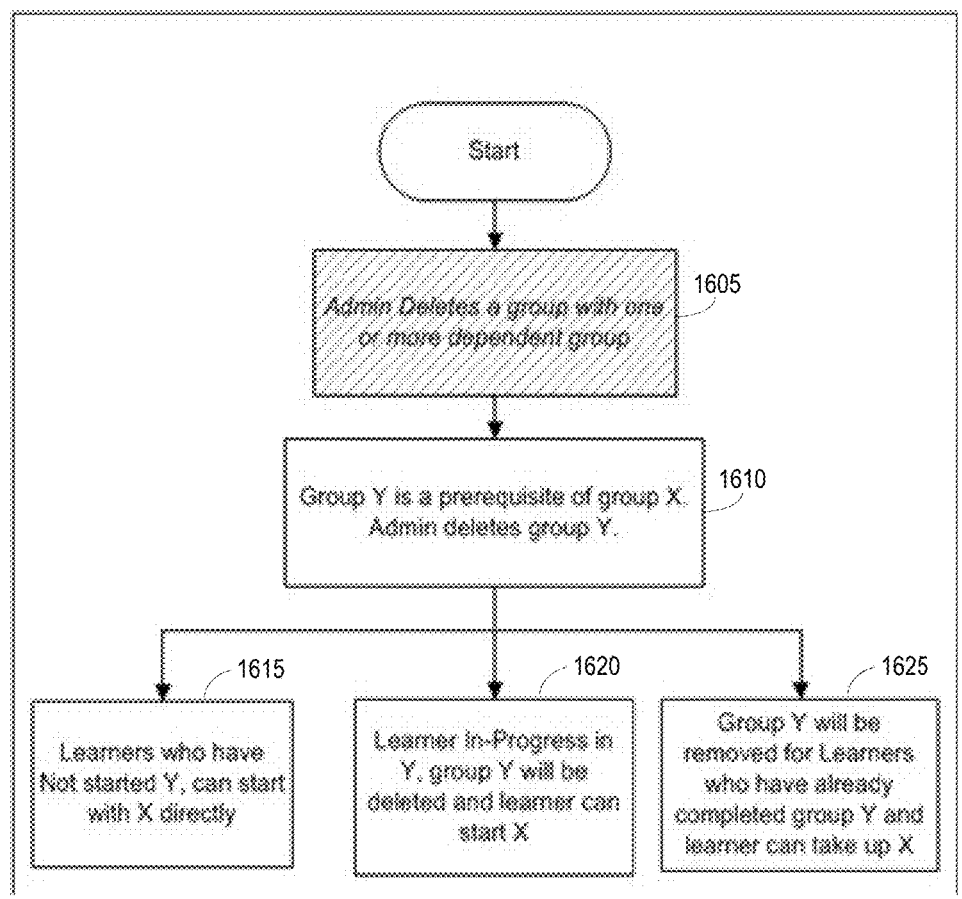
FIGS. 16-35 illustrate example workflows for certification reconfiguration.
Figure 17:
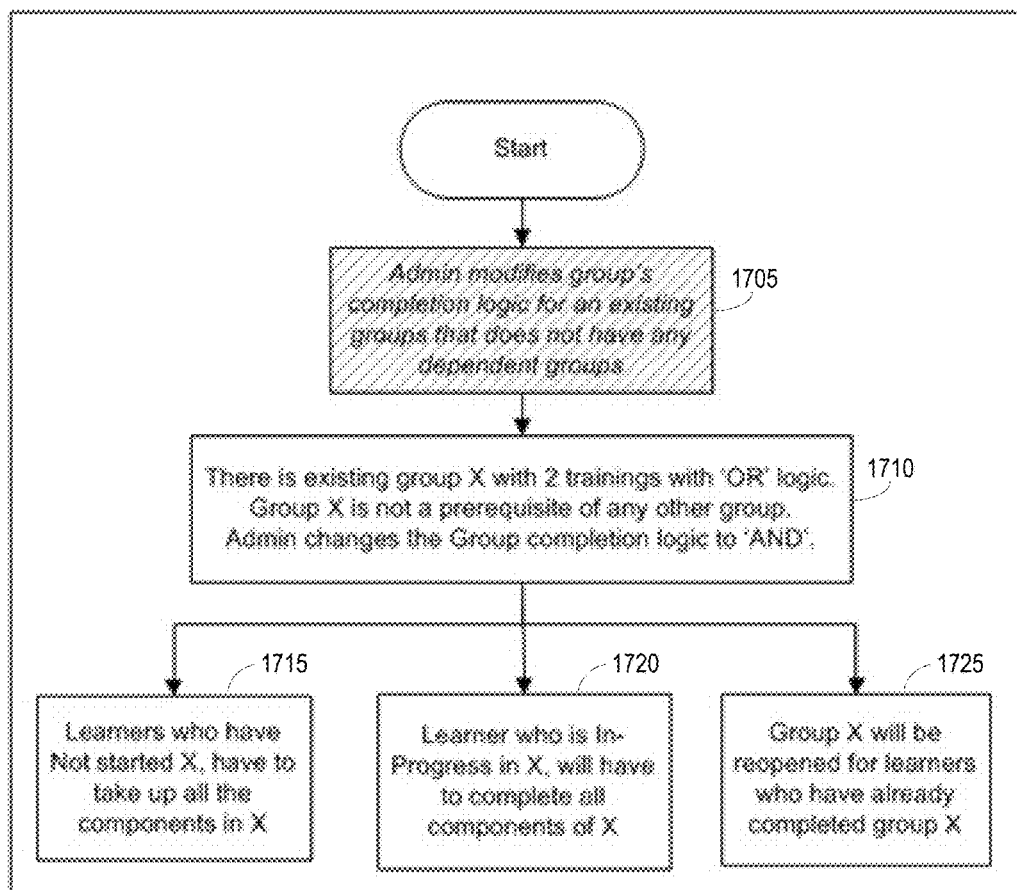
Figure 18:
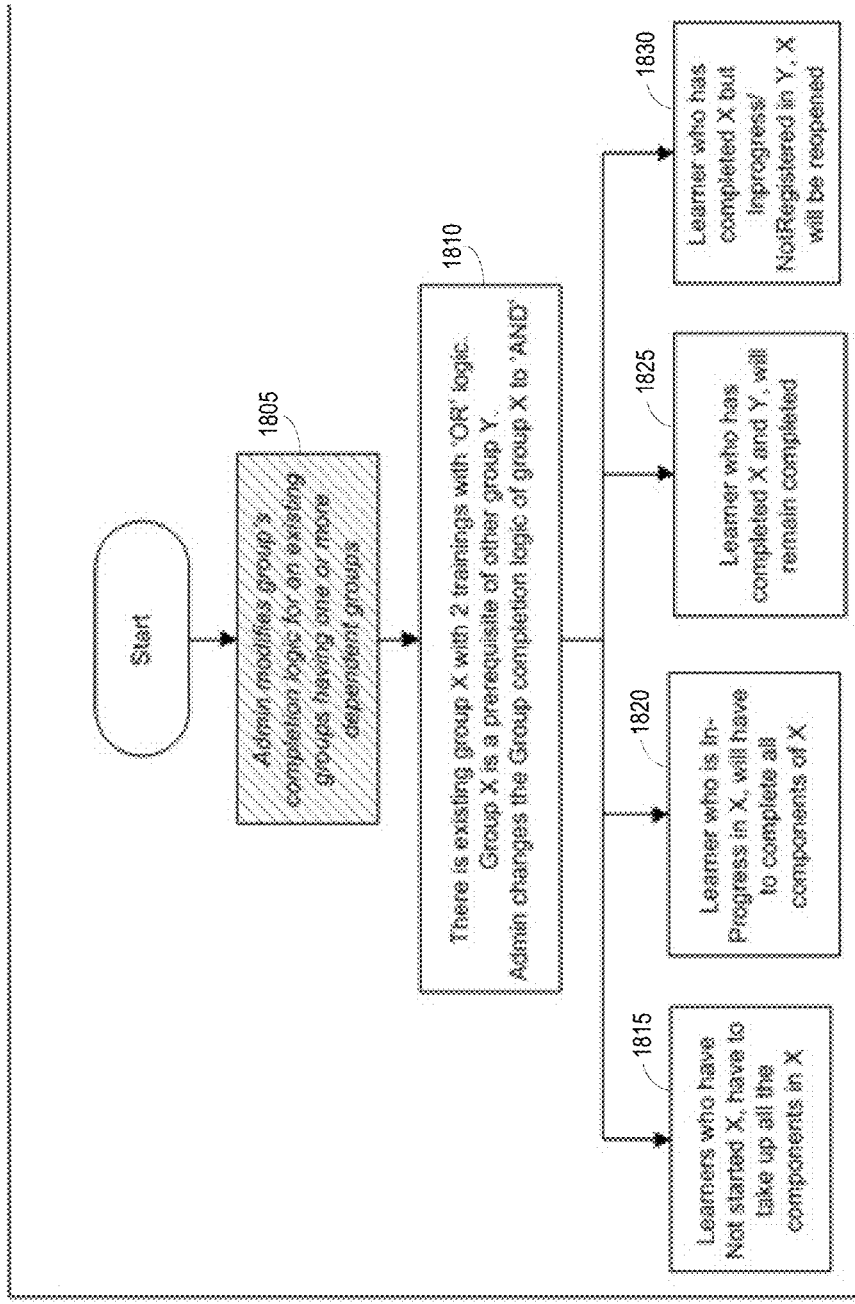
Figure 19:
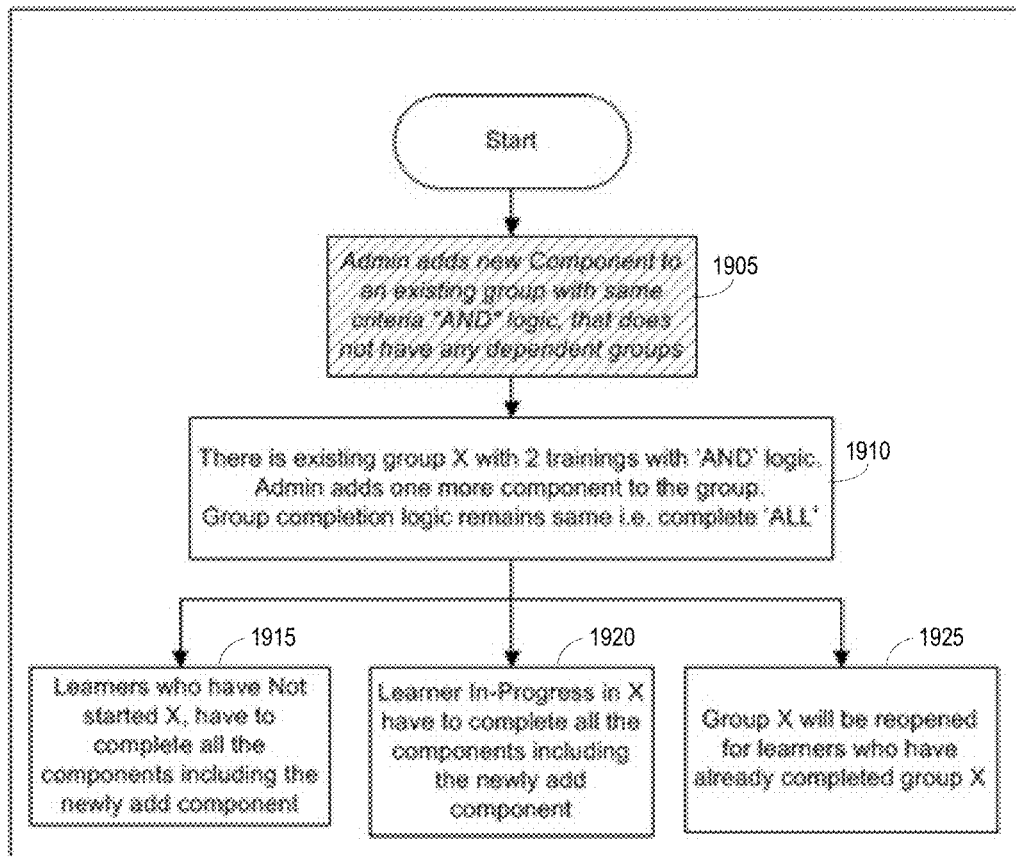
Figure 20:
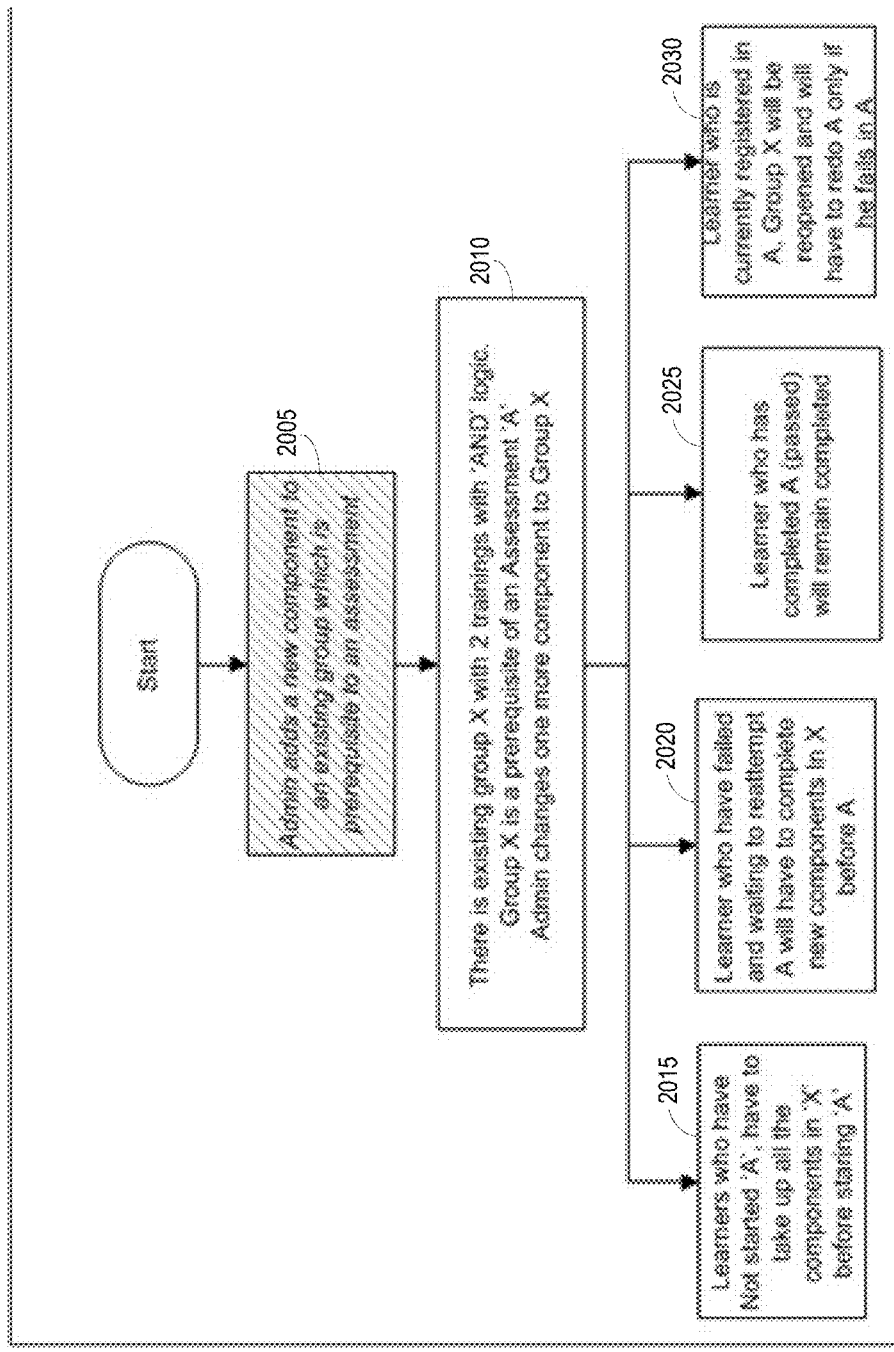
Figure 21:
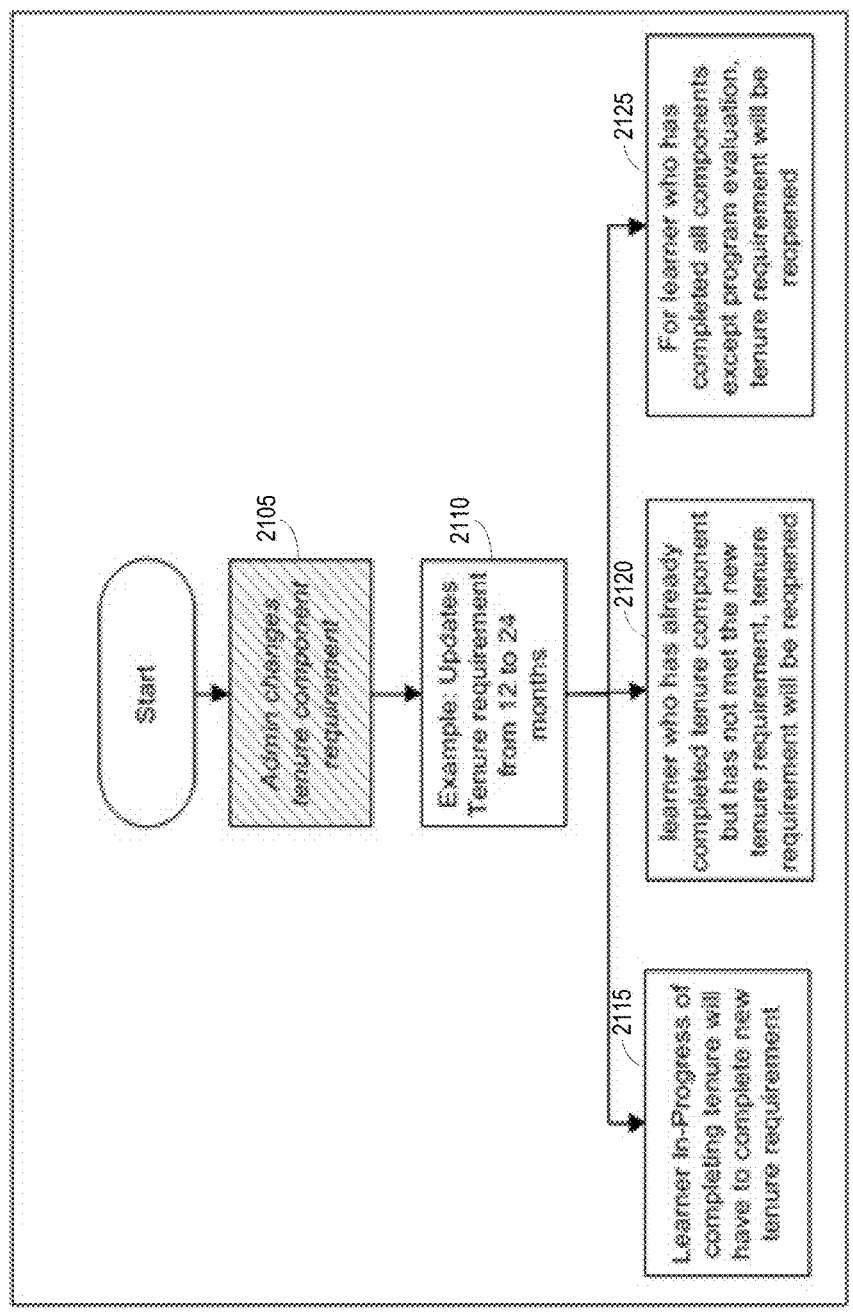
Figure 22:
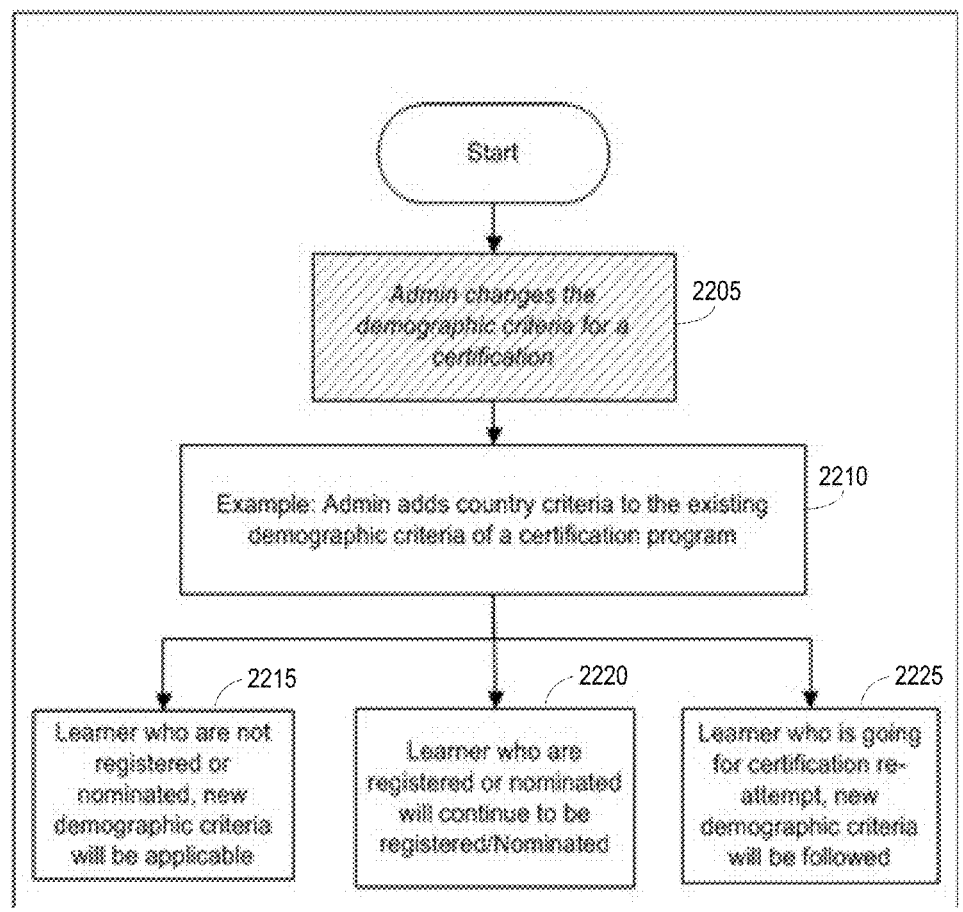
Figure 23:
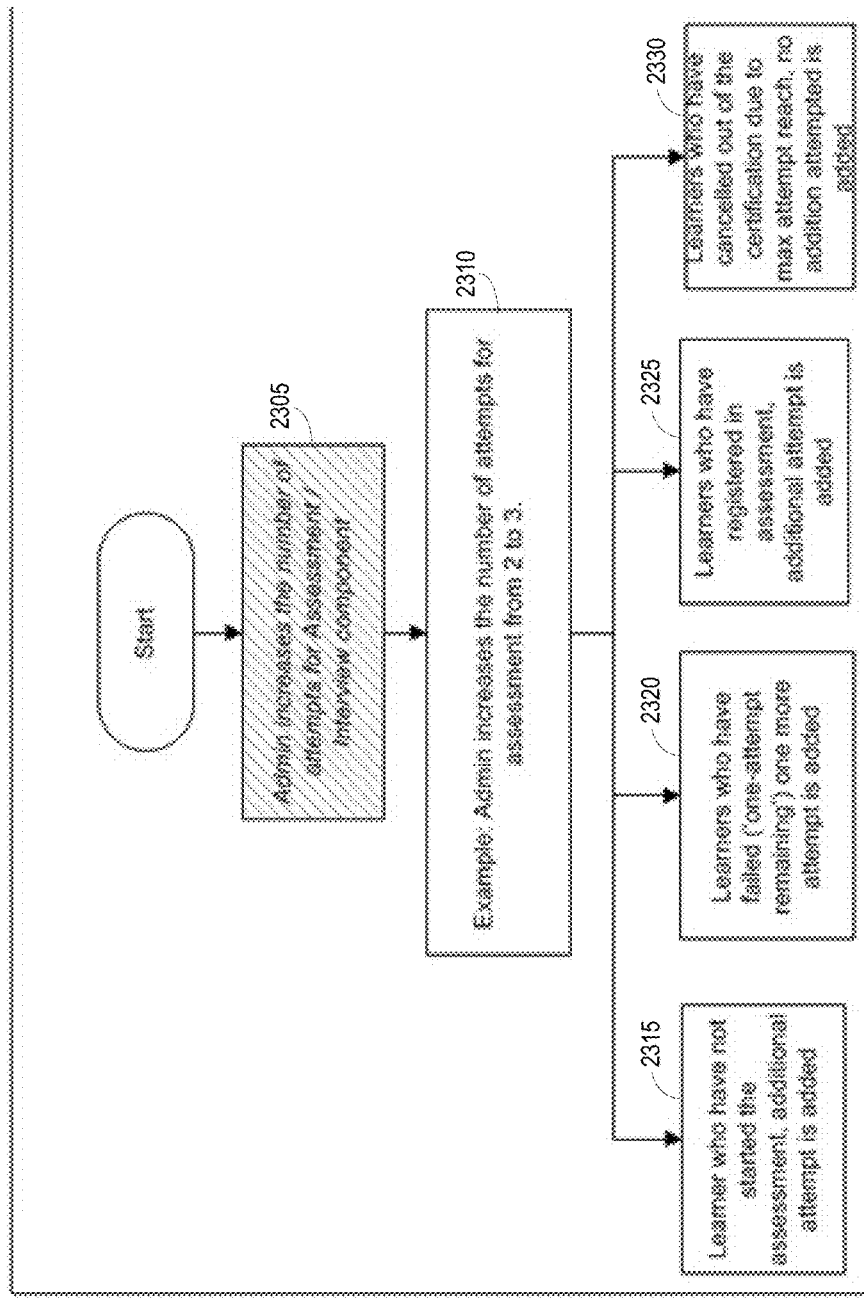
Figure 24:
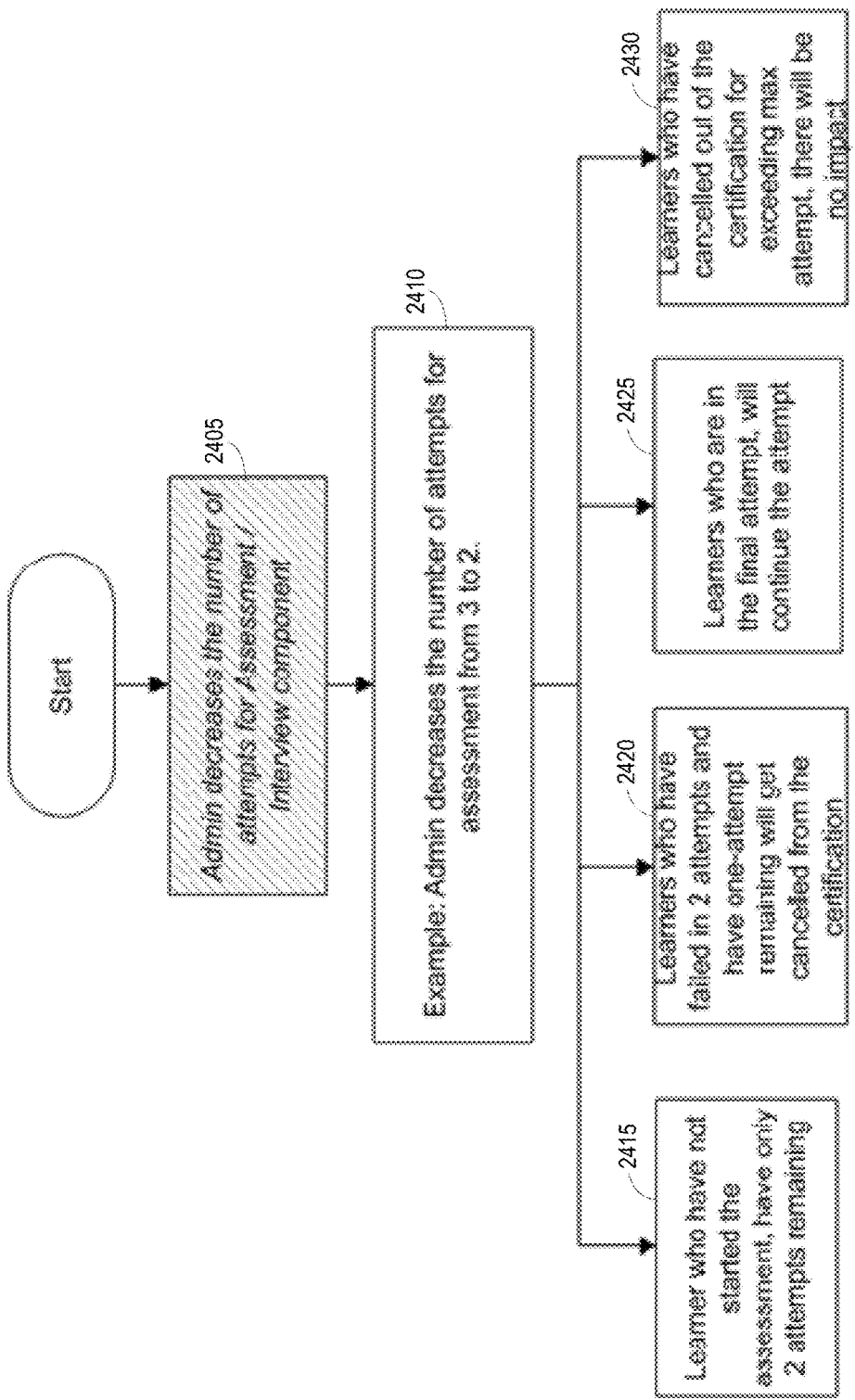
Figure 25:
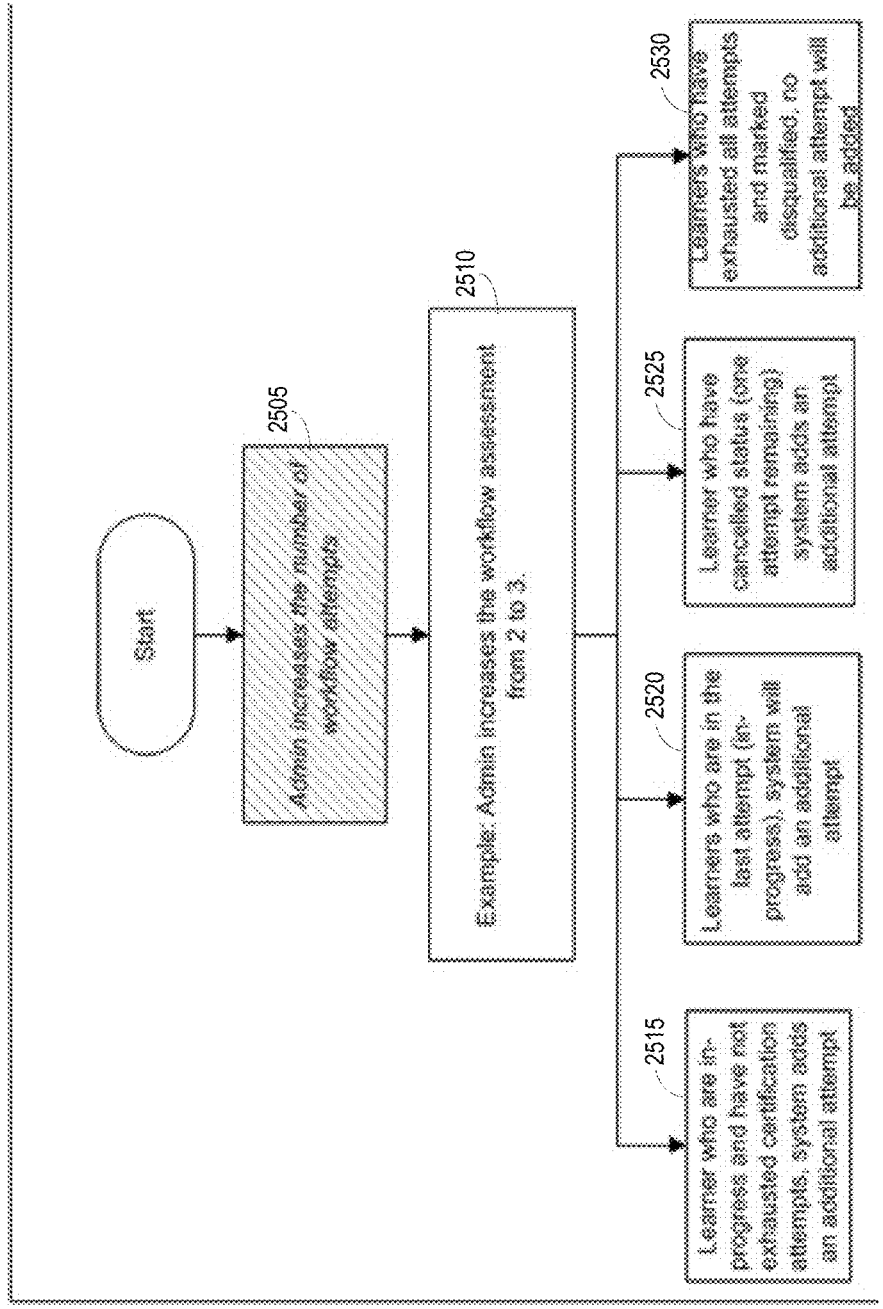
Figure 26:
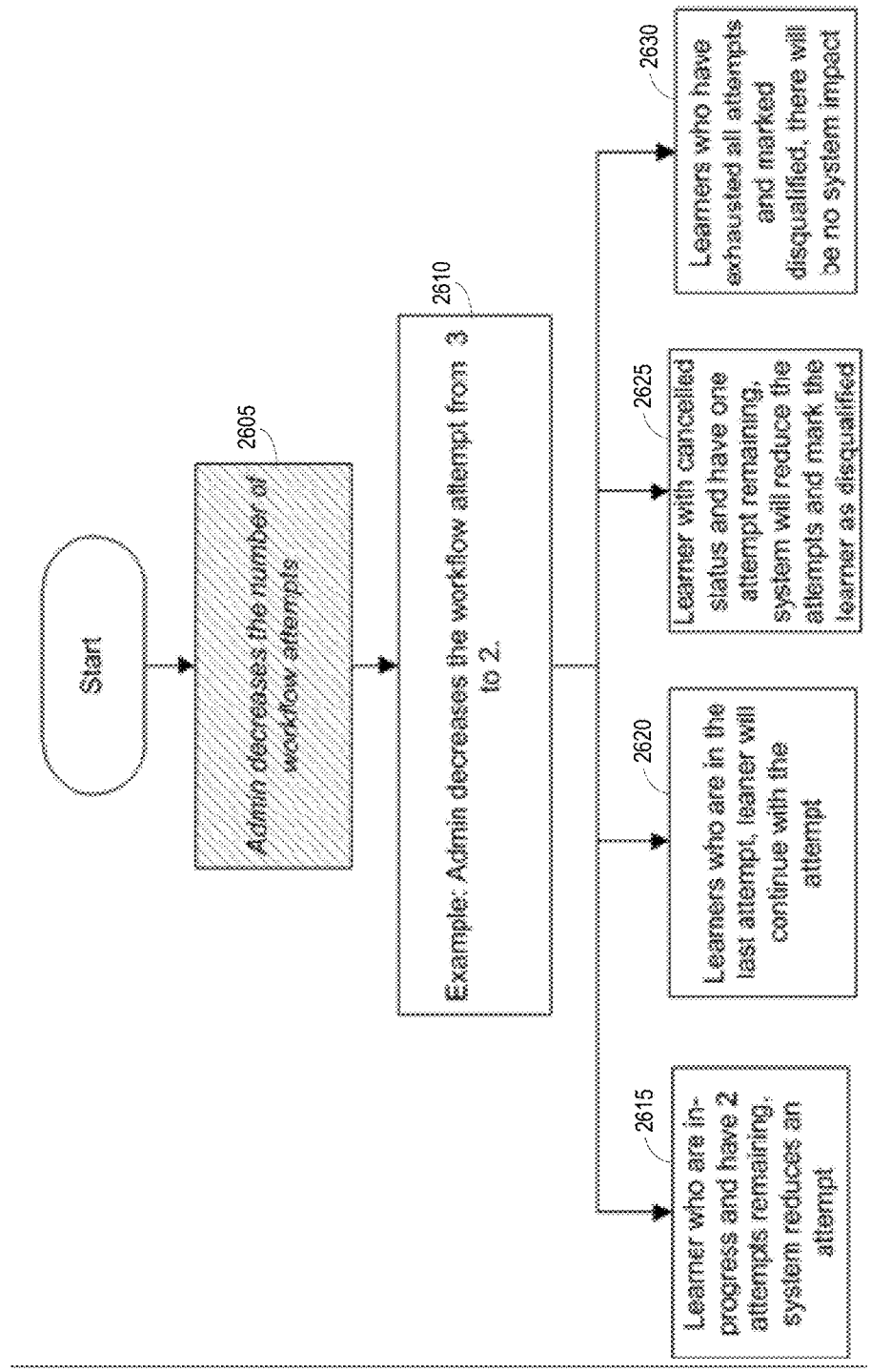
Figure 27:
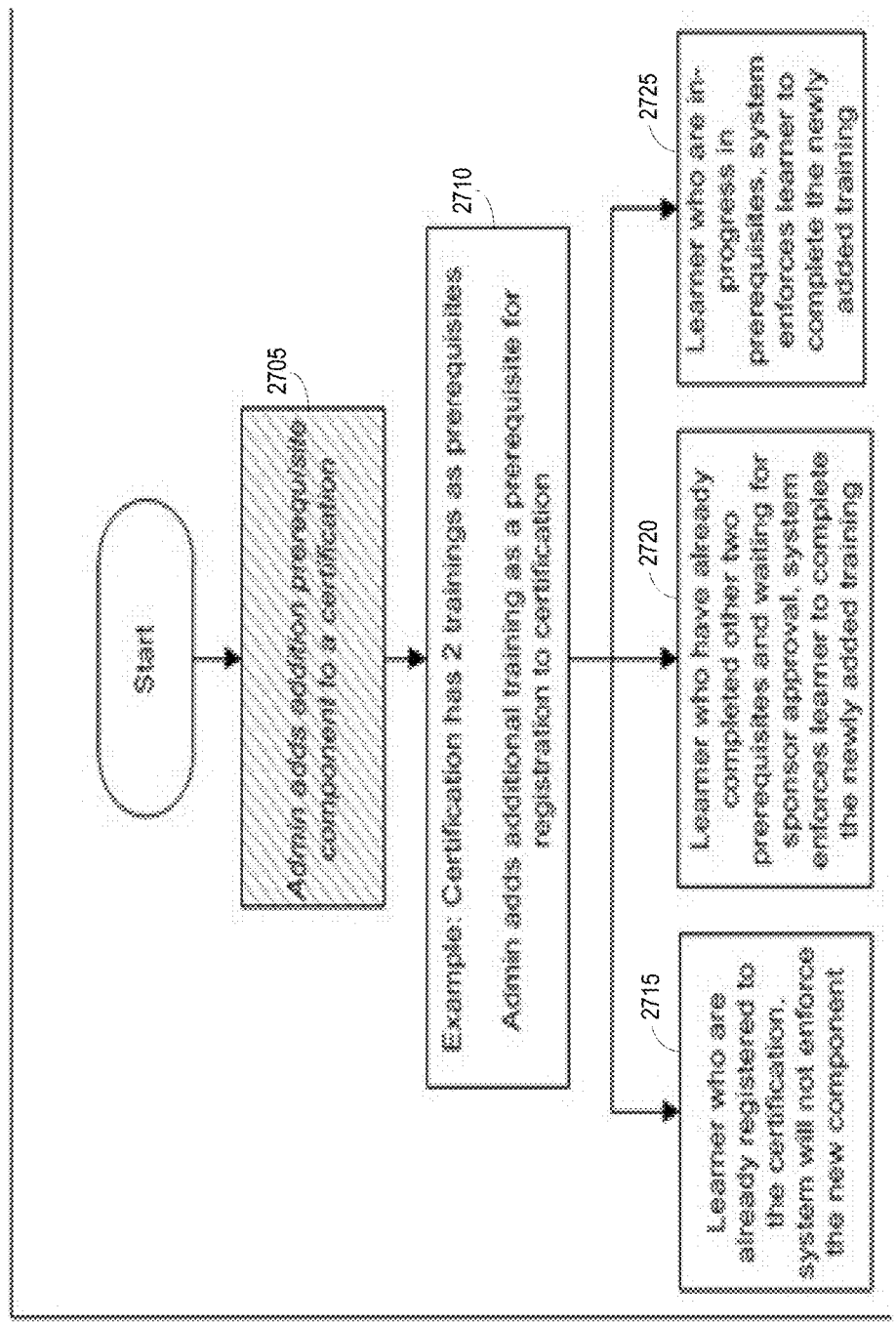
Figure 28:
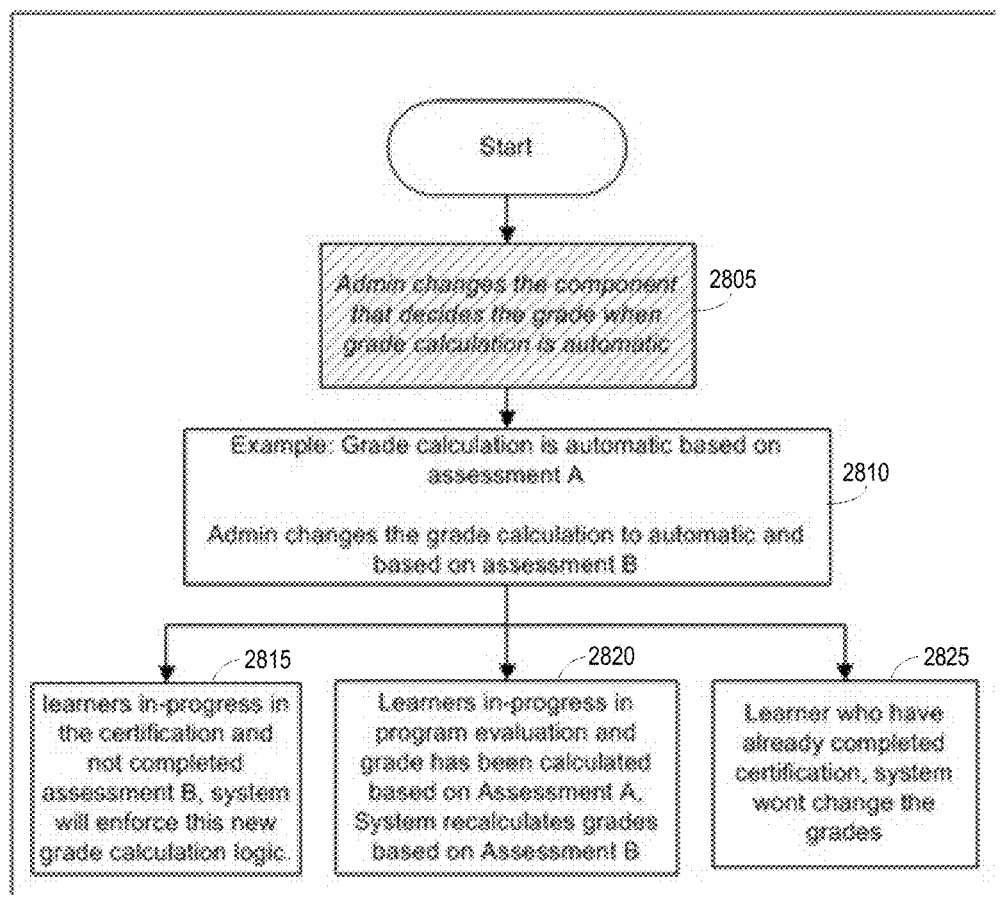
Figure 29:
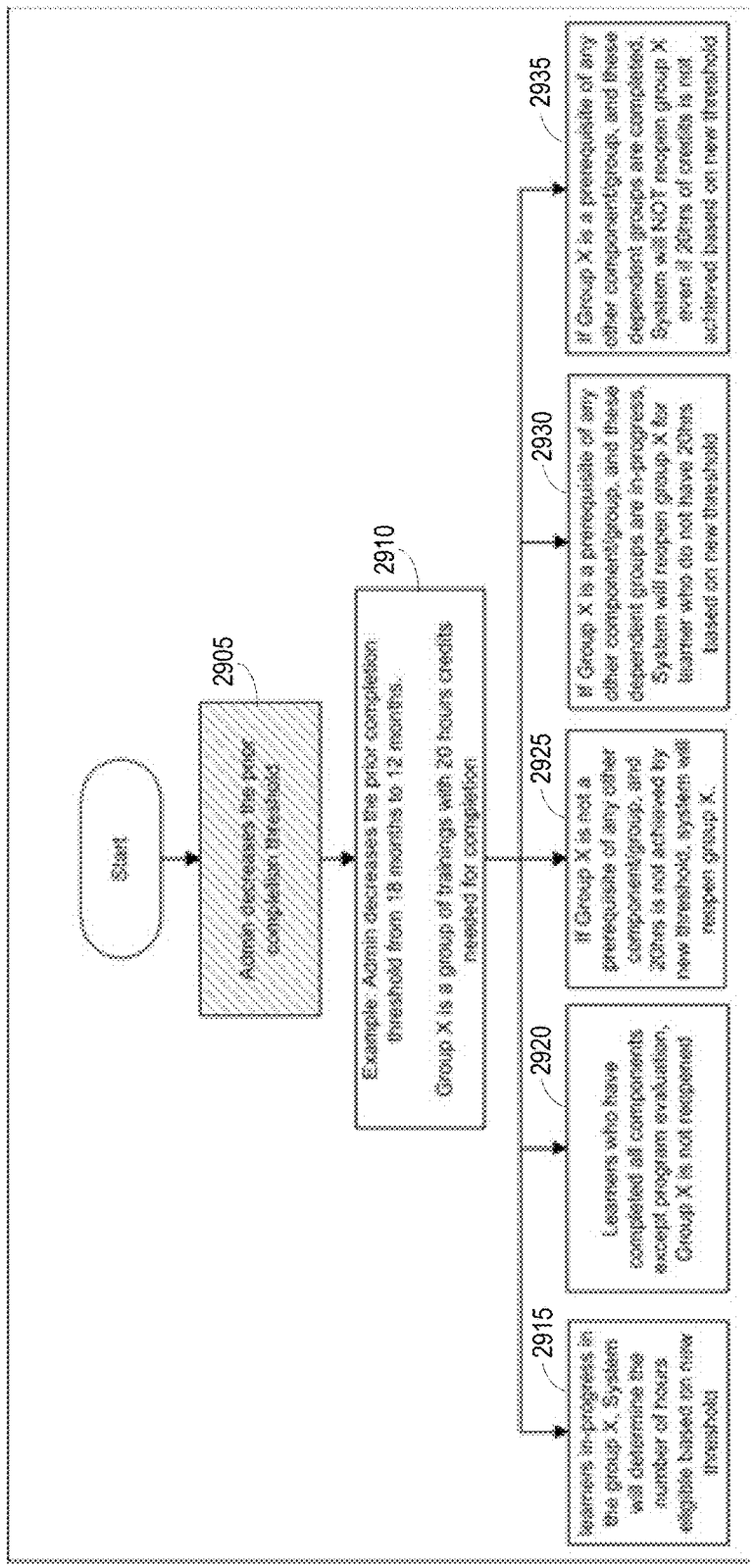
Figure 30:
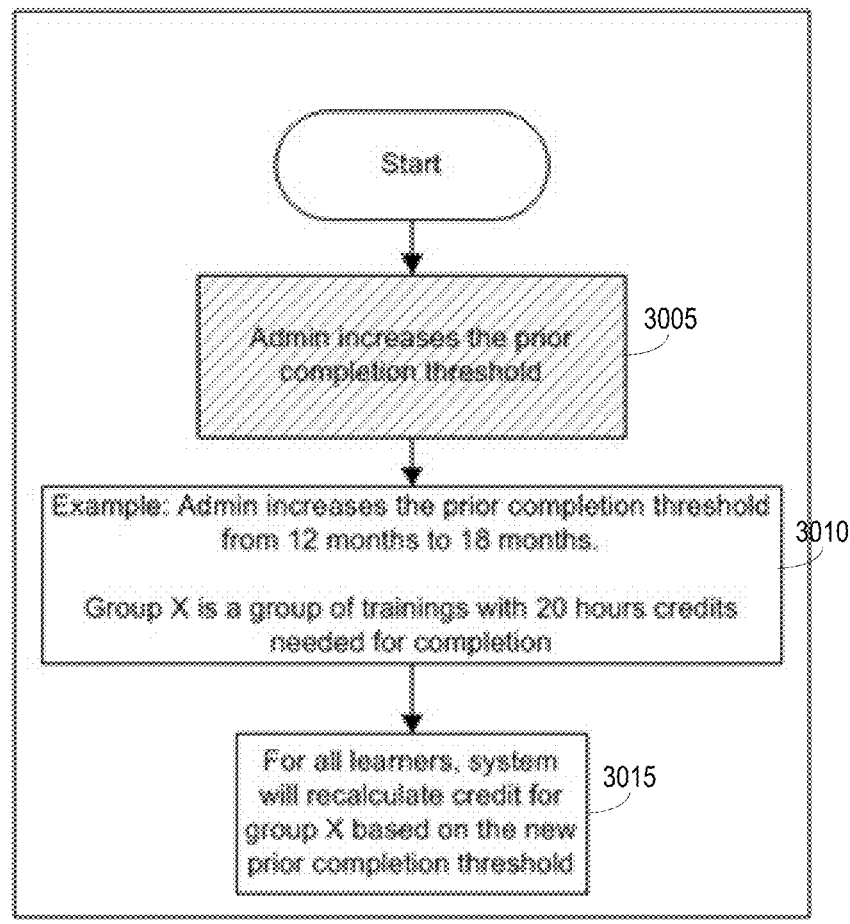
Figure 31:
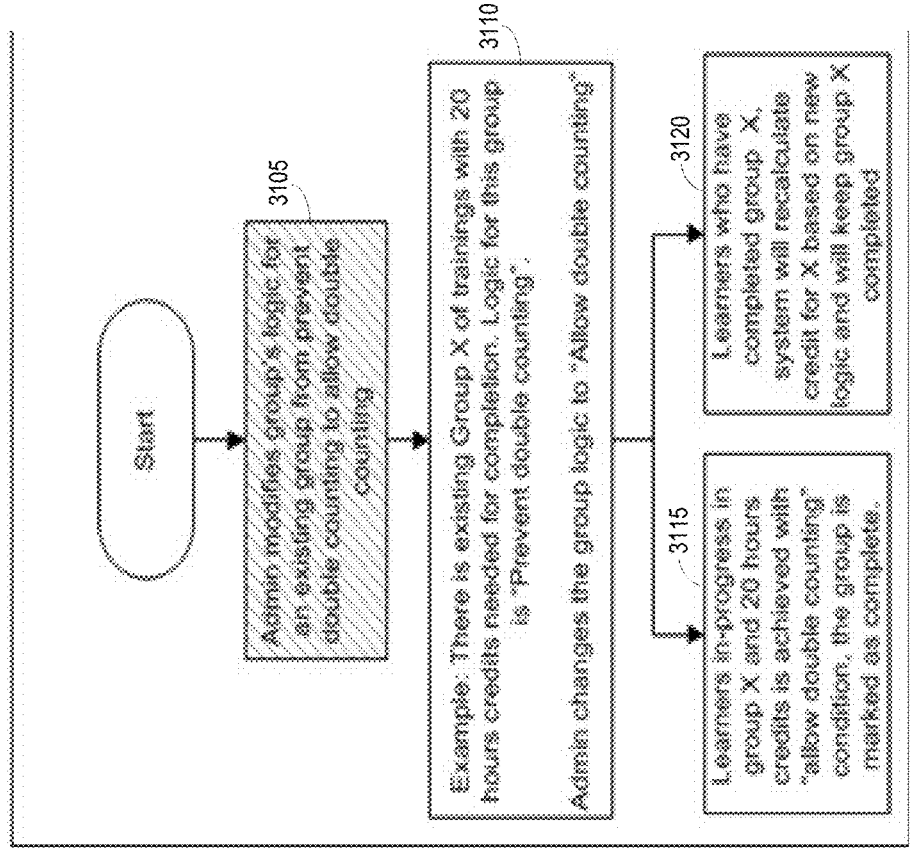
Figure 32:
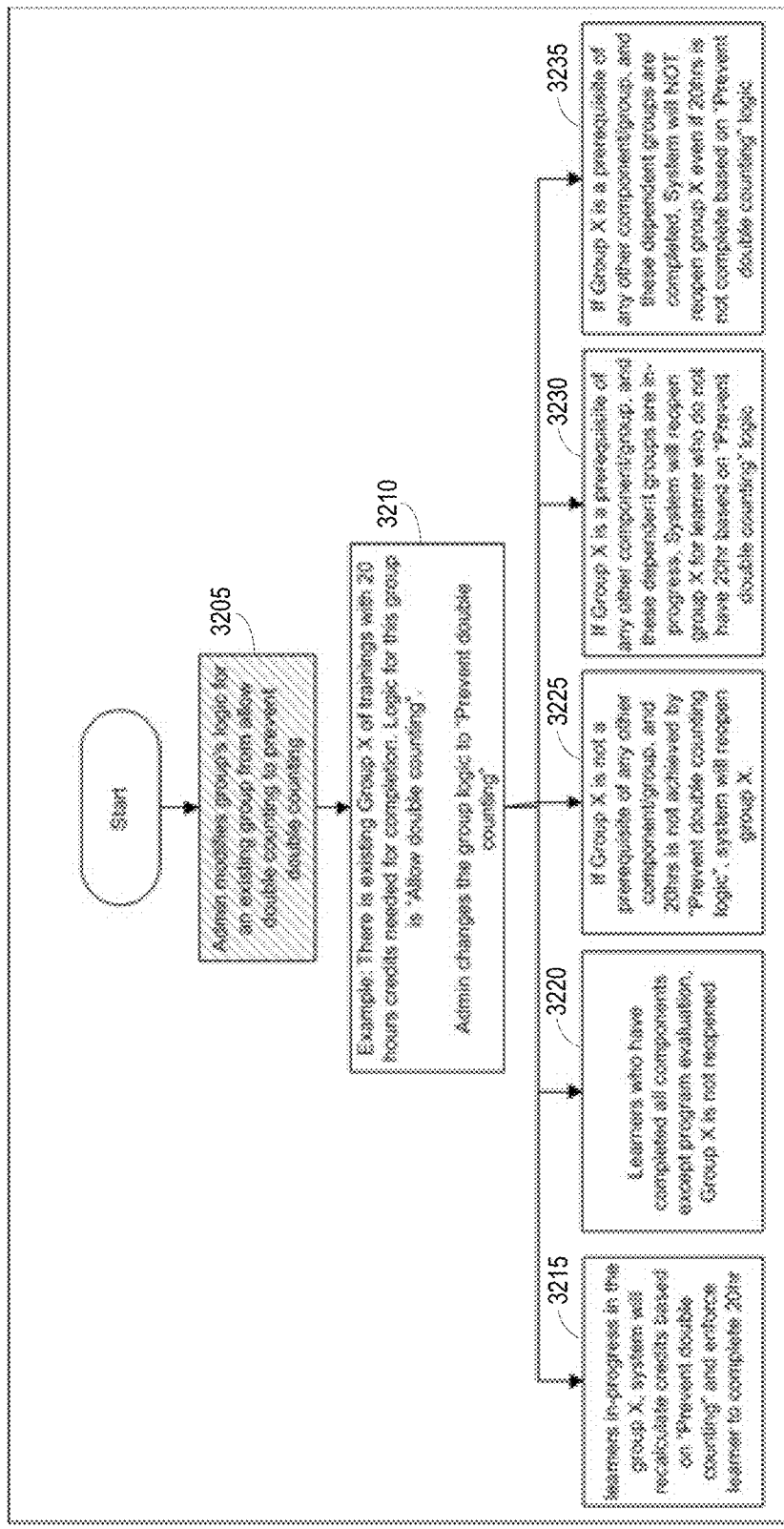
Figure 33:
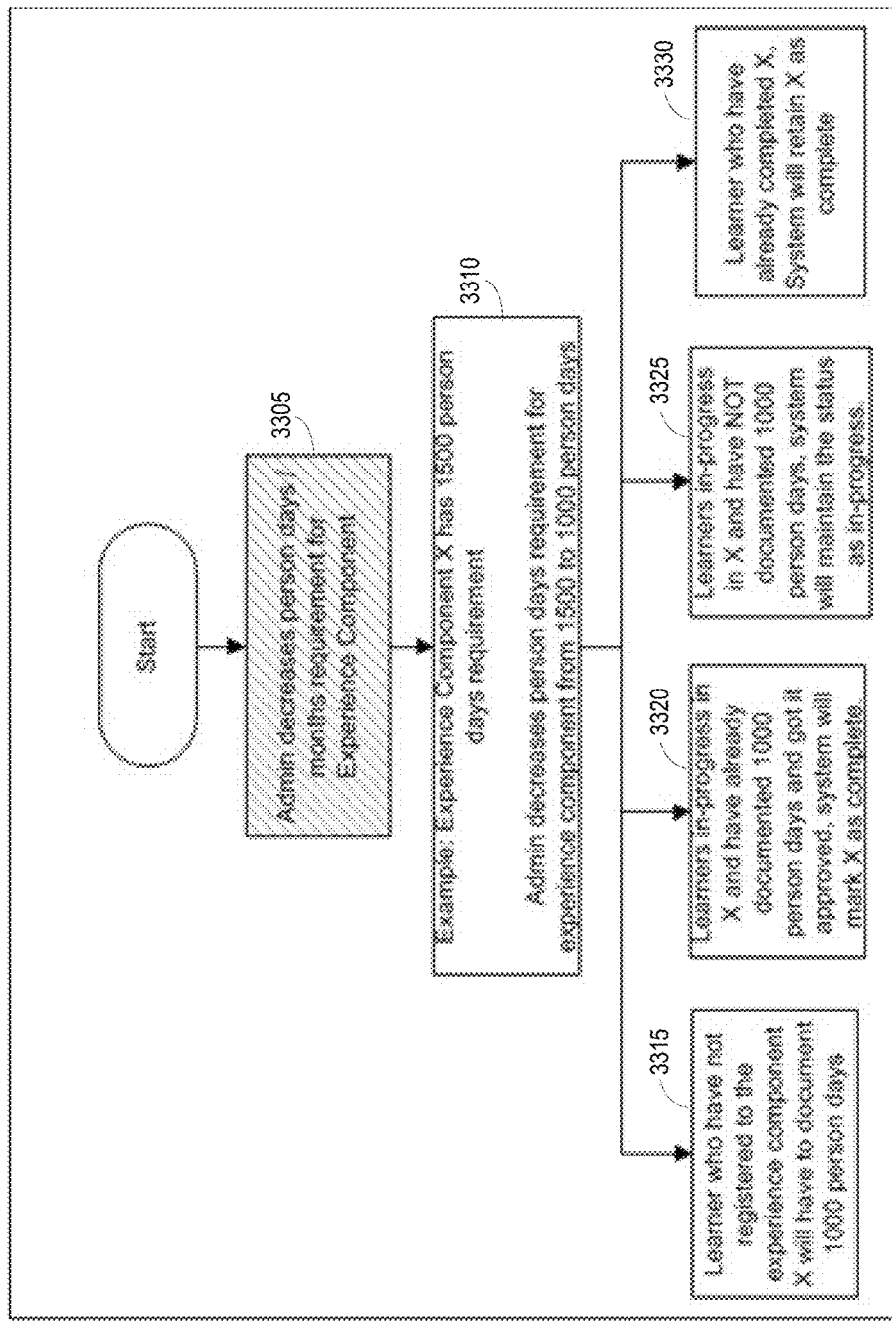
Figure 34:
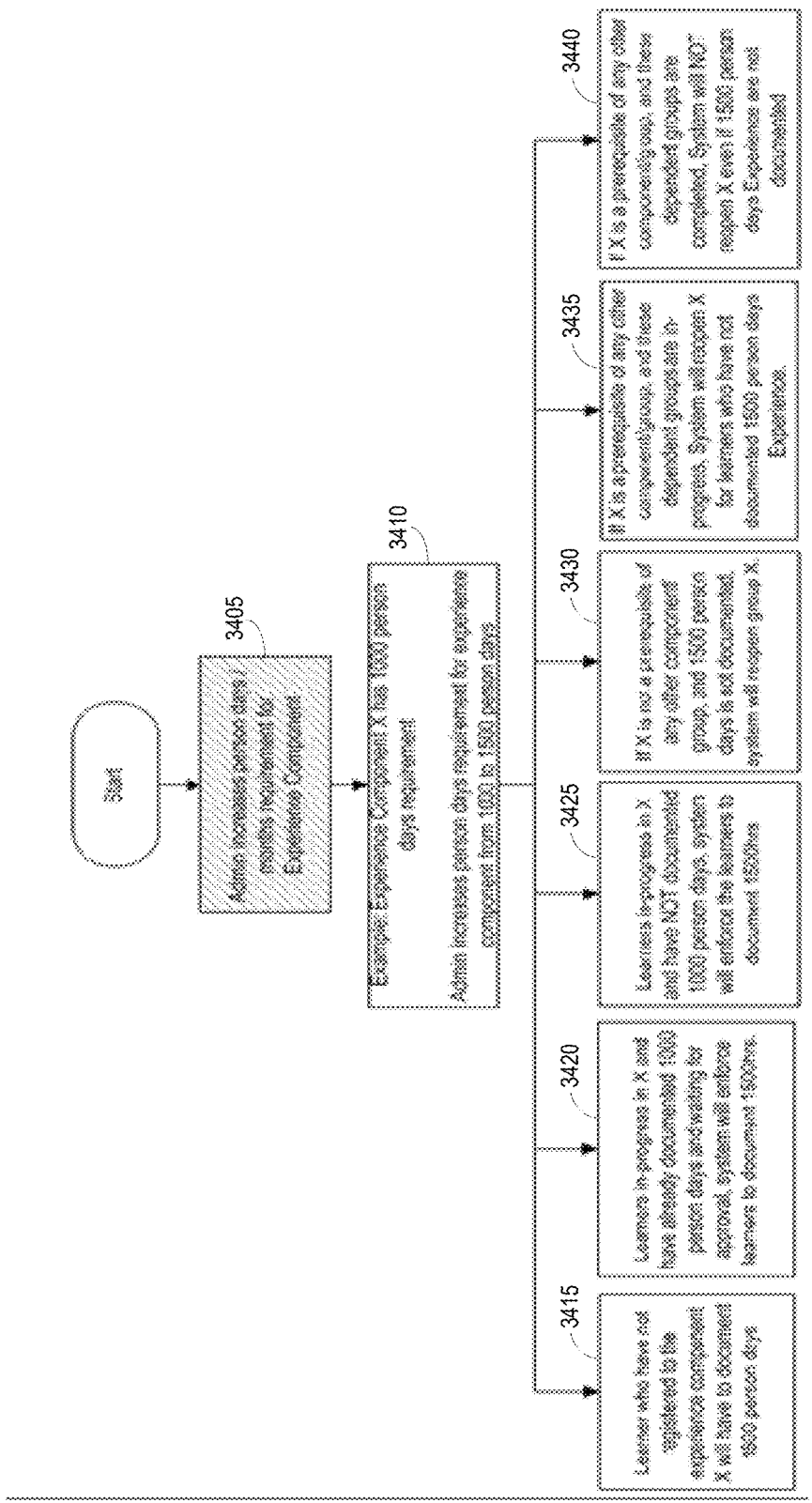
Figure 35:
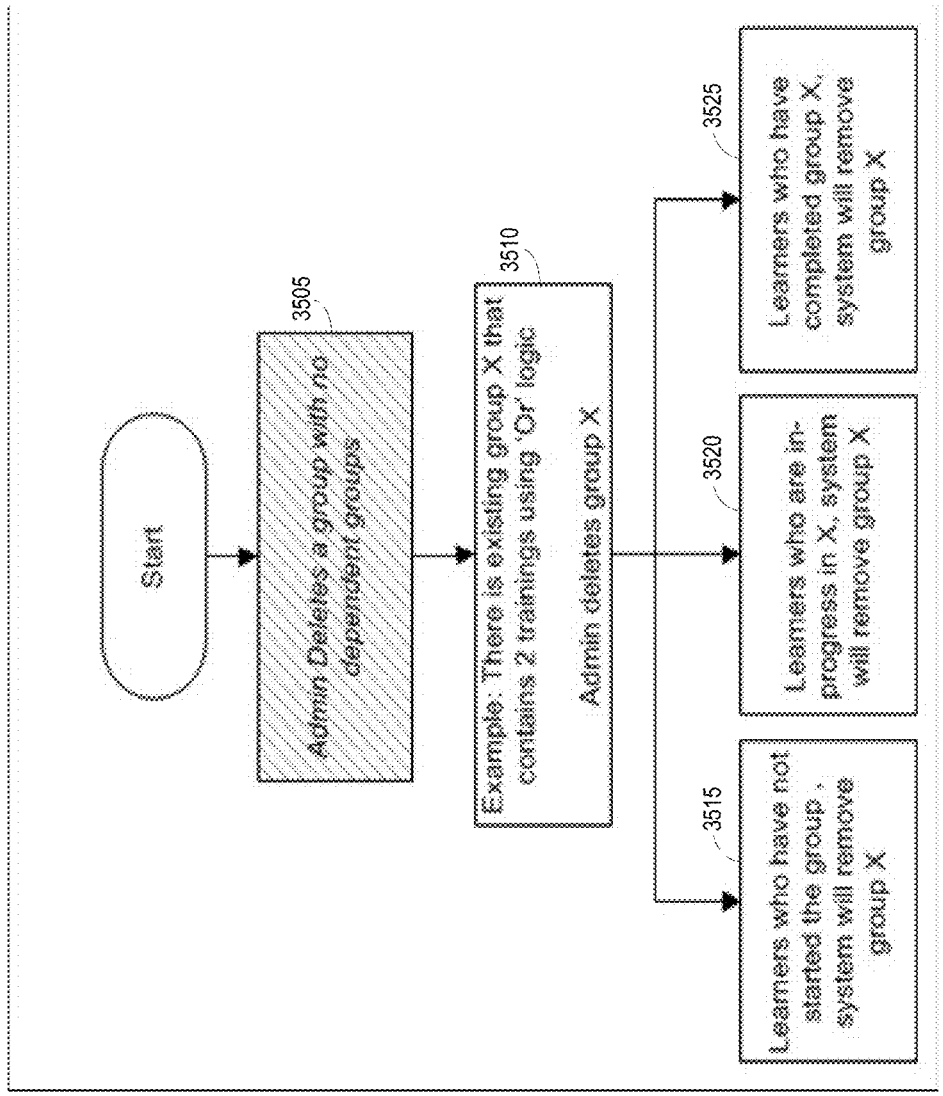

FIG. 15 illustrates an example workflow for the certification 225. The certification management system 100 may initially proceed through the registration process described elsewhere in this document (1501). The certification management system 100 may ensure that the content consuming entity 115 is sponsored or nominated for the certification 225 (1502). The certification management system 100 may update the entity profile of the content consuming entity 115 and the certification portal 230 of the content consuming entity 115 to reflect that the content consuming entity 115 is registered for the certification 225. The certification 225 may have multiple component groups and each group may have multiple groups within it, creating nested groups. For example, the certification 225 may include a first training group 1505, a second training group 1510, and a third training group 1520. The training groups may each consist of respective components. For example, the first training group 1505 may include training components 1505A-1505G; the second training group 1512 may include training components 1510A-1510B. The training groups may each consist of respective completion criterion, which determines the completion of the group. For example, the first and second training groups may have completion logic 1505Q and 1510Q respectively. Other types of completion logic may be used than that illustrated.

The certification 225 may include other components such as a first experience component 1525, a second experience component 1530, an interview component 1540, and a program evaluation component 1550.

The certification management system 100 may determine dependency between the components or component groups within the certification 225. When one component of the certification 225 is a prerequisite to another component in the certification 225 then there exists a dependency between the two components. The certification management system 100 may identify that the first training group is dependent on sponsor nomination, for example, the content consuming entity 115 cannot start the certification 225 without getting the sponsor approval, and hence sponsor approval is a prerequisite to the first training group 1505. Further, the first experience component 1525 and the second experience component 1530 may be dependent on the third training group 1522, for example, the content consuming entity 115 cannot start the first or the second experience components without completing the third training group 1522. Hence, the third training group 1522 is a prerequisite for both, the first experience component 1525 and the second experience component 1530. The interview component 1540 is dependent on the first experience component 1525 and the second experience component 1530. Thus, the content consuming entity 115 cannot start with the interview component 1540 unless both the experience components are completed. Hence, the interview component 1540 has both, the first experience component 1525 and the second experience component 1530, as prerequisites.

The certification management system 100 may direct the content consuming entity 115 to the respective learning management system when the content consuming entity 115 is in the middle of a certain component of the certification. The completion of each of the component may be tracked by the respective learning management system based on the corresponding completion criterion. The certification management system 100 may receive completion status of the components from the respective learning management system (1560). The certification management system 100 may update the enterprise level systems, such as the certification portal 230, the entity profile database 122, and any other system accordingly.

The methods, devices, processing, and logic described above, including the certification circuitry 201, may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A certification management system comprising:
 a communication interface configured to communicate with an entity profile database comprising information for a content consuming entity; and
 a content database comprising substantive content assets; and
 entity certification circuitry in communication with the communication interface that includes a processor and non-transitory media with instruction code that causes the processor to:
  create, responsive to instructions from an administrator, a content certification for the content consuming entity, the content certification corresponding to a certification group of certification sets and certification blending logic that defines conditions under which completion of specific certification sets of the certification group result in successful completion of the certification group,
   wherein each certification set includes substantive content assets selected, by the administrator, from the content database and instruction logic for specifying a combination of substantive content assets to be completed by the content consuming entity before the content consuming entity can be considered to have satisfied the content certification, wherein the certification set further includes a learning component that defines a resource locator to instructional content stored on a learning management system outside of the system, and an assessment component that defines a resource locator to content on the learning management system that evaluates the content consuming entity's understating of the instruction content, and wherein the blending logic for a component group is selectable, by the administrator, to indicate that completion of the component group is successful when: any certification set of the certification group is completed successfully, when all certification sets of the certification group are completed successfully, when a combination of certification sets of the certification group is completed successfully, and when a combined number of hours spent towards completion of any of the certification sets of the certification group exceeds a specified threshold;

in the entity profile database, mark the content consuming entity as enrolled in the content certification, and create an association between the content consuming entity and the certification set of the substantive content assets;

retrieve, from the learning management system, status associated with completion of at least some of substantive content assets of the certification set by the content consuming entity;

maintain a portal for the content consuming entity, the portal comprising a status indicator of the content certification in which the content consuming entity is enrolled;

add a prerequisite content certification that is a prerequisite to the content certification, wherein if the content certification is completed, the prerequisite content certification is not required to be completed by the content consuming entity, and if the content certification is not completed, the prerequisite content certification is required to be completed by the content consuming entity;

receive a selection of a sponsor for the content consuming entity for approving a request for certification;

when the sponsor denies a request by the content consuming entity to perform the content certification more than a predetermined number of times, flag the content consuming entity as disqualified from taking the content certification;

when the sponsor approves the request by the content consuming to perform the content certification, flag the content consuming entity as registered for taking the content certification;

when the content consuming entity is registered and later withdraws from performing the content certification, flag the content consuming entity as withdrawn from the content certification if the content consuming entity is permitted to withdraw, and maintain the content consuming entity as registered if the content consuming entity is not permitted to withdraw;

when the content consuming entity is permitted to withdraw from the content certification, request approval from the sponsor to allow the content consuming entity to withdraw from performing the content certification; and when two different content certifications require a same type of training to be performed by the content consuming entity, and the content consuming entity completes a single instance of the training, apply the training to a single content certification of the two different content certifications.

2. The system of claim 1, where:
the status of the content certification is based on a respective status of completion of the certification set of substantive content assets of the content certification.

3. The system of claim 2, where:
the instruction code causes the processor to determine a completion order for the substantive content assets in the certification set; and link the completion order with the certification set of substantive content assets, wherein the completion order specifies an order in which the content consuming entity is to complete substantive content assets in the certification and the system is configured to prevent the consuming entity access from accessing the substantive content assets out of order.

4. The system of claim 2, where:
the instruction code causes the processor to:
adapt the content certification for the content consuming entity by applying a change to the certification set of substantive content assets associated with the content certification.

5. The system of claim 4, where the change to the certification set of substantive content assets associated with the content certification comprises removal of a substantive content asset that is completed by the content consuming entity.

6. The system of claim 5, where the change to the certification set of substantive content assets associated with the content certification comprises removal of a substantive content asset that is not completed by the content consuming entity.

7. The system of claim 6, where:
applying the change results in an adapted certification set of substantive content assets; and
the instruction code causes the processor to:
change the status of the content certification for the content consuming entity according to the adapted certification set of substantive content assets associated with the content certification.

8. The system of claim 1, wherein:
the instruction code causes the processor to:
mark the content consuming entity as enrolled in the content certification in response to an authorization from a sponsor entity.

9. The system of claim 1, wherein:
the instruction code causes the processor to:
identify the set of substantive content assets in the content certification based on an entity characteristic of the content consuming entity, the entity characteristic comprised in the entity profile database.

10. The system of claim 9, where the entity characteristic comprises geographic location, organizational position of the content consuming entity, or both.

11. The system of claim 9, where the content certification comprises a first certification set of substantive content assets, and where:
the instruction code causes the processor to:
create a content recertification for the content consuming entity comprising a second certification set of substantive content assets selected from the content database.

12. A method performed by an employee certification system, the method comprising:

in a certification management portal:

creating, responsive to instructions from an administrator, a certification program in a certification database, the certification program comprising a plurality of content modules and certification blending logic that defines conditions under which completion of specific certification modules of the certification program result in successful completion of the certification program, wherein the blending logic for a component program is selectable, by the administrator, to indicate that completion of the component program is successful when: any certification module of the certification program is completed successfully, when all certification modules of the certification program are completed successfully, when a combination of certification modules of the certification program is completed successfully, and when a combined number of hours spent towards completion of any of the certification modules of the certification program exceeds a specified threshold, and wherein a first content module that includes a learning component that defines a resource locator to instructional content stored on a learning management system, and an assessment component that defines a resource locator to content on the learning management system that evaluates the employee's understating of the instruction content, the certification program associated with preselected demographic information and a nomination;

identifying an employee profile that matches the preselected demographic information and the nomination, the employee profile retrieved from an employee database;

enrolling an employee matching the employee profile in the certification program by flagging the corresponding employee profile in the employee database as enrolled;

periodically updating completion status of the certification program for the employee by retrieving completion status of the first content module of the certification program for the employee, from the learning management system, where the completion status of the first content module is retrieved from a content database;

revising the certification program by adding a second content module;

updating the completion status of the certification program for the employee by retrieving and aggregating completion status of the first content module and the second content module for the employee, where the completion status of the first content module and the second content module are retrieved from the content database;

sending a notification message through a communication interface to the employee, the notification message indicates a completion status of the certification program based on the aggregation of the completion status of the first content module and the second content module;

adding a prerequisite certification program that is a prerequisite to the certification program, wherein if the certification program is completed, the prerequisite certification program is not required to be completed by the employee, and if the certification program is not completed, the prerequisite certification program is required to be completed by the employee;

receiving a selection of a sponsor for the employee for approving a request for certification;

when the sponsor denies a request by the employee to perform the certification program more than a predetermined number of times, flagging the employee as disqualified from taking the certification program;

when the sponsor approves the request by the employee to perform the certification program, flagging the employee as registered for taking the certification program;

when the employee is registered and later withdraws from the certification program, flagging the employee as withdrawn from the certification program if the employee is permitted to withdraw, and maintaining the employee as registered if the employee is not permitted to withdraw;

when the employee is permitted to withdraw from the certification program, requesting approval from the sponsor to allow the employee to withdraw from the certification program; and when two different certification programs require a same type of training to be performed by the employee, and the employee completes a single instance of the training, applying the training to a single certification program of the two different certification programs.

13. The method of claim 12, further comprising:

revising the certification program by replacing the first content module with a third content module; and updating the completion status of the certification program for the employee by retrieving and aggregating completion status of the second content module and the third content module for the identified employee profile.

14. The method of claim 12, further comprising: creating a recertification program for the employee profile; and enrolling the employee in the recertification program after a predetermined duration of time since completion of the certification program by the employee.

15. The method of claim 13, where the first content module, the second content module, the third content module, or any combination thereof comprises a training class, a workshop, an assessment, a supervisor approval, or any combination thereof.

16. A certification management product comprising:

a storage medium other than a transitory signal; and instructions stored on the medium and configured for execution by a processor to:

create, responsive to instructions from an administrator, a certification program, the certification program comprising a plurality of certification components and certification blending logic that defines conditions under which completion of specific certification modules of the certification program result in successful completion of the certification program, wherein the blending logic for a component program is selectable, by the administrator, to indicate that completion of the component program is successful when: any certification module of the certification program is completed successfully, when all certification modules of the certification program are completed successfully, when a combination of certification modules of the certification program is completed successfully, and when a combined number of hours spent towards completion of any of the certification modules of the certification program exceeds a specified threshold, wherein a first certification component includes a learning component that defines a resource locator to instructional content stored on a learning management system, and an assessment component that defines a resource locator to content on the learning management system that evaluates an employee's understating of the instruction content, a completion criteria, and a demographic criteria;

identify target employees that match the demographic criteria of the certification program by comparison of the demographic criteria with employee profiles in an employee database;

receive a nomination from a sponsoring employee associated with the certification program, the nomination approves enrollment an employee in the certification program, wherein the nominated employee is from the target employees; enroll the employee in the certification program;

direct the employee to the certification components according to a completion order specified by the completion criteria of the certification program;

receive completion status of the certification components from respective learning management systems;

determine an updated completion status of the certification program based on the changed certification program;

update the employee profile of the enrolled employee according to the updated completion status;

add a prerequisite certification program that is a prerequisite to the certification program, wherein if the certification program is completed, the prerequisite certification program is not required to be completed by the employee, and if the certification program is not completed, the prerequisite certification program is required to be completed by the employee;

receive a selection of a sponsor for the employee for approving a request for certification;

when the sponsor denies a request by the employee to perform the certification program more than a predetermined number of times, flag the employee as disqualified from taking the certification program;

when the sponsor approves the request by the employee to perform the certification program, flag the employee as registered for taking the certification program;

when the employee is registered and later withdraws from the certification program, flag the employee as withdrawn from the certification program if the employee is permitted to withdraw, and maintain the employee as registered if the employee is not permitted to withdraw;

when the employee is permitted to withdraw from the certification program, request approval from the sponsor to allow the employee to withdraw from the certification program; and when two different certification programs require a same type of training to be performed by the employee, and the employee completes a single instance of the training, apply the training to a single certification program of the two different certification programs.

17. The product of claim 16, wherein the change in the certification program comprises a change to the certification components and/or the completion criteria.

18. The product of claim 16, where the instructions are further configured to: notify the employee about expiration date of the certification program; enroll the employee in a recertification program.

19. The product of claim 18, wherein the recertification program comprises new certification components and a new completion criteria.

20. The product of claim 16, wherein the certification components comprises a first training module from a first learning management system and a second training module from a second learning management system.

* * * * *